(12) United States Patent
Beckham

(10) Patent No.: US 11,836,788 B2
(45) Date of Patent: Dec. 5, 2023

(54) SYSTEM AND NETWORK FOR OUTFIT PLANNING AND WARDROBE MANAGEMENT

(71) Applicant: Lutzy Inc., Brookhaven, GA (US)

(72) Inventor: Brittany Fletcher Beckham, Brookhaven, GA (US)

(73) Assignee: Lutzy Inc., Atlanta, GA (US)

(*) Notice: Subject to any disclaimer, the term of this patent is extended or adjusted under 35 U.S.C. 154(b) by 0 days.

(21) Appl. No.: 17/709,071

(22) Filed: Mar. 30, 2022

(65) Prior Publication Data

US 2022/0222740 A1    Jul. 14, 2022

Related U.S. Application Data

(63) Continuation of application No. 17/388,108, filed on Jul. 29, 2021, which is a continuation of application No. 16/795,269, filed on Feb. 19, 2020, now Pat. No. 11,087,391, which is a continuation of application No. 16/409,943, filed on May 13, 2019, now Pat. No. 10,607,279, which is a continuation of application (Continued)

(51) Int. Cl.
*G06Q 30/0601* (2023.01)
*G06Q 20/20* (2012.01)
*G06T 19/00* (2011.01)
*G06T 17/00* (2006.01)
*G06Q 20/18* (2012.01)
*G07F 17/00* (2006.01)
*G06Q 50/00* (2012.01)

(52) U.S. Cl.
CPC ......... *G06Q 30/0643* (2013.01); *G06Q 20/18* (2013.01); *G06Q 20/204* (2013.01); *G06T 17/00* (2013.01); *G06T 19/006* (2013.01); *G07F 17/0014* (2013.01); *G06Q 50/01* (2013.01); *G06T 2210/16* (2013.01)

(58) Field of Classification Search
CPC . H04N 13/02; A41H 1/00; A41H 3/00; A43D 1/027
USPC ................................................ 705/26.7, 27.2
See application file for complete search history.

(56) References Cited

U.S. PATENT DOCUMENTS

| | | | | |
|---|---|---|---|---|
| 9,648,926 B2 * | 5/2017 | Marks | ................ | G06Q 30/0631 |
| 9,936,754 B2 * | 4/2018 | Koh | ................... | G01B 11/2513 |
| 9,949,519 B2 * | 4/2018 | Koh | ....................... | A41H 3/007 |

(Continued)

OTHER PUBLICATIONS

International Search Report and Written Opinion in International Application No. PCT/US2016/41329, dated Sep. 30, 2016, 12 pages.

*Primary Examiner* — Olusegun Goyea
(74) *Attorney, Agent, or Firm* — Fish & Richardson P.C.

(57) ABSTRACT

A system to manage a wardrobe and compile outfits includes a server computing device that includes a memory having stored thereon demographic data and a plurality of electronic fashion item models. Each electronic fashion item model is indicative of a fashion item. The electronic fashion item model includes a fashion item type and a fashion item color scheme. The electronic fashion item model is associated with one or more style genres. The system includes an application configured to, when executed by at least one processor, compile at least one virtual outfit. Each virtual outfit includes at least one electronic fashion item model. Each virtual outfit is compiled based on A) a selected event, B) the particular user's demographic data, and C) style genres.

18 Claims, 46 Drawing Sheets

Related U.S. Application Data

No. 15/204,667, filed on Jul. 7, 2016, now Pat. No. 10,339,593.

(60) Provisional application No. 62/189,627, filed on Jul. 7, 2015.

(56) References Cited

U.S. PATENT DOCUMENTS

| | | |
|---|---|---|
| 10,339,593 B2 | 7/2019 | Beckham |
| 10,607,279 B2 | 3/2020 | Beckham |
| 2009/0144173 A1* | 6/2009 | Mo .................. G06N 3/006 700/98 |
| 2010/0191770 A1* | 7/2010 | Cho ................ G06Q 30/0217 707/E17.014 |
| 2011/0208655 A1* | 8/2011 | Steelberg ............. G06Q 30/02 705/50 |
| 2013/0144745 A1 | 6/2013 | Henderson et al. |
| 2015/0134494 A1* | 5/2015 | Su .................... G06Q 30/0643 705/27.2 |
| 2015/0154453 A1* | 6/2015 | Wilf ..................... G06T 7/564 382/103 |
| 2015/0154691 A1* | 6/2015 | Curry ............... G06Q 30/0631 705/27.2 |
| 2015/0302505 A1* | 10/2015 | Di ..................... G06Q 30/0631 705/26.7 |
| 2016/0081435 A1* | 3/2016 | Marks ................... A43D 1/02 382/154 |
| 2019/0266664 A1 | 8/2019 | Beckham |
| 2020/0258145 A1 | 8/2020 | Beckham |
| 2021/0358024 A1 | 11/2021 | Beckham |

\* cited by examiner

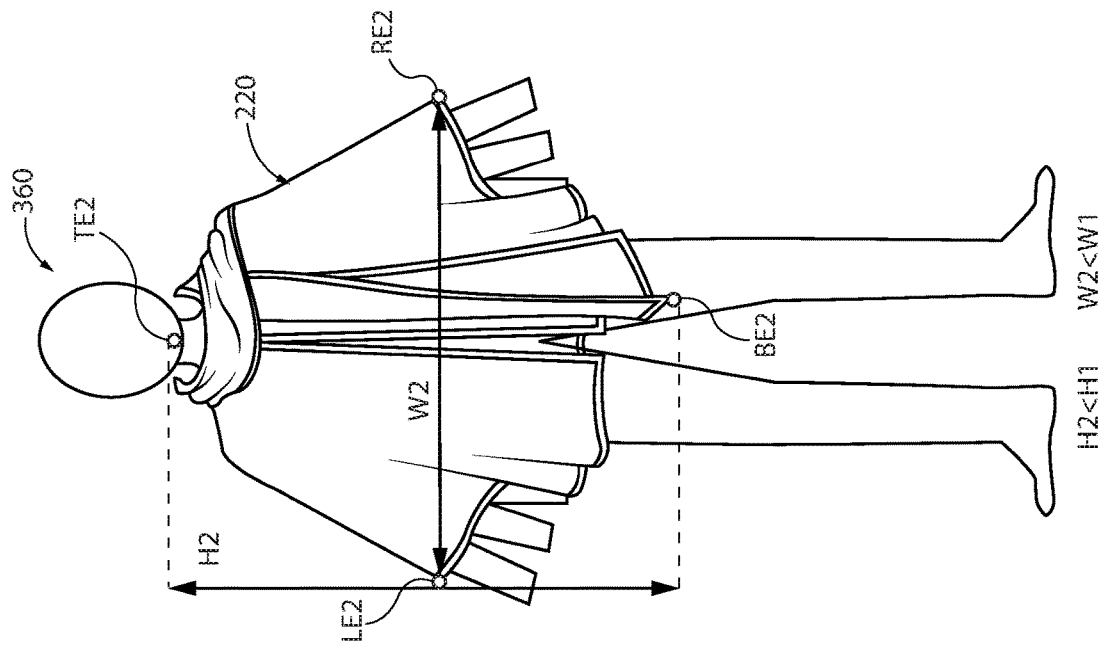
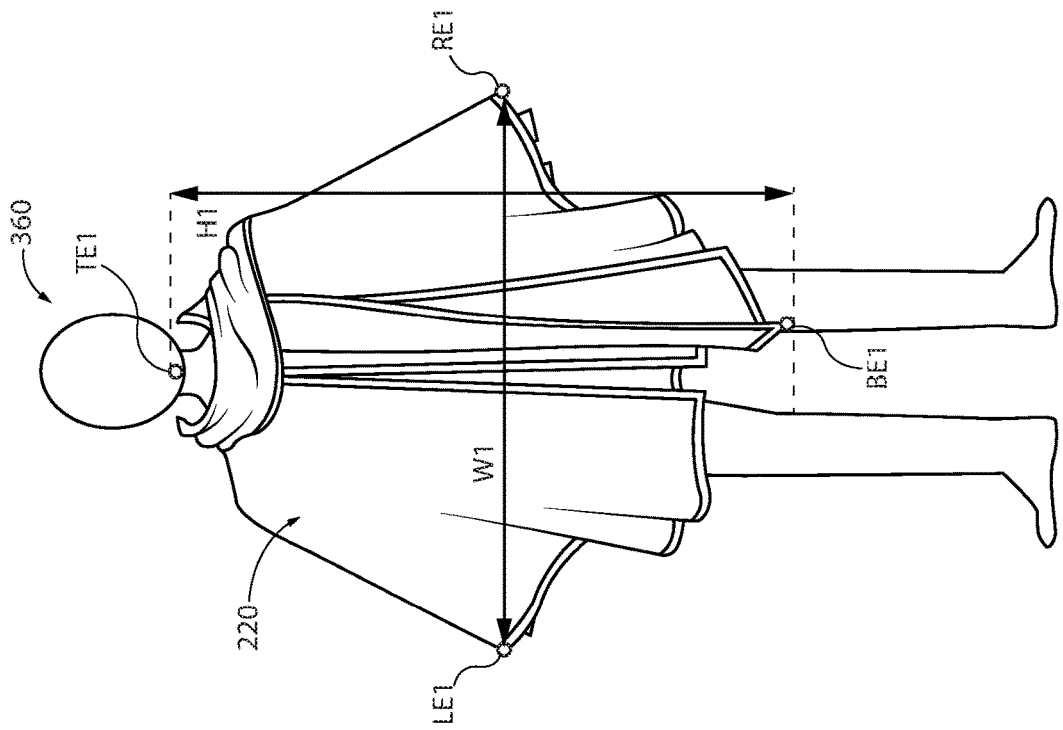
FIG. 7G
FIG. 7F

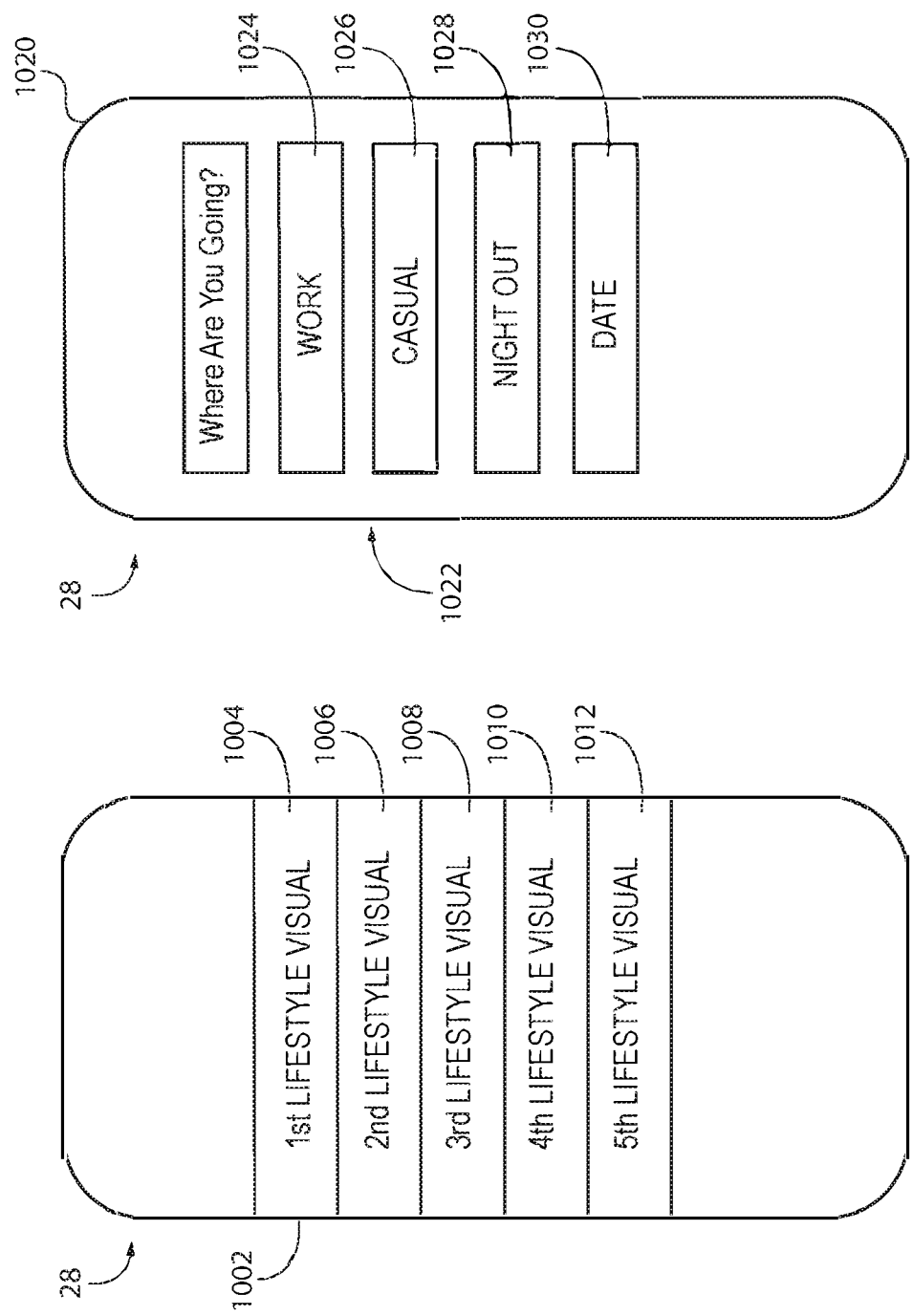

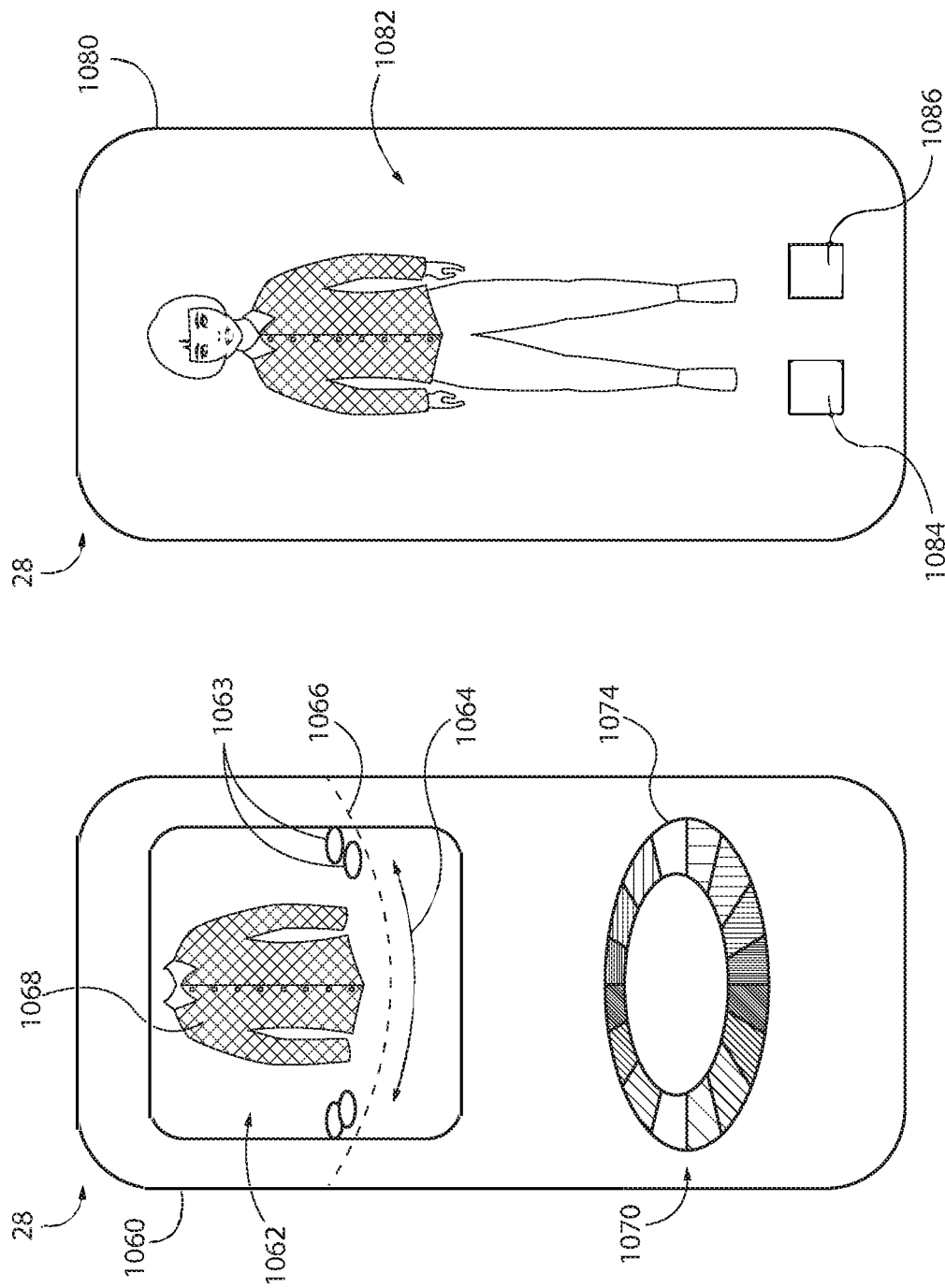

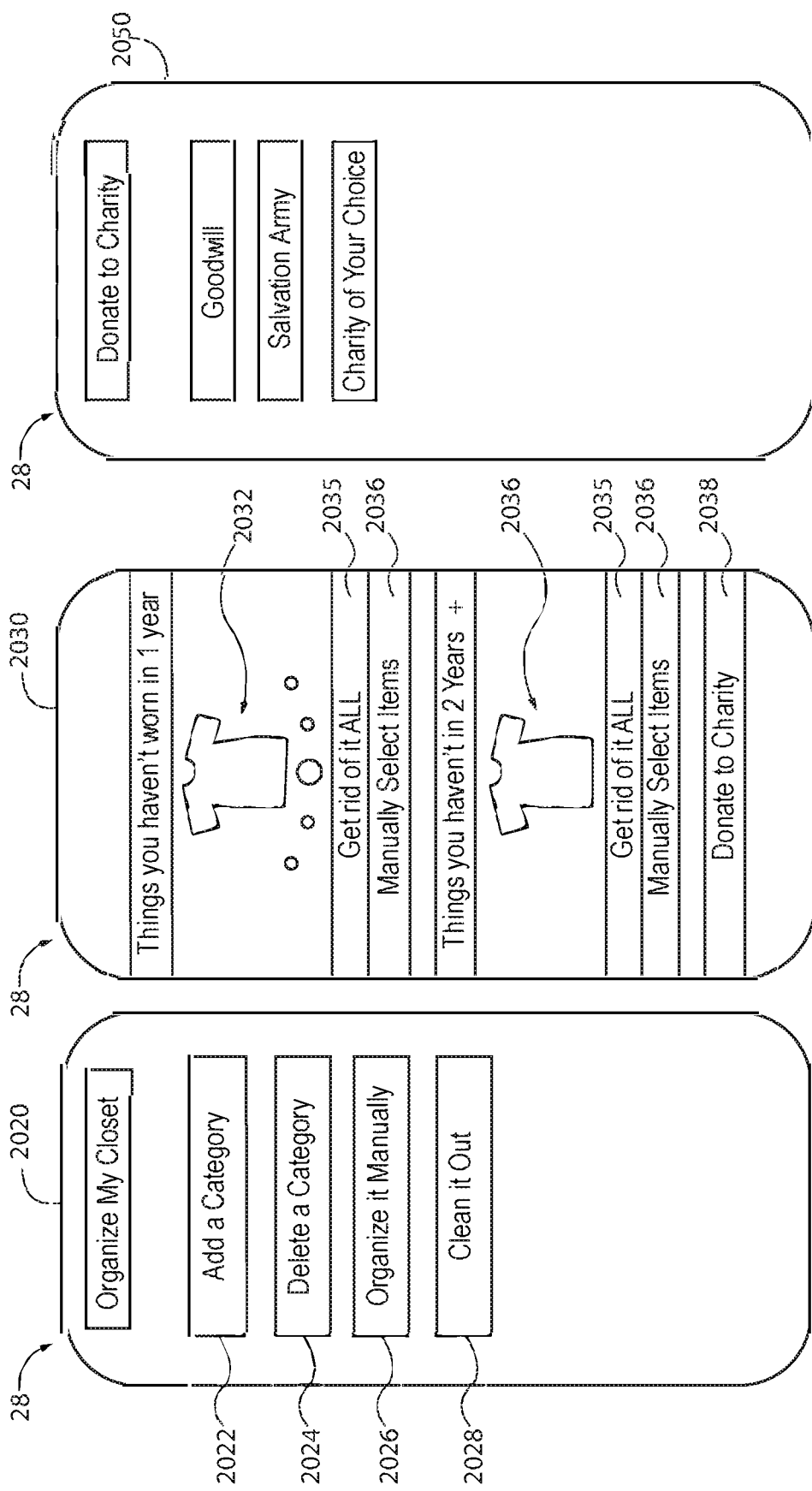

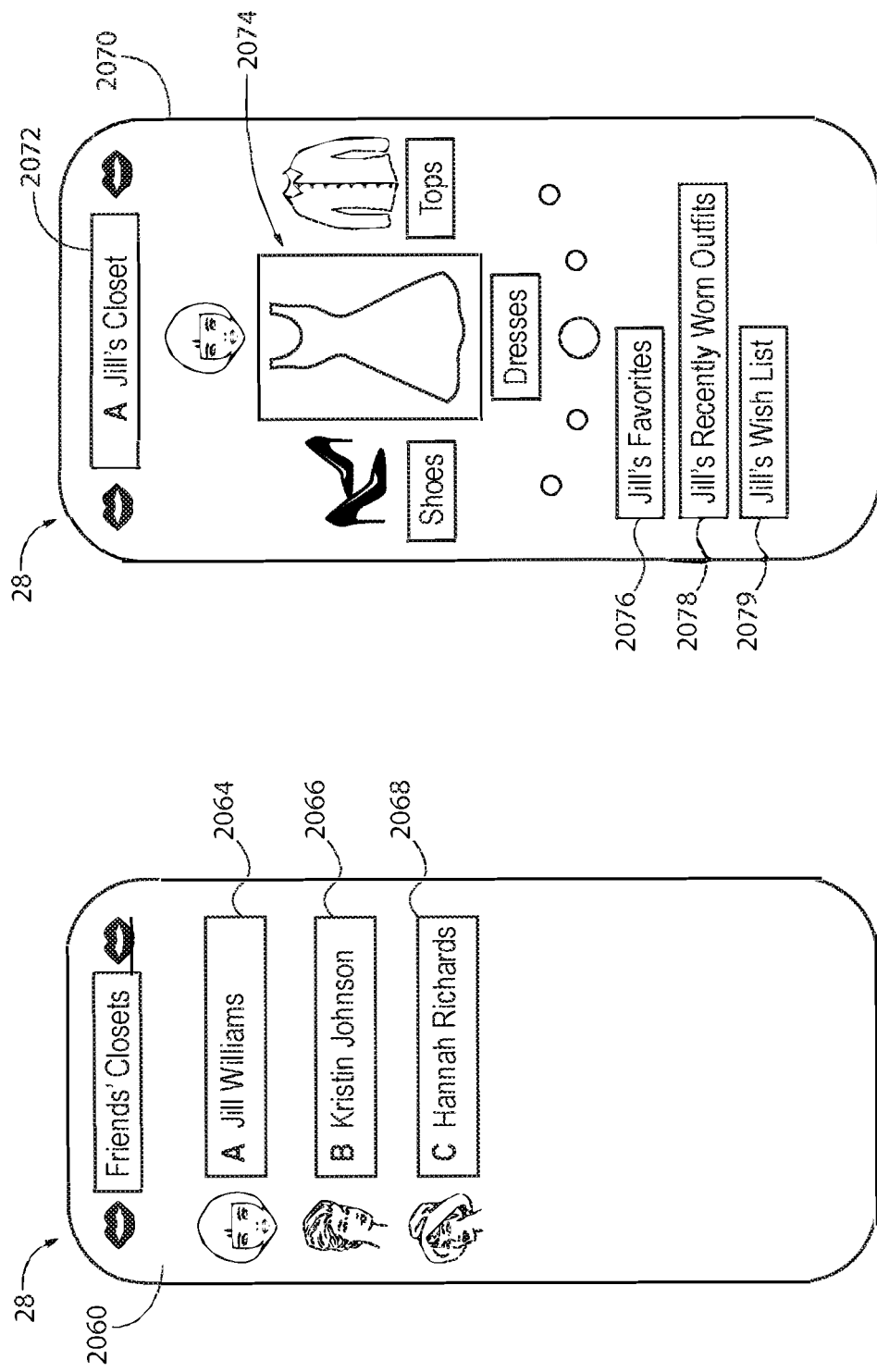

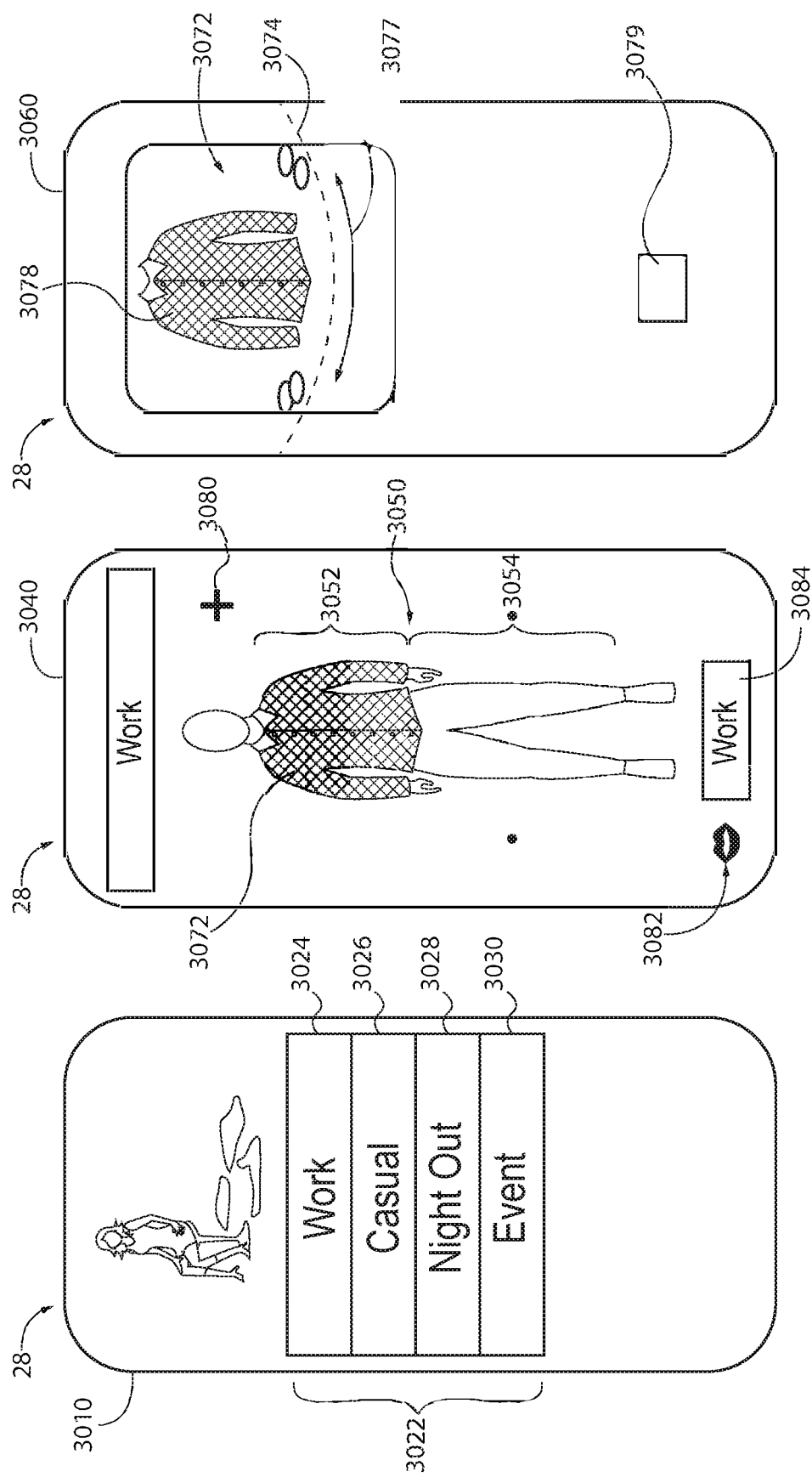

SYSTEM AND NETWORK FOR OUTFIT PLANNING AND WARDROBE MANAGEMENT

CROSS REFERENCE TO RELATED APPLICATIONS

This application is a continuation of U.S. nonprovisional patent application Ser. No. 17/388,108 filed on Jul. 29, 2021 which is a continuation of U.S. nonprovisional patent application Ser. No. 16/795,269 filed on Feb. 19, 2020, which is a continuation of U.S. nonprovisional patent application Ser. No. 16/409,943, filed May 13, 2019, which is a continuation of U.S. nonprovisional patent application Ser. No. 15/204,667, filed Jul. 7, 2016, which claims the benefit and priority to U.S. provisional application No. 62/189,627 filed Jul. 7, 2015, the contents of each are incorporated by reference herein in their entireties.

TECHNICAL FIELD

The present application relates to the acquisition, development and management of data concerning fashion items in wardrobes for a network of individual, and outfit planning based on such data and planned events.

BACKGROUND

Computer implemented wardrobe management system exist to aid in closet management often for the purpose of helping the user identify appropriate garments to purchase through various web-based commerce portals. Typically, data regarding clothing items existing in a user's closet or recently purchased items are compiled and uploaded by the user. Some of these systems include functionality to suggest outfits to a user, based on user-uploaded image files of the user's garments, user preferences for a particular color or fashion brand, and/or size. The particular fashion items for the suggested outfit are displayed via a user interface within a frame or fixed-dimension windows that include 1) the uploaded image files of the garments, and/or 2) image files for garments pulled from (and hyperlinked to) $3^{rd}$ party retailer websites. The user can navigate to the $3^{rd}$ party retailer website to purchase the garment included in the suggested outfit. Other computer systems are focused on aggregating collections of outfits in one portal based on user preferences for a particular color or brand, for example. In such systems the aggregated outfits are actually created by different users, brand owners, or other entities. Such aggregation systems may also provide access to 3P party websites where the user can purchase items of interest displayed in their portal.

SUMMARY

Embodiments of the present disclosure includes a system and method for managing a wardrobe and compiling outfits. The system includes at least one server computing device that includes a computer memory and a computer processor. The system includes a plurality of electronic fashion item models stored in the computer memory, each electronic fashion item model being indicative of a fashion item that is worn on a human form. Each electronic fashion item model includes at least a fashion item type. The system includes at least one application stored in the computer memory. The at least one application configured to, when executed by the computer processor, compile at least one virtual outfit that includes one or more of the plurality of electronic fashion item models. The at least one virtual outfit is compiled based on A) a lifestyle demographic type, B) a style genre, C) a selected event of a plurality of events, and D) an association of the plurality of electronic fashion item models with the lifestyle demographic type, the style genre, and the selected event.

BRIEF DESCRIPTION OF THE DRAWINGS

The foregoing summary, as well as the following detailed description of embodiments of the application, will be better understood when read in conjunction with the appended drawings. The drawings include exemplary embodiments for the purposes of illustration. It should be understood, however, that the application is not limited to the precise embodiments shown. In the drawings:

FIGS. 7A-7G are diagrams illustrating a creation of a silhouette model according to an embodiment of the present disclosure;

FIGS. 12A, 12B, 12C and 12D illustrate a user interface displaying exemplary screens configured to receive user inputs for creating a virtual outfit;

FIG. 13A illustrates a user interface displaying an exemplary screen that includes a virtual outfit and input elements for modifying the fashion item model thereof;

FIG. 13B illustrates a user interface displaying an exemplary screen that includes a modified virtual outfit in response to inputs received via the screen shown FIG. 13A;

FIGS. 21, 22, and 23 illustrate a user interface displaying exemplary screens configured to permit the user to manage outfits and fashion items;

FIG. 24A illustrates a user interface displaying an exemplary scree that includes access portals to networked user's virtual closets;

FIG. 24B illustrates a user interface displaying an exemplary screen that includes a particular networked user's virtual closet;

FIG. 25A illustrates a user interface displaying an exemplary screen that displays event options for outfit planning;

FIG. 25B illustrates a user interface displaying an exemplary screen that displays a virtual outfit including fashion items compiled for the selected event;

FIG. 25C illustrates a user interface displaying an exemplary screen that includes input elements for modifying a fashion item of the virtual outfit shown in FIG. 25B;

DETAILED DESCRIPTION OF ILLUSTRATIVE EMBODIMENTS

The present disclosure relates to a system, method, and related software applications for the acquisition, development, management of data related to fashion items in a person's physical wardrobe via networked computing devices. The software application creates virtual outfits for specific events based on that person's unique lifestyle demographics, persona and style genre. The virtual outfits correspond to fashion items in the person's physical wardrobe and are displayed graphically via a user interface on the person's computing device. In one example, one or more applications running on a computing device, can compile and display at least one virtual outfit based on 1) the user's demographic data, 2) persona, 3) style genre, 4) an event that the user the plans to attend, and 5) an association of one or more style genres with wardrobe items. The virtual outfits may be modifiable by the user. The applications are configured to learn user specific preferences for fashion items and related style genres by associating user modification inputs, preferred outfits, and lifestyle demographics for the user. In another example, the virtual outfits are compiled based on usage of the fashion items. In another example, the application can suggest and coordinate outfits for travel planning purposes. In yet another example, the application can manage a physical wardrobe by facilitating: a) exchange of wardrobe items among multiple users; b) cleaning services for wardrobe items, c) disposition of wardrobe items for sale or donation, and/or d) accessing purchase information for items complementary to a given outfit. As used herein, a physical wardrobe includes a person's wardrobe fashion items. Fashion items include any type of garment, footwear, and accessories. Accessories include such things typically worn that is not a garment or footwear, such as hats, jewelry, watches, scarves, and the like. Furthermore, systems, methods, and related software applications as described herein acquire, develop, and manage wardrobe data for a network of users linked via social network.

Figure 1:
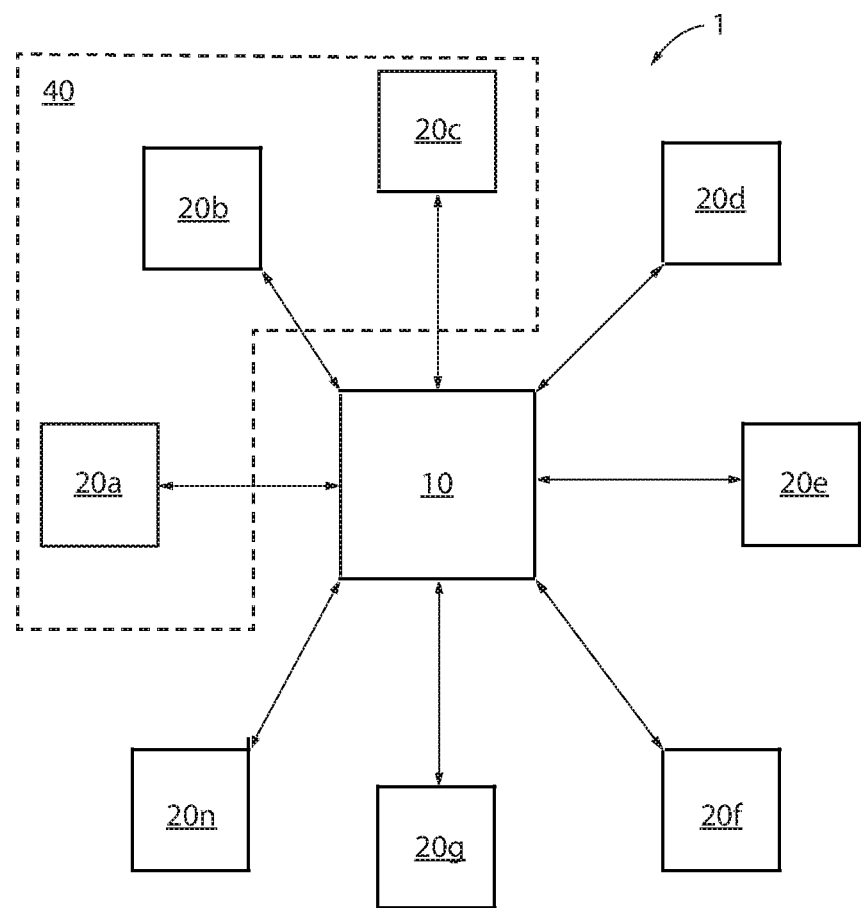
FIG. 1 is a diagram illustrating a system for managing wardrobe data and planning outfits for multiple users across multiple computing devices, according to an embodiment of the present disclosure.

Referring to FIG. 1, an embodiment of the present disclosure is a system 1 including at least one server computing device 10, a plurality of computing devices 20a, 20b, 20c, . . . 20n, in electronic communication with the server computing device 10, and one or more software applications 30s and 30c (FIGS. 2A and 2B) implemented across computing devices 10 and 20a, 20b, 20c . . . 20n. Each computing device 20a, 20b, 20c, . . . 20n may be associated with a different person or user. The software applications are also configured to permit several of up to all of the users to self-associate such that specific groups of computing devices 20a, 20b, and 20c . . . 20n are connected via a social network

40. The social network 40 is illustrated schematically in dashed lines in FIG. 1 and will be further described below. Accordingly, the system 1 is configured to acquire, develop, and manage wardrobe data for: a) an individual user, b) multiple users connected via the social network 40, and/or c) all of the users. For purposes of clarifying how the software application is implemented across the various computing devices, reference number 20 is used interchangeably with reference numbers 20*a*, 20*b*, 20*c* . . . , 20*n* unless noted otherwise. In addition, the present disclosure describes software applications implemented over system components and configured to execute various steps in the methods described below. It should be appreciated that a software application can implement steps in the methods utilizing all of the system components or just portions of the system components. Furthermore, the software applications are described below in singular form. It should be appreciated that multiple software applications may interface to perform the described functions, and multiple applications can run on more than one computing device to implement the methodologies described herein.

Continuing with reference to FIG. 1, the system 1 is implemented via exemplary architecture that includes computing devices 10, 20*a*, 20*b*, 20*c* . . . , 20*n* in electronic communication with each other via a common communications network, such as, for example the Internet. As illustrated, the computing devices 20*a*, 20*b*, 20*c* . . . 20*n* and server computing device 10 are arranged in a client-server architecture. The server computing device 10 can receive and transmit data to other computing devices 20 within a defined social network group. In addition, one up to all the computing devices 20 can receive information from the other computing devices 20. And one up to all of the computing devices 20 can transmit information to the other computing devices 20. Furthermore, one or all of the computing devices 10, 20 can access information on the other computing devices 10, 20. "Access" or "accessing" as used herein can include retrieving information stored in memory on a computing device. For instance, "access" or "accessing" includes sending instructions via the network from server computing device 10 to computing device 20*a* so as to cause information to be transmitted to the memory of the computing device 20*a* for access locally by the computing device 20*a*. In addition or alternatively, "access" or "accessing" can include the server computing device 10 sending an instruction to computing device 20*a* to access information stored in the memory of the computing device 20*a*. Reference to server computing device 10 and computing device 20*a* in this paragraph is exemplary and are used to only clarify use of words "access" or accessing."

FIG. 1 illustrates a client-server network. But the software application can be implemented over any number of network configurations. For example, in alternate embodiments, the computing devices 20*a*, 20*b*, 20*c* . . . 20*n* are configured as a peer-to-peer network architecture. In still other alternative embodiments, the computing devices 20*a*, 20*b*, 20*c* . . . 20*n* can be arranged in a ring-type network architecture. Further, the software application can be implemented across computing devices arranged on a network that includes aspects of a client-server network, peer-to-peer network, ring-type network, and/or other network architectures known to a person of ordinary skill in the art. Accordingly, it should be appreciated that numerous suitable alternative communication architectures are envisioned.

Figure 2A:
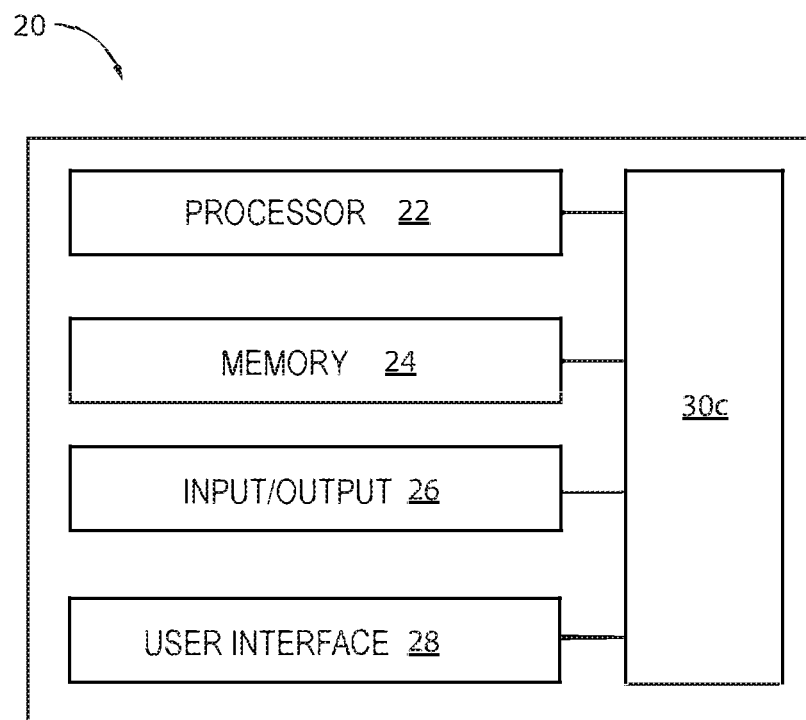
FIG. 2A is a computing device associated with each user illustrated in FIG. 1.

Turning to FIG. 2A, the computing device 20 is configured to receive, process, and store various information used to implement one or more software applications, such as client software application 30*c*. As described above each computing device 20*a*, 20*b*, 20*c* . . . 20*n* may be associated with a particular user. It will be understood that the hardware components of computing device 20 can include any appropriate device, examples of which include a portable computing device, such as a laptop, tablet or smart phone, or other computing devices, such as a desktop computing device or a server-computing device.

As illustrated in FIG. 2A, the computing device 20 includes one or more processors 22, a memory 24, an input/output 26, and a user interface (UI) 28. It is emphasized that the operation diagram depiction of the computing device 20 is exemplary and is not intended to imply a specific implementation and/or configuration. The processor 22, memory 24, input/output portion 26 and user interface 28 can be coupled together to allow communications therebetween, and can interface with the software application 30*c*. The software application 30*c* may include an application programmatic interface (API). As should be appreciated, any of the above components may be distributed across one or more separate computing devices.

Continuing with FIG. 2A, the memory 24 can be volatile (such as some types of RAM), non-volatile (such as ROM, flash memory, etc.), or a combination thereof, depending upon the exact configuration and type of processor 22. The computing device 20 can include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic storage or other magnetic storage devices, universal serial bus (USB) compatible memory, or any other medium which can be used to store information and which can be accessed by the computing device 20.

Continuing with FIG. 2A, in various embodiments, the input/output portion 26 includes an antenna or an electronic connector for wired connection, or a combination thereof. In some implementations, input/output portion 26 can include a receiver and transmitter, transceiver or transmitter-receiver. The input/output portion 26 is capable of receiving and/or providing information pertaining to communication with a network such as, for example, the Internet. As should be appreciated, transmit and receive functionality may also be provided by one or more devices external to computing device 20. For instance, the input/output portion 20 can be in electronic communication with a receiver.

Referring to FIG. 2A, the user interface 28, which can include an input device and/or display (input device and display not shown) that allows a user to communicate with the computing device 20. The user interface 28 can include inputs that provide the ability to control the computing device 20, via, for example, buttons, soft keys, a mouse, voice actuated controls, a touch screen, movement of the computing device 20, visual cues (e.g., moving a hand in front of a camera on the computing device 20), or the like. The user interface 28 can provide outputs, including visual displays, such as exemplary display screens illustrated in FIGS. 12A-29. Other outputs can include audio information (e.g., via speaker), mechanically (e.g., via a vibrating mechanism), or a combination thereof. In various configurations, the user interface 28 can include a display, a touch screen, a keyboard, a mouse, an accelerometer, a motion detector, a speaker, a microphone, a camera, or any combination thereof. The user interface 28 can further include any suitable device for inputting biometric information, such as, for example, fingerprint information, retinal information, voice information, and/or facial characteristic information, for instance, so as to require specific biometric information for access to the computing device 20. It should be appreciated that the computer devices can operate via any suitable operating system, such as Android, BSD, iOS, Linux, OS X, QNX, Microsoft Windows, Windows Phone, and IBM z/OS. Furthermore, the software application can operate with any of the aforementioned operation systems.

Figure 2B:
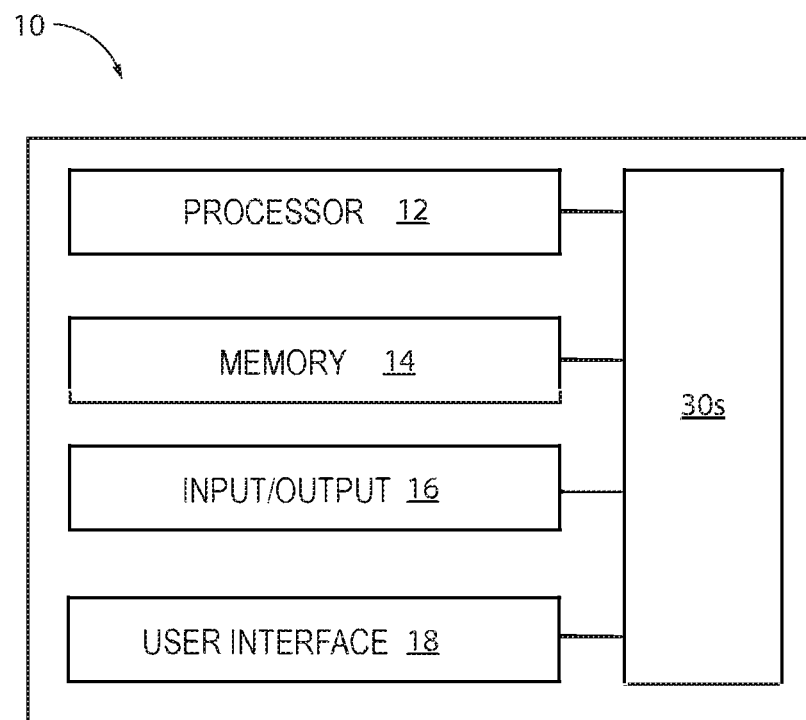
FIG. 2B is a server computing device illustrated in FIG. 1.

FIG. 2B is a diagram of the server computing device 10. The server computing device 10 includes one or more processors 12, a memory 14, an input/output 16, and a user interface (UI) 18, and on or more software applications, such as server application 30s. The processor 12, memory 14, input/output portion 16 and interface 18 can be coupled together to allow communications therebetween. As should be appreciated, any of the above components may be distributed across one or more separate server computing devices. The server computing device processor 12, memory 14, input/output 16, and interface 18 are similar to the processors 22, memory 24, input/output 26, and interface 28 described above with respect computing device 20. It should be appreciated that the server computer device can operate via any suitable operating system, such as Android, BSD, iOS, Linux, OS X, QNX, Microsoft Windows, Windows Phone, and IBM z/OS. It is emphasized that the operation diagram depiction of the server computing device 10 is exemplary and not intended to imply a specific implementation and/or configuration.

Figure 2C:
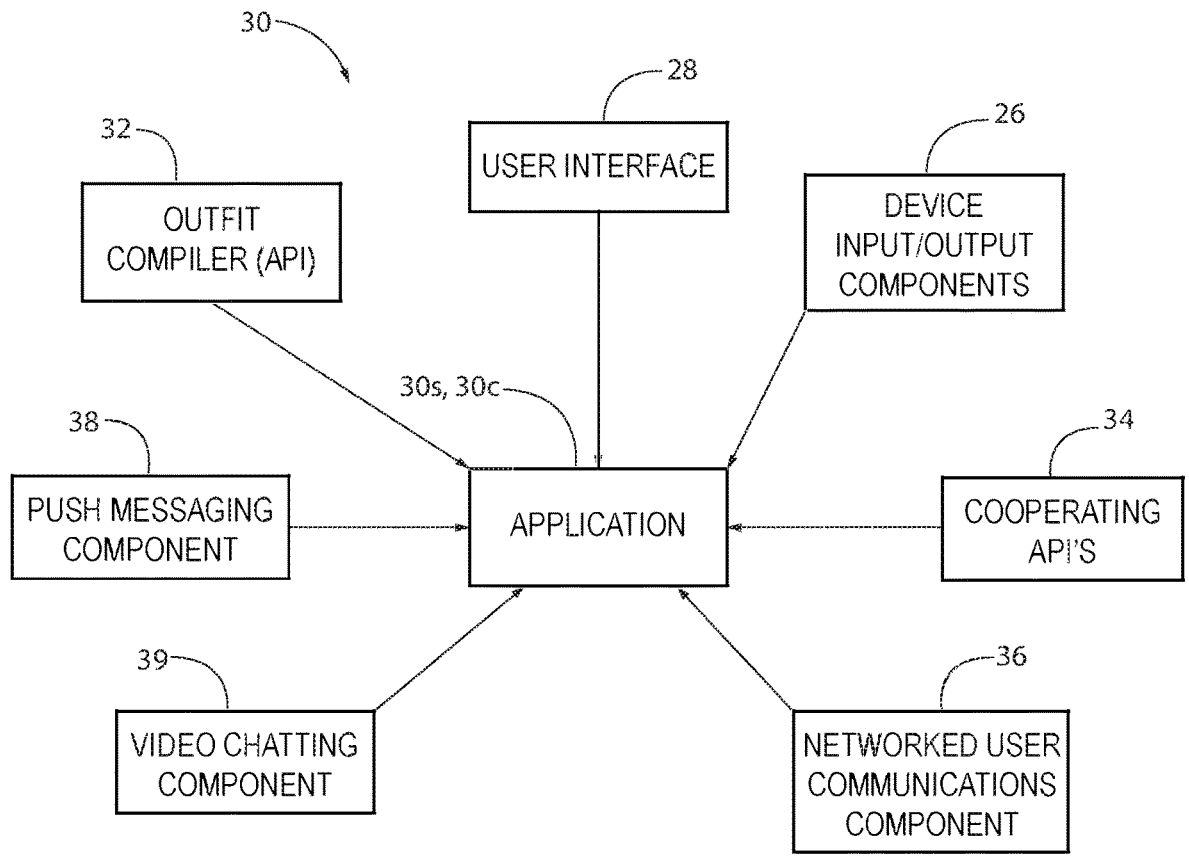
FIG. 2C is a diagram illustrating functional components of a software application for managing wardrobe data and planning outfits implemented by one or more portions of system shown in FIG. 1.

FIG. 2C is a schematic diagram illustrating various functional components of the software application 30 implemented on one or more of computing devices 10 and 20. As illustrated, the software application 30 includes several functional components, which include an outfit compiler 32, user interface 28, device components 26 (e.g. camera, GPS, etc.), cooperating $3^{rd}$ party application programming interfaces 34, communications links among networked users 36, push messaging system 38, and video chat components 39. One or more of the functional components illustrated may be used to aid in the acquisition, development, and management of user wardrobe data. For instance, user interface 28 guide the user through a series of inputs designed create a virtual wardrobe based on the user's physical wardrobe in a simple and interactive way. And outfit compiler 31 learns a user's style preferences based on outfit selection and other user data. Furthermore, one or more of the functional components may implement one more aspects of the methods described herein. The software application 30 can comprise the client application 30c and the server application 30s. Accordingly, certain functions can be implemented on the server computing device 10 and other functions can be implemented on the client computing devices 20. Software application 30, client application 30c, server application 30s may be used interchangeably herein.

Figure 3A:
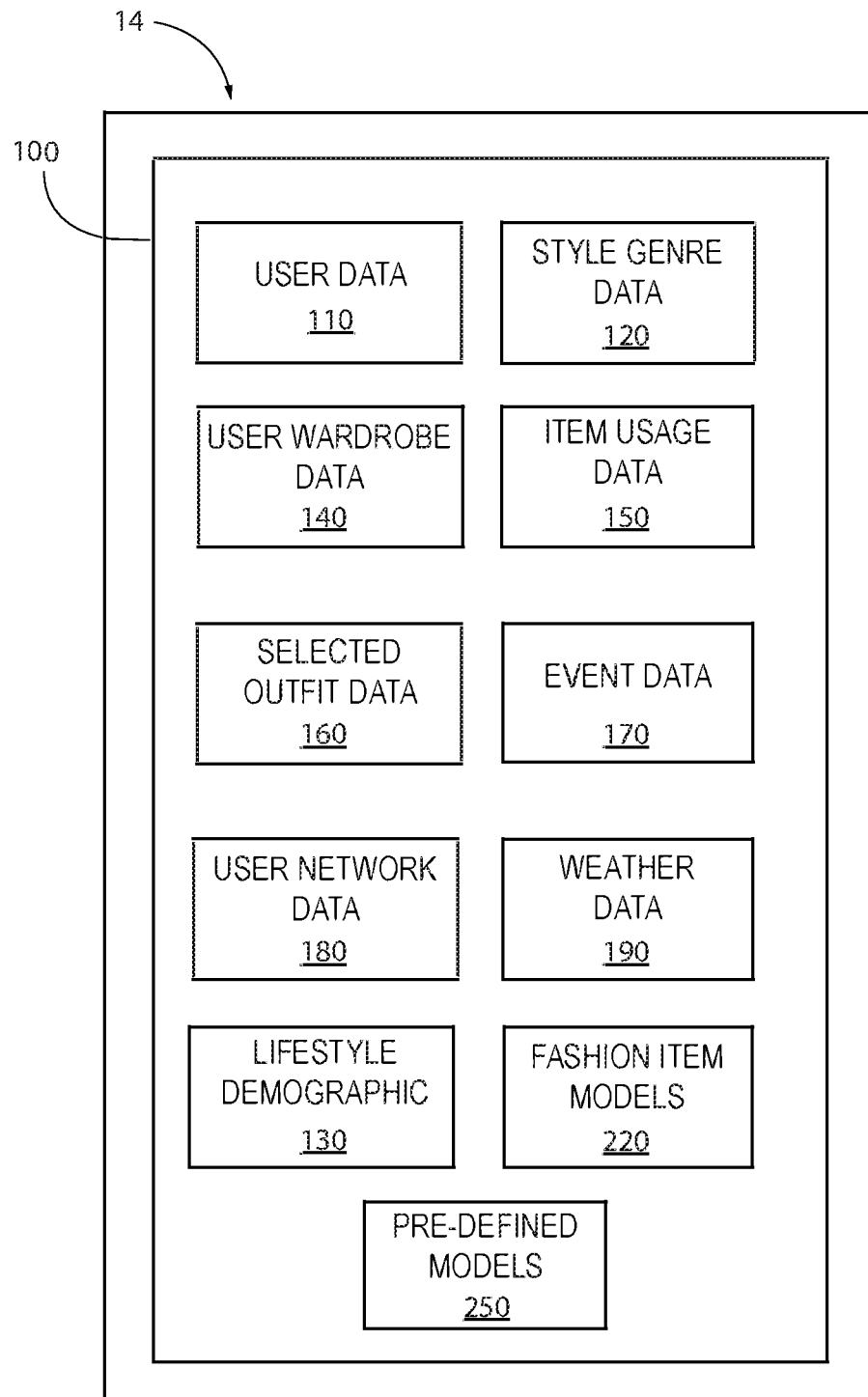
FIG. 3A is a schematic diagram illustrating an exemplary wardrobe database and data components thereof.

Referring to FIG. 3A, as noted above, the system 1 includes one or more database 100 of wardrobe data for each user. The database 100 can be compiled based on user inputs and other predefined data concerning the style genre and stored information concerning garments typical in most physical wardrobes. As illustrated, the database 100 is stored in memory 14 of the server computing device 10. In certain implementations, portions of user specific wardrobe data may also be stored locally in memory 24 of user computing device 20. The software application causes the user interface 28 to present selected data based on user data stored locally on the computing device 20 and user data stored in the memory 14 of the server computing device 10. Alternatively, all of user specific data can be transmitted to the user computing device 20.

As shown in FIG. 3A, the database 100 of wardrobe data includes user data 110, style genre data 120, user specific wardrobe data 140, item usage data 150, selected outfit data 160, event data 170, user social network data 180, weather data 190, lifestyle demographic data 130, and a plurality of fashion item models 220. As noted above, all or portions of each data set listed above may be stored in a user's specific computing device 20 in addition to all of portions of data set being stored on server computing device 10. Each data set will be discussed below.

User data 110 includes information unique to the user, such as a user identifier, device identifier associated with the user identifier, user address, sex, and age. In some cases, user data may also include information for initiating transactions online or through the computing device. User data may also include vocation, level of education, and income information.

Style genre data 120 may include a descriptor of certain fashion, style, look, or style embodied by certain combinations garments, garment shapes, color scheme, color patterns and schemes, and fit. The style genres types include, but are not limited to: Classic; Girl Next Door; Trendy; Preppy; Bohemian; Romantic; Dramatic; Grunge; Hipster; Sporty/Tomboy. Each style genre may have reference scale that associates how casual or formal a particular fashion item is within the respective style genres. Other style genres may be developed as needed.

Lifestyle demographic data 130 is an electronic indication of a user's lifestyle category or demographic. A lifestyle demographic is a descriptor of one or more of a user's social and vocational pursuits, activity level, possibly age, parental status, and income level. In one embodiment, the lifestyle demographic types include, but are not limited to: High School; College; Young Business Professional; Established Business Professional; Mom on the go; Silicon Valley; Moderate; and Polished. The application can store an electronic indication of a plurality of lifestyle demographics (or lifestyle categories). Accordingly, the lifestyle demographic data may include a first lifestyle demographic, a second lifestyle demographic, a third lifestyle demographic, a fourth lifestyle demographic, a fifth lifestyle demographic, or additional lifestyle demographics each associated with a different lifestyle category. The software application 30 can determine the user's lifestyle demographic based on user input into the computing device 20 via the user interface 28, as will be further detailed below. In one example, each lifestyle demographic may include or be associated with a plurality of electronic tags. For instance, the first lifestyle demographic, the second lifestyle demographic, and third lifestyle demographics may associated with first, second, a third set of electronic tags. One or more the electronic tags may be common to two or more or up to all of the lifestyle demographics.

User wardrobe data 140 is a collection of data that is indicative of items in the user's physical wardrobe. User wardrobe data may include specific garment and accessory data. Such item data includes item location, e.g. top or bottom, item type (e.g. shirt or blouse), item size, item color scheme, item weight, component information (e.g. fabric type), item manufacturer or brand (e.g. J. Crew), and unique item identifiers. Aspects of the present disclosure are related to compiling various aspects of the user wardrobe data and/or during initial onboarding, through continued use, or as the user initiates point of sale transactions for fashion items.

Item usage data 150 is an electronic indication of the user's frequency of wearing particular wardrobe items for particular events. For instance, a user may have worn dark colored, low rise skinny jeans 2-3 times per week. Item usage data can include frequency over time, and number of occurrences, or event distributions, i.e. how a particular item is worn for different events.

Selected outfit data 160 are the outfits compiled by the software application based on the lifestyle data, style genre data, and event data, and which the user has selected for wearing to previously selected events. Selected outfit data includes the combination of fashion items, accessory items, and footwear items. Furthermore, selected outfit data 160 can also include electronic identifiers for a user's favorite selected outfits. To the extent that a user is linked to other users via the social network 40, the selected outfit data 160 can include electronic identifiers for users friends' favorite outfits among all those selected by the user for.

An event is a setting or occasion a person may participate in. Event data 170 includes the type of event the user is planning to may participate in. Event can include a work event, a social event, an academic event, a personal event, or any type of event. Exemplary events include, but are not limited to, Working Out; Easy; On the Go; Howdy; Neighborly; Mixed Festivals; Prim & Proper; Kentucky Derby; Special Occasion; Wedding; Elegant; Costume; At the Desk; Group Meeting; and In Front of People. Other exemplary events include work, school (high school or college), night out, formal, or every day. Other events can include, but is not limited to a brunch, wedding, opera, concert, job interview, networking event, work related conference, wedding shower, baby shower, birthday parts, anniversary, Christmas party, New Year's eve party, Confirmation, coffee, etc. Each event may have reference scale that associates how casual or formal a particular fashion item is within the respective event. The event scales and style genre scales may vary based on the person, style genre, and an event.

The range of events can be associated with a lifestyle demographic and/or style genre. For instance, the events a college student regularly attends differ from the events that an experienced professional would likely attend. Accordingly, an embodiment of the application can cause the display of one or more events that are related to one of the lifestyle demographics. Thus, the event data may include a first plurality of events associated with a first lifestyle demographic, a second plurality of events associated with a second lifestyle demographic, a third plurality of events associated with a third lifestyle demographic, a fourth plurality of events associated with a fourth lifestyle demographic, and a fifth plurality of events associated with a fifth lifestyle demographic. Each event can be associated with one or more electronic tag(s) that corresponds that event to one or more of the lifestyle demographics. While each lifestyle demographic may include a plurality of events, those events may not be entirely exclusive to that particular lifestyle demographic. For instance, both a college student and an experienced professional may be go to the gym. As will be further detailed below, a user can interface with the software application by inputting an event, such as "work," With other inputs, the software application can compile one or more outfits for that selected event. For instance, based on user input and a leaned relationships from a predefined data sets. The selected event can be stored as event data 170. Event data 170 may also information related to the geographic location for a given event and travel plans.

User network data 180 is data that indicate associations among multiple users within asocial network 40. For example, assuming one hundred (100) total users identified sequentially as user 1, user 2, and user 3 . . . user 100. User 1's network data 180 includes an electronic indication that user 1 has self-associated with user 3, user 5, user 70 and user 99, and further that user 3, user 5, user 70 and user 99 have all reciprocated that association with user 1. User network data 180 may be used by the software application to associate a communications link among the networked users. Furthermore, the software application, based on user network data 180, can permit access to each other's virtual wardrobe data. User network data may include access rights for each user, operation notifications, pending and accepted invitations, etc.

Weather data 190 is information related to the expected weather or climate conditions for a given event or occasion. Weather data 190 may be received from external data sources via a communications network. In an embodiment, weather data 190 includes a predicted temperature, range of exacted temperatures for a given day of the event, prediction of expected precipitation, and type of precipitation. Weather data 190 may be used to suggest outfits for a given event or for specific travel plans.

Figure 3B:
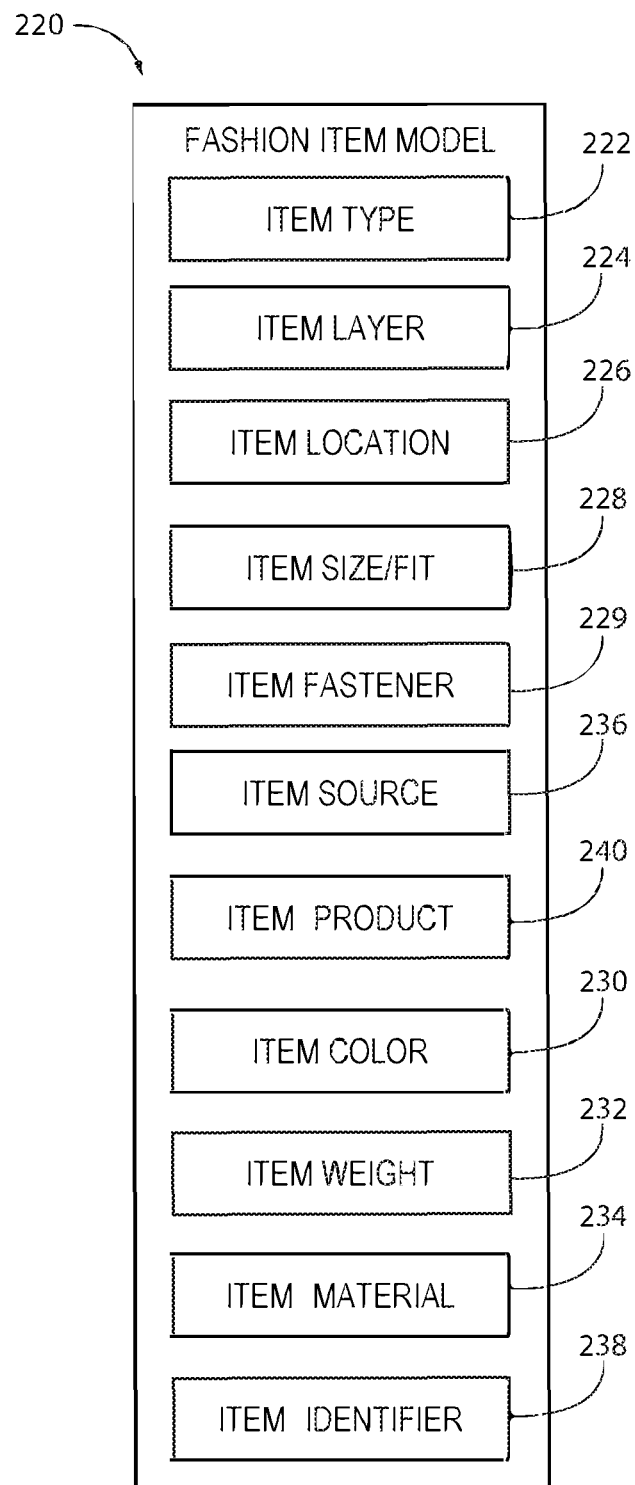
FIG. 3B is a schematic diagram illustrating a fashion item model according to an embodiment of the present disclosure.
Figure 3C:
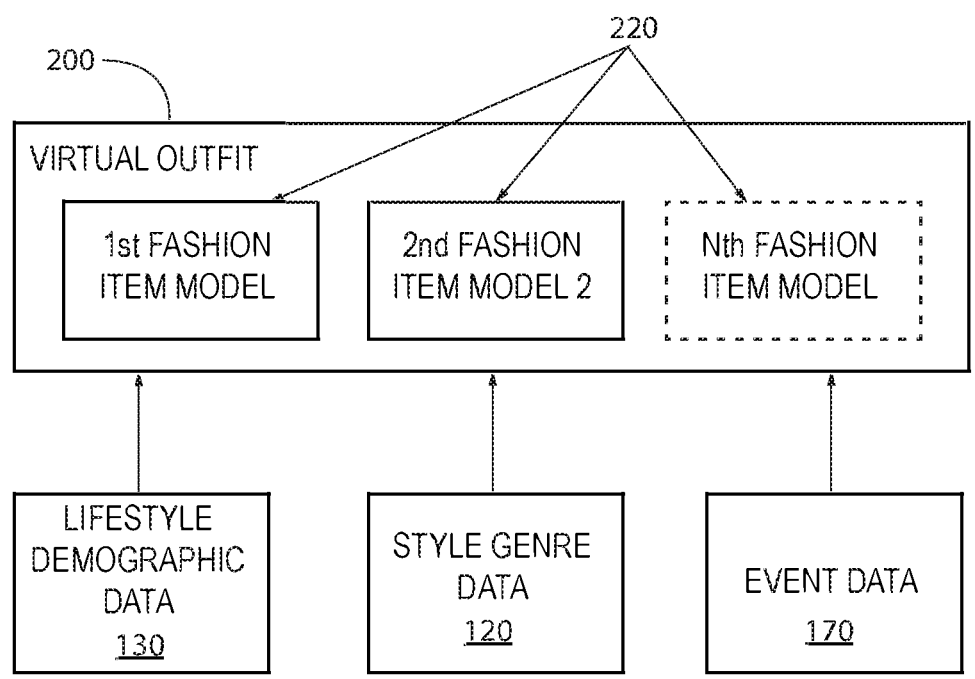
FIG. 3C is a schematic diagram illustrating data inputs used to compile a virtual outfit based on the fashion item model illustrated in FIG. 3B.

Fashion item model 220 is a virtual representation of a physical item of clothing, accessory, or footwear. The fashion item model 220 can be in stored in the database in any number of data forms or types that represent aspects of a physical item of clothing, accessory, or footwear. Turning to FIG. 3C, the fashion item model 220 can include one or more of: an item type 222, item layer 224, item location 226, item size 228, item color 230, item weight 232, item component material 234, item source 236, and a unique item identifier 238. The software application 30 compile and cause the display of at least one virtual outfit on the computing device 20 via the user interface 28 based one fashion item model 220 and other user inputs, e.g. style genre preferences and occasion. Details concerning how virtual outfits may be compiled are described below. In one embodiment, the fashion item model 220 includes an item type 222, item size 228, and item color 230. At least a subset of several fashion item models or fashion items (or all fashion items) are also associated with one or more electronic tags referred to herein as fashion item tags. The fashion item electronic tags may be related to a style genre and or lifestyle demographic.

Item type 222 is an electronic indication of a broad type of garment or fashion item. The item type 222 includes broad categories of fashion items such as an undergarment, top, bottom, swimwear, dresses, outerwear, footwear, and accessories. Each category of fashion item can be further subcategorized. In some embodiments, each item is associated with a specific item type that may include one or more of the descriptors detailed below and set forth in the enclosed appendix. Accordingly, the fashion item type 222 includes an electronic indication that a particular item is an undergarment. In some instances, the electronic indication may also include whether the item of clothing is underwear, brassiere, or an undershirt.

Furthermore, the fashion item type 222 may include an electronic indication that a particular item is a top. In some instances, the electronic indication that an item is a top can also identify that top as a specific type of top. Top types include, but are not limited to, a t-shirt, tunic, polo shirt, henley, sweater, sweatshirt, cardigan, tank-tops, camisoles, blouse, bustier, smock, oversized blouse, overblouse, pullover, wrap, collared shirt, vests, suit coat, sport coat. Any of the tops can be associated with a variety of necklines, including, but not limited to, jewel, "V", cardigan, "U", slit, square, scoop, florentine, horseshoe, boat, sabrina, one-shoulder, keyhole, surplice, sweetheart, halter, décolleté, off-the-shoulder, plunging strapless, funnel, gathered, banded, bib, yoke, cowl, halter, spaghetti strap, asymmetric, bateau, queen anne, illusion, and grecian, among others. Certain collared tops can be associated with variety of with collar types, including, but not limited to, chelsea, Johnny, pointed flat, peter pan, puritan, wing, shawl, notched, convertible, shirt collar, mandarin, bib, ruffle, tie neck, jabot, cascade, crew, turtleneck, choker, medic, cossack, clerical, turtleneck, mock-turtleneck, traditional high-stand collar, spread, button down, barrymore, pion, swallow tailed, tab, and buster brown, among others. Any of the tops can be associated with a variety of sleeve lengths, including, but not limited to the armseye, drop shoulder, cap, short, elbow-length, bracelet, long, and angel. Sleeves can have be associated with number sleeve variations, such as set-in, shirt sleeve, fitted, bell, barrel, butterfly, roll-up, bishop, button-tab, puffed, balloon, leg-o-mutton, petal, circular cap, melon, Juliet, lantern, kimono type sleeves, and raglan sleeves. Any of the tops with sleeves can be associated with a variety of different cuffs, such as roll-up, barrel, French, knit, and band, among others.

As noted above, the fashion item type 222 may include an electronic indication that a particular item is a bottom. In some instances, the electronic indication that an item is a bottom can also identify a specific type of bottom. The bottom type is one of a pant, a short and a skirt. Any of the pants can be associated with variety of pant types, including but not limited to, straight, skinny, tapered, boot cut, flare, wide leg, pegged, blue jeans, cargo, pleat front or flat, chinos, khakis, suit pants, leggings, jeggings, among other pants. Any of the shorts can be associated any short type that includes, but is not limited to hot pants, daisy dukes, regular, Bermuda, gauchos, pedal pushers, capris, and other shorts. Skirts can include straight, pencil, A-line, slit, cowl, 8-panel gore, godet, flounce, trumpet, pleat, prairie, layered, tulle, round, handkerchief, wrap, paceo, sarong, bubble, mini, and other skirts.

Item type 222 can also include an electronic indication that a particular item is a dress. In some instances, the electronic indication that an item is a dress can also identify a dress type. Dress types include, but are not limited to, a chemise, float, A-line, wedge, sheath, body con, trapeze, empire, halter, 1-shoulder, apron, juniper, sun dress, wrap, pouf, slip, Qi pao, shirt dress, maxi, ball gown, tent, princess, caftan, asymmetric, coat-type, pant-type, bell, balloon, Charleston, princess, juniper, A-dress, H-dress, I-dress, T-dress, V-dress, X-dress, or Y-dress. The aforementioned lists of item types are not exhaustive.

The fashion item type 222 can also include an electronic indication that a particular item is swimwear. In some instances, the electronic indication that an item is a swimwear can also identify swimwear type. Swimwear types include, but are not limited to, one-piece, tankini, two-piece, or bikini.

The fashion item type 222 can also include an electronic indication that a particular item is footwear. In some instances, the electronic indication that an item is footwear can also identify a type of footwear. Footwear types may include socks, boots, pumps, flats, and other typical footwear types.

The fashion item type 222 can also include an electronic indication that a particular item is an accessory. In some instances, the electronic indication that an item is an accessory can also identify a type of accessory. As used here, accessory type may include a head covering, a bag or purse, scarves, neck tie, watch, and jewelry.

Item layer 224 is an electronic indication of a garment or adornment layer relative to skin. The item layer 224 can be associated with each garment or item type. Exemplary item layers 224 are listed in table 1 below with reference to what layer is immediately beneath item layer 224.

TABLE 1

Exemplary Items Layers and Relative Locations

| Item Layer 224 | Layer Below |
|---|---|
| Skin Adornment | (none = skin) |
| Under | Skin Adornment |
| Under Adornment | Under |
| Base | Under Adornment |
| Base Adornment | Base |
| Cover | Base Adornment |
| Cover Adornment | Cover |
| Over Cover | Cover Adornment |
| Over Cover Adornment | Over Cover |
| Outer | Cover Adornment |
| Outer Adornment | Outer |

Each layer can be associated with a particular garment or item type to indicate where on a human form that garment type is typically worn or located. The software application 30 can build a virtual outfit based on the fashion item model 220 and its associated layer data. For instance, a virtual outfit can be displayed with a shirt and jacket combination with the jacket layered around the shirt similar to how jackets are physically worn by the user.

Item location 226 is an electronic indication of a part or portion of the human form. The item location 226 for a garment item is specific to a part of the human body. For instance, a t-shirt (garment item and type) is for a torso. Item locations may include indications or descriptors for a plurality of zones or parts of the human form. Exemplary zones of the human form include head, neck, torso, upper limbs, hands, front torso, back torso, waist, lower limbs, ankles, and feet.

Item sim/fit 228 is an electronic indication of the fashion items indicated size. In some instances, the item size 228 may also include an indication of the user's assessment of the garment fit. In many cases, garment fit varies across garment manufacturer. For instance, J. Crew brand skirt indicated as a size 6 may not fit the same as a skirt indicated as a size 6 from H&M. In accordance with one embodiment the item size and fit data 228 may include an electronic indication of the fashion's labeled size, such as 6, 7, etc. Furthermore, the fashion item fit data may also include an electronic indication of the "standard fit" of the fashion item reflected as fit relationship. The fit relationship data may be a value, factor, multiple, or matrix of how a fashion item's labeled size relates to the fashion item's standard size. The standard size may be based on a number of different size determination schemes as further described below. Furthermore, the application is configured so a user may grade a particular item's fit relative to their body size and type. In this way, the application can compile fit data that may be indicative of the item fit and size data.

As noted above, several methods may be used to determine the standard size as used herein. In one embodiment the size determination scheme may include measurements between a plurality of pairs of points associated with different locations of the fashion item or garment, such as neck-line center, lower hem, sleeve hem, etc. The plurality of the pairs of points define a spatial arrangement with respect to each other that corresponds to a particular garment size. The spatial arrangement is defined, at least in part, by an intra-pair distance, i.e. the distance between points in the individual pair. Furthermore, various pairs of the points can be separated by an inter-pair distance, which is the distance between two specific pairs of points. The spatial arrangement used to define a standard size is similar to the wire frame garment model described below. In another embodiment, the size determination scheme can be based on a selected standard as set by standard organization. For instance, the standard size determination scheme can be based on ISO 3635:1981 Size designation of clothes—Definitions and body measurement procedure; ISO 3636: 1977, Size designation of clothes—Men's and boys outerwear garments; ISO 3637: 1977, Size designation of clothes—Women's and girls outerwear garments; ISO 3638: 1977, Size designation of clothes—Infants garments; ISO 4415: 1981, Size designation of clothes—Mans and boys underwear, nightwear and shirts; ISO 4416: 1981, Size designation of clothes—Women's and girls' underwear, nightwear, foundation garments and shirts; ISO 4417: 1977, Size designation of clothes—Headwear; ISO 4418: 1978, Size designation of clothes—Gloves; ISO 5971: 1981, Size designation of clothes—Pantyhose; ISO 7070: 1982, Size designation of clothes—Hosiery; ISO 8559:1989 Garment construction and anthropometric surveys—Body dimensions; ISO/TR 10652:1991 Standard sizing systems for clothes, all of which are published by the International Standard Organization. Each ISO standard listed above are incorporated by reference into this document. Other size determination schemes may be based on EN 13402-1: Terms, definitions and body measurement procedure; EN 13402-2: Primary and secondary dimensions; EN 13402-3: Size designation of clothes. Body measurements and intervals (2004); and EN 13402-4: Coding system (2006), all of which are issued by the European Standards Organization (CEN). Each EN standard listed above are incorporated by reference into this document. Other standards may be used as well, such as ASTM D5585-95, 2001, Standard Table of Body Measurements for Adult Female; ASTM. D6829-02, 2008, Standard Tables of Body Measurements for Juniors; ASTM D5585-11, 2011, Standard Tables of Body Measurements for Adult Female Misses Figure Type, Size Range 00-20; ASTM 16240-98, 2006, ASTM D6240-98 Standard Tables of Body Measurements for Men Sizes Thirty-Four to Sixty (34 to 60); ASTM D6458-99, 2006, Standard Tables of Body Measurements for Boys, Sizes 8 to 14 Slim and 8 to 20 Regular; ASTM D6960-04, 2004, Standard Table of Body Measurements Relating to Women's Plus Size Figure Type. Sizes 14W-32W, all of which as issued ASTM International.

Item fastener data 229 is an electronic indication of the fashion item fastener mechanism, including its type and location.

Item source data 236 is an electronic indication of the manufacturer or brand or retailer that offers a product for sale. For instance, the item source 236 may include an electronic indication that a particular fashion items is made and sold by J. Crew, Zara, H&M, Forever 21, etc. Item source information may include price of a fashion item, size of the item, source image(s), optionally the item SKU, web code, product code, style number, article number, hyperlink/URL of the product from a specific source, quantity on hand, etc. Products and sources are independent. In other words, as noted below, a product can have many different sources.

Item product 240 is information related to a product. A product is actual fashion item, e.g. a clothing item with color and size data, a specific shoe, etc. The product may also include product information, such as descriptive tags, brand, keywords, actual product images. URL for $3^{rd}$ party website, etc. A silhouette of fashion item (or fashion item model) can have many different products as that term is used here. A product can have many different sources (item 236).

Item color scheme 230 is an electronic indication of one or more colors. The electronic indication can include a combination of RGB values for any indicated color or colors for a give fashion item. Furthermore, RGB color data for each item can also be associated with a specific Pantone color number for that item. The color scheme 230 can also include an arrangement of different colors, such as color patterns.

Item weight 232 is an electronic indication of the items mass. The weight can be a relative value, such as a light, medium, and heavy. And each relative value can be associated with particular range of values for weight. For instance, the light value may include items with weight up to 453.6 grams (1 lb.). Medium values may range between about 454 grams up to 2.254 kilograms (about 5 lbs). Heavy values range above about 2.254 kilograms (about 5 lbs). Alternatively, item weight can be specific weight for that a particular items. For instance, a t-shirt may have a mass of about 250 total grams. The software application 30 can use item weight 232 to plan outfits for travel planning purposes, as will be further described below.

Item component material 234 can bean electronic indication of the item material. The material type can be a fabric descriptor, such as woven or knit. Furthermore, material types can be further categorized by specific fabric structures, such as sheer, rib knit, denim, twill, satin/sateen, linen, seamless knit. Item component material 234 may also include an electronic indication of the yarn structure, filament or spun or specific fiber type of a fiber blend percentages, such a cotton, wool, polyester, nylon, silk, rayon, or other fiber types.

Item identifier 238 is a unique electronic identifier or code for the fashion item. The unique code is a collection of alphanumeric characters; a collection of numbers, letters, and/or symbols; an image; a linear one-dimensional code (e.g. Universal Product Code (UPC) or EAN code); or a matrix two-dimensional code (e.g. QR Code). Furthermore, the unique code can be a Global Trade Item Number (GTIN) and may be associated with a Global Location Number (GLN), which can identify a manufacturer. The GTIN and GLN numbers may be used in accordance the GSI Standard Specification, Version 15, published in January of 2015, by GSI, and his incorporated by reference into this document in its entirety. GTIN and GLN's may be an Electronic Product Code (EPC). The EPC is syntax for unique identifiers assigned to physical objects, unit loads, locations, or other identifiable entities. EPCs have multiple representations, including binary forms suitable for use on Radio Frequency Identification (RFID) tags, and text forms suitable for data sharing among enterprise information systems.

Wardrobe data may include an electronic indication of how one or more of the data components relate to each other. As discussed above, each lifestyle demographic type is associated with one or more lifestyle electronic tags, each event is associated with one or more electronic event tags, and at least a subset (up to all) of the fashion item models or fashion items are associated with one or more electronic fashion item tags. Several electronic tags may be common to each lifestyle demographic, event and fashion item. An aggregation of common electronic tags among the lifestyle demographic tags, the fashion item tags, and event tags, indicates an association between a particular style genre and the fashion item tags, and thus a fashion item. The strength or weakness of the associations as reflected in greater or more common tags can be used to aid compiling virtual outfits in the methods described herein.

Referring now to FIG. 3C, the software application 30 (not shown in FIG. 3C) can compile a virtual outfit 200 based on the user's demographic data 110, style genre data 120, and event data 170. In one example, the virtual outfit is compiled based on learned relationships derived from pre-defined virtual outfits 250. Each virtual outfit 200 includes at least one fashion item model 220, up to multiple fashion item models 220. As illustrated, virtual outfit 200 includes a first fashion item model, a second fashion item model, up to a $N^{th}$ fashion item model. Each fashion item model includes a position that comprises an item layer 224 and item location 226 (FIG. 3B), that help define the fashion items model spatial location on a part of the human form. Human form parts include, but are not limited to, the head, neck, upper body (including torso and upper limbs), torso, upper limbs, lower body (including waist and lower limbs), lower limbs, ankle, and feet. Other descriptors can be used as well. Accordingly, the virtual outfit 200 may include fashion item models 220 for a top or upper body garment, a bottom or lower body garment, an outerwear item, an undergarment item, footwear, and an accessory. In another example, the virtual outfit 200 may include fashion item model 220 for a dress and a fashion item model 220 for footwear. Table 1 above includes exemplary layer data for fashion items. In an example where the software application compiles a virtual outfit 200 that includes a) a red knit, cotton, long-sleeve t-shirt, b) a pair dark blue skinny jeans, and c) a grey blazer, the position data for each fashion item model defines the location on the intended part of on the human form and the fashion item's respective layer. Table 2 below includes exemplary fashion item models for a virtual outfit.

TABLE 2

Exemplary Fashion Item Position for Virtual Outfit

| Fashion Item Model | Position (Location, Layer) |
|---|---|
| long-sleeve t-shirt, red, knit, cotton | upper body, base |
| pants, jeans, skinny, dark blue, denim | lower body, base |
| jacket, blazer, grey, cotton | upper body, cover |

Figure 3D:
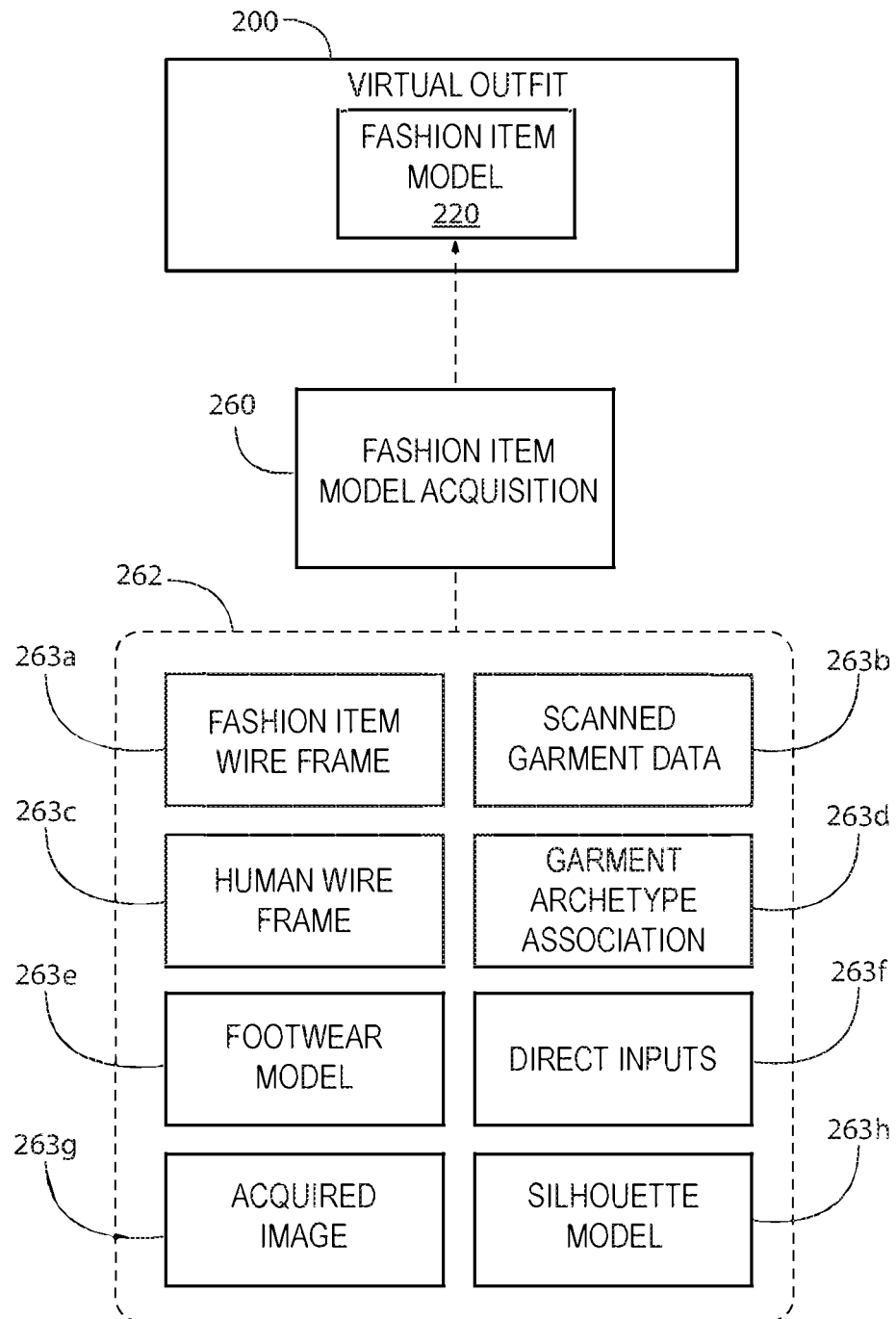
FIG. 3D is a schematic diagram illustrating data operations and inputs used to generate the fashion item model.

Continuing with FIG. 3D, each virtual outfit 200 includes one or more fashion item models 220 that are generated utilizing an item model acquisition scheme 260. The item model acquisition scheme 260 can generate the fashion item model 220 and its component data (see FIG. 3B) for display via the user interface 28 of the user's computing device 20. Several item model acquisition schemes 260 are available including: a wire frame model scheme 262a; scanned fashion item data 262b; human wire frame model scheme 262c; fashion item archetype association 262d; footwear model scheme 263e; direct user input 262f; an acquired image scheme 262g; and a silhouette model scheme 263h. Typically, one item acquisition scheme is used to compile fashion item model 220. However, several different schemes may be used. In one embodiment, the software application 30 can utilize a wire frame model scheme 262a to compile fashion item models, as will be further detailed below. In one embodiment, the wire frame model scheme 262a can be used in combination with the footwear model scheme 263g. In other embodiments, the software application 30 can utilize scanned fashion item data schemes 262b to compile fashion item models. In still other embodiments, certain schemes may be used in combination with others. For instance, in one embodiment, the garment wire frame model scheme 262a can be used in combination with direct user input 262f.

Figure 4:
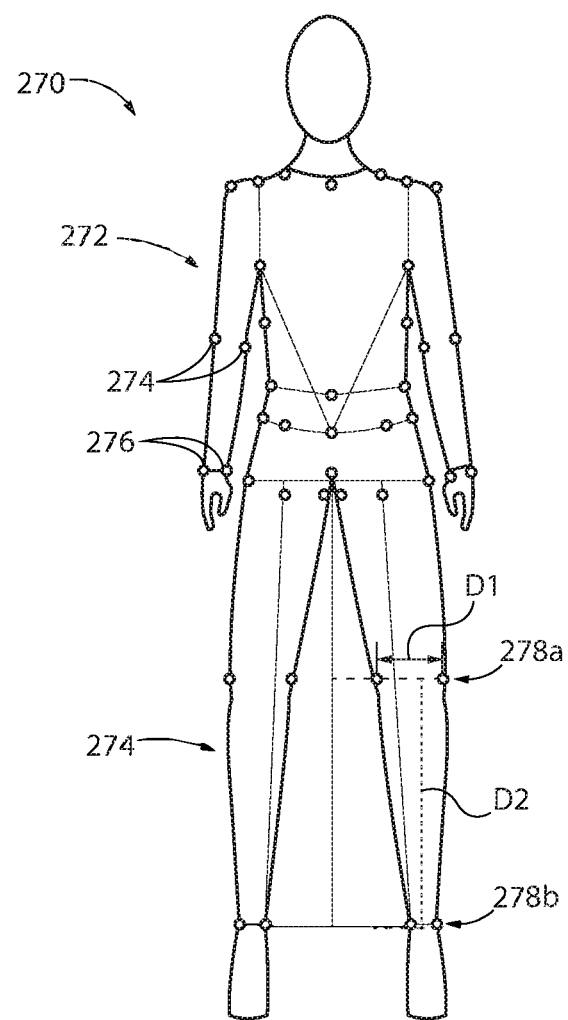
FIG. 4 illustrates a fashion item wire frame model according to an embodiment of the present disclosure.

Turning to FIGS. 3D and 4, the wire frame model scheme creates a wire frame 270 for the particular zone the human form that is associated with a fashion item. As shown in FIG. 4, the wire frame 270 includes an upper body wire frame 272 and a lower body wire frame 274. Each wire frame can be comprised of a plurality of pairs of points 274, 276, etc. Each pair of points is associated with a different location on the human form. The plurality of the pairs of points define a spatial arrangement with respect each other that corresponds to particular garment item type associated with a part of the human form. The spatial arrangement is defined, at least in part, by an intra-pair distance D1, i.e. the distance between points in the individual pair. Furthermore, various pairs of the points can be separated by an inter-pair distance D2, which is the distance between two nearby pairs of points, for example point pairs 278a and 278. The inter-pair distance D2 can be the distance that extends A) from a first line that passes through each point in a first point pair 278a and a second line that passes through each point in a second point pair 278b, and B) extends along a axis that intersects first and second lines equidistant between the respective points in the first and second point pairs 278a and 278b, respectively. Most garments can be defined by a given relationship among the various point pairs. An application can be used to compile a wire frame 272 (or 274) based on the predetermined relationship among the pairs and their association with a particular a garment. For example, garments may be defined by a compilation of two spaced apart points that are within a particular region or zone of the human body, such as neck, shoulder, wrist, bust, etc. The wire frame model can adjust the intra- and inter-pair distances to recreate any given garment based on relationships between a given sets of point pairs. Once a wire frame is compiled, the software application 30 can build solid layers between adjacent point pairs. Furthermore, the software application 30 can layer the fashion item type and item color scheme on the wireframe model. Other component data, such as size/fit, component material information can be associated with each wire frame model to recreate the virtual fashion item. The virtual fashion items can be used as the fashion item models described above.

In another example, the software application 30 includes a scanned fashion item data scheme 262b examples of which are illustrated in Figures SA-5C. For example, the software application can generate fashion item models based on scanned or received garment data at a retail point-of-sale (POS) system 50. In Figure SA, the computing device 20 compiles fashion item data from an electronic tag 70 (or e-tag) associated with a code that is unique to fashion item 60. When the garment 60 is purchased at the retail POS 50, the computing device 20 can scan or read the electronic tag 70 in order directly or indirectly obtain relevant fashion item data. The software application 30 can utilize the received/scanned fashion item data to build the fashion item model 220 for that particular garment 60.

The unique code can be: a collection of alphanumeric characters; a collection of numbers, letters, and/or symbols; an image; a linear one-dimensional code (e.g. Universal Product Code (UPC) or EAN code); or a matrix two-dimensional code (e.g. QR Code). Furthermore, the unique code can be a Global Trade item Number (GTIN) and may be associated with a Global Location Number (GLN), which can identify a manufacturer. The GTIN and GLN numbers may be used in accordance the GSI Standard Specification, Version 15, published in January of 2015, by GSI, and his incorporated by reference into this document in its entirety. GTIN and GLN's may be an Electronic Product Code (EPC). The EPC is syntax for unique identifiers assigned to physical objects, unit loads, locations, or other identifiable entities. EPCs have multiple representations, including binary forms suitable for use on Radio Frequency Identification (RFID) tags, and text forms suitable for data sharing among enterprise information systems. The unique code can therefore be configured to include fashion item data therein. Alternatively, the software application can associate the unique code for the garment 60 with one or more data fields concerning the garment that are maintained in a garment database (not shown). Such a garment database may include all the fashion item data described above, in addition to additional data, such as garment country of origin, brand style numbers, among other data related the garment 60.

Continuing with Figure SA, in one embodiment, the electronic tag 70 can be an electronic device with a memory that includes a unique garment code stored in the memory. For example, the electronic tag 70 may be an RFID chip, transmitter, embedded memory device, or other component that can be attached to or built directly into the components of the garment. In other embodiments, the electronic tag 70 can be the unique code disposed on the garment or a garment label. For example, the electronic tag 70 can be printed directly to the garment component material with conductive inks and/or pigments. In yet another example, the electronic tag 70 can formed into the structure of the fabric with conductive yarns and the like. Regardless of what type of electronic tag 70 is used, that electronic tag 70 can be disposed along any component or location of a garment. In an example, the electronic tag 70 can disposed along a garment label. In another example, the electronic tag 70 can disposed along a garment hem, such as within the hem or adjacent to it.

Figure 5A:
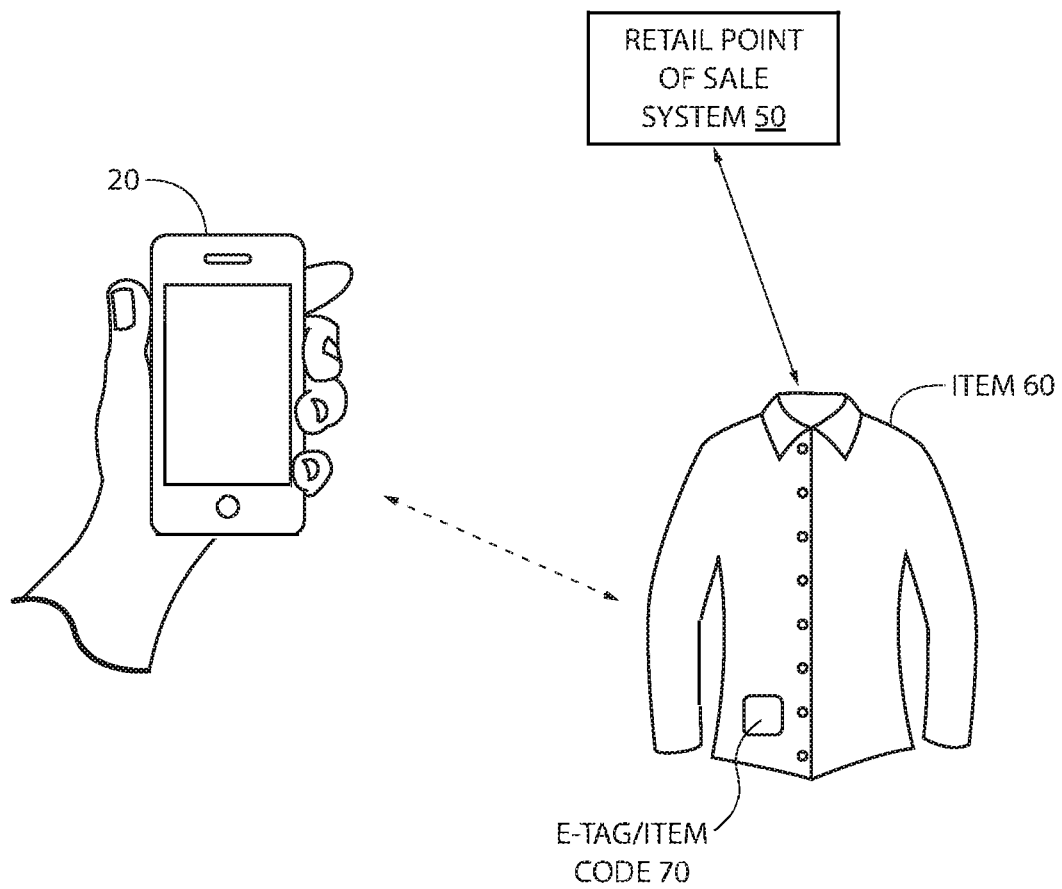
FIG. 5A is a diagram illustrating a system for scanning fashion item data at a retail point of sale according to an embodiment of the present disclosure.
Figure 5B:
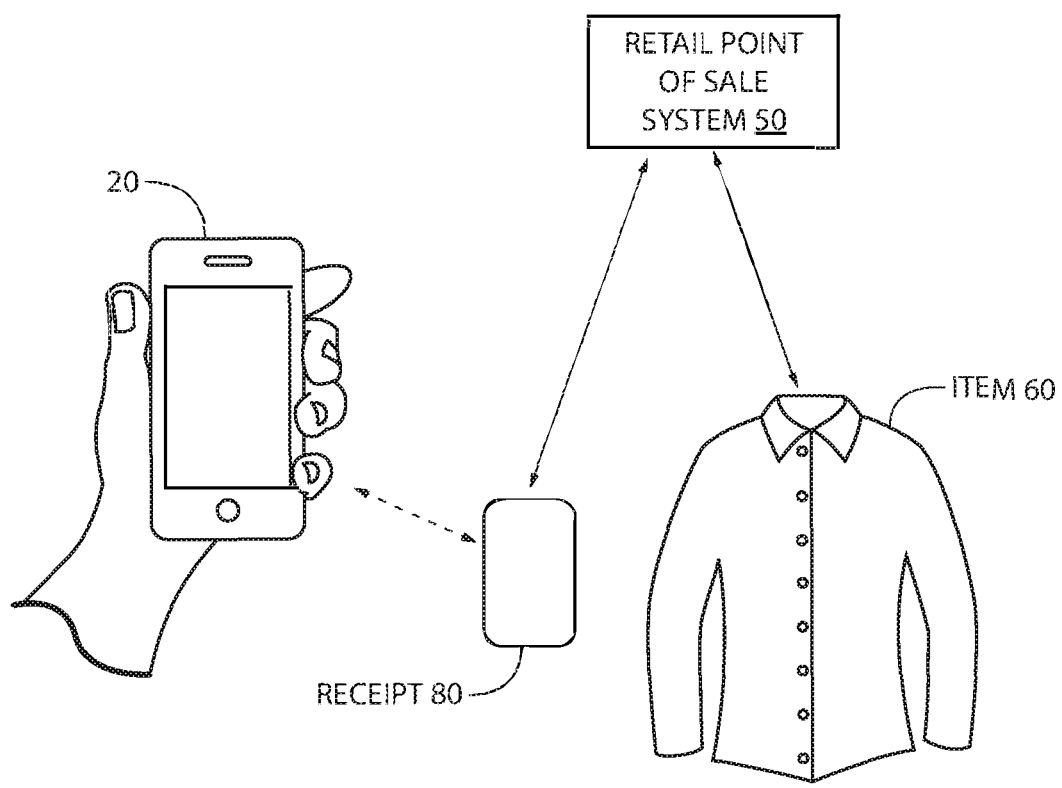
FIG. 5B is a diagram illustrating a system for scanning fashion item data at a retail point of sale according to another embodiment of the present disclosure.

Turning to FIG. 5B, the computing device 20 can collect data regarding the garment 60 by scanning a receipt 80 the user receives at the retail POS system when purchasing the garment. The computing device 20 includes a scanning application that scan the unique code printed on the sales receipt. The software application 30 processes the scanned code into data components for the fashion item model 220 as described above.

Figure 5C:
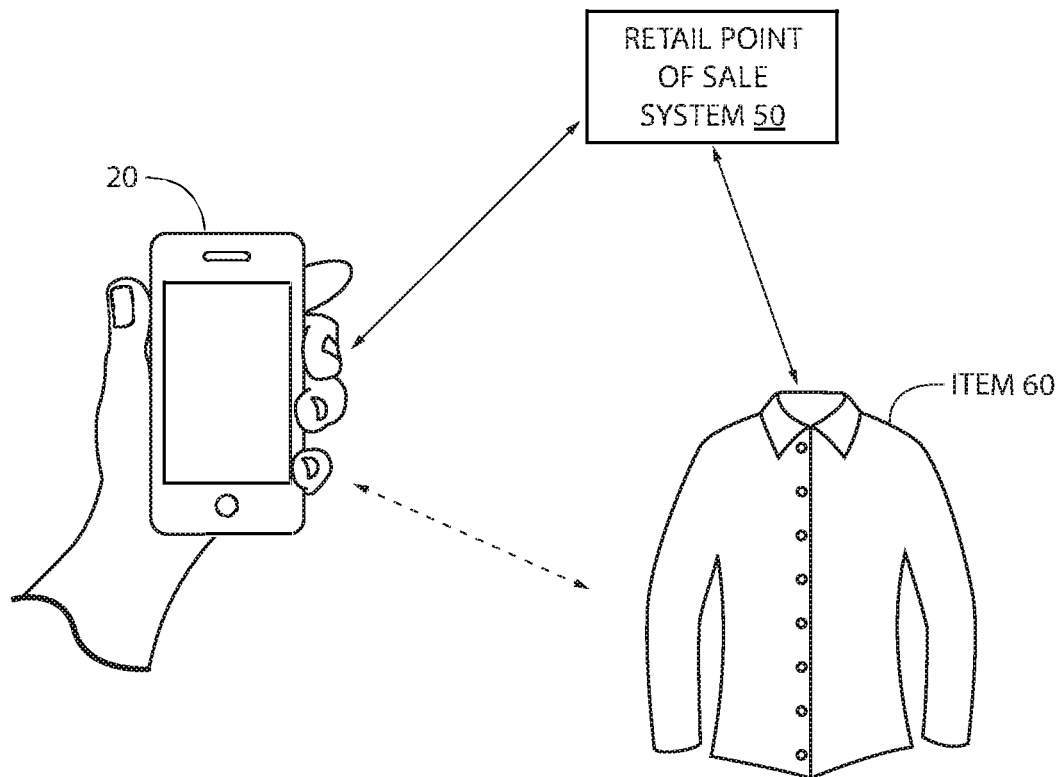
FIG. 5C is a diagram illustrating a system for transmitting fashion item data between a retail point of sale and user computing device according to another embodiment of the present disclosure.

In FIG. 5C, the retail POS system 50 can transmit fashion item data directly to the computing device 20 regarding the garment 60 purchased at the retail POS.

Referring back to Figure SA, the electronic tag 70 can be configured as a transmitter that can transmit signals to the computing device 20 or other receiver, e.g. a receiver embedded in the user's closet or dresser. For instance, when the software application 30 suggests an outfit with garment item 60 and the user removes that item from the closet or dresser, the electronic tag 70 can sends a signal to the computing device 20. The software application 30 then stores an indication that that particular item 60 is being worn. The computing device 20 can store this data locally as usage data, and/or transmit that data to the server computing device 10 for storage in the database 100 as usage data.

Returning to FIG. 3D, the human wire frame model scheme 263c creates a human wire frame and layers fashion items onto the human wire frame model. The software application 30 can layer the fashion item type and the item color scheme on the fashion item wireframe. Other component data, such as size/fit, component material information can be associated with each wire frame model to recreate the virtual fashion item. Human wire frame models typically require significant data sets and processing power and may not be suitable for all implementations of the software application as described herein.

The acquired image scheme 263g compiles images of fashion items from various sources. Acquired images may be derived or pulled from $3^{rd}$ party websites. Alternatively, acquired images may an image of a physical item of clothing taken via the user's camera on the user's computing device 20. Acquired image schemes may require additional direct input from the user regarding item data. Utilizing acquired images to create wardrobe data may not be advantageous or desirable for some users. For instance, acquired images may require additional user input that is cumbersome and time-consuming.

The archetype association scheme 263d creates fashion items based on a standard or predefined categories of garments archetypes. For instance, if the software application 30 determines that a pair of dark blue skinny jeans should be present as a possible virtual outfit, the software application associates the fashion items with a standard image or file type associated with blue jeans that have tapered or slim fit, and cause that particular garment item to be displayed via the user interface 28 of the computing device 20.

In other embodiments, item acquisition scheme may include direct input 263f of fashion item data by the user into the computing device 20.

e footwear model scheme 263g creates a footwear model. The footwear model scheme can create a footwear model based on 1) data regarding the footwear item, and 2) the relationship between footwear item data and a plurality of footwear item types stored in the computer memory. Footwear item data may be data regarding the footwear obtained from the user, a retailer, or other source. Footwear style type is a collection of footwear items with certain attributes. In one embodiment, the footwear style type is expressed as: Footwear Style(n)=CFT (A,E,C), where CFT (A,E,C) is a particular computed footwear type (CFT) for a given combination of footwear attributes A, E, and C, referred to below as first, second, and third footwear attribute respectively. Footwear Style (n) is one of n different footwear style types and is an array that contains the computed footwear types. Footwear style type is thus a broad range or collection of different types of shoes with one or more common attributes. A particular computed footwear type CFT is a particular or specific type of shoe. It should be appreciated that more than one computed footwear type CFT may be potentially represent in a given footwear style type (style (n)).

As described above, the computed footwear type (CFT) is a combination of first, second, and third footwear attributes, A, E, and C, respectively. The first attribute A is an angle of foot in the shoe or "foot angle." The foot angle is angle between a surface the shoe rests on and a line that passes through a point lying on the outer skin surface of the ball of the foot to a point lying on the outer skin surface of the heel of the foot. The angle between the surface and the line along a plane perpendicular to the surface is the foot angle. A second attribute E is referred to as the elevation of the foot in the shoe, or the "foot elevation." The foot elevation is the distance from the surface the shoe is resting on to a point on outer skin surface of the ball of the foot along direction that is perpendicular to the surface. A third attribute C is the surface area of coverage of the foot in shoe, or a "foot coverage ratio." The foot coverage ratio is non-dimensional ratio calculated as the surface area of a foot to the surface area of the shoe. The surface area of a foot is the surface of a volume of the foot up to the bisecting plane of the mid-ankle. A multidimensional matrix can contain ordinates for values of A, E and C. Ranges within this matrix can represent footwear style types. The application is configured to apply a given set of measured attributes A, E, and C, to the matrix of ordinates. The style(n) is determined based on how the given set of measured attributes match to the ranges of ordinate values in the matrix. The application can determine a footwear style type based on the footwear item data. As noted above the footwear item data can be actual measurements of the attributes A, E, and C for shoes in the user closets. Alternatively, the footwear item data can be based on shoe descriptions that are associated with a given set of attributes. In still other alternative embodiments, footwear item data can be data regarding the shoe obtained from the manufacture or retailer using unique codes or other data. Furthermore, each footwear style type may be associated with a style genre, lifestyle demographic, and/or an event. In conjunction with other method described herein, the application is configured to compile a footwear model based on the footwear style type, lifestyle demographic and event.

Figure 6A:
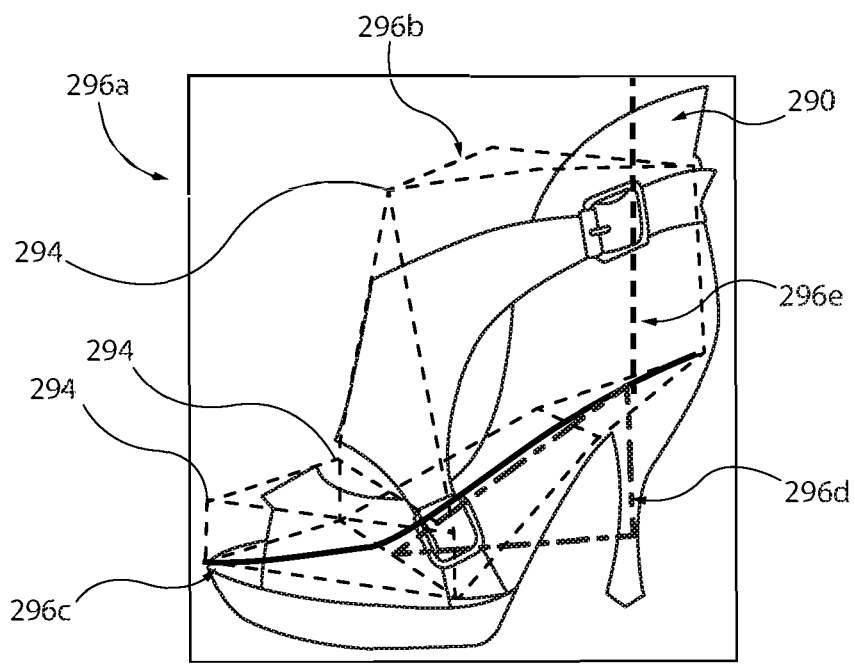
FIGS. 6A and 6B are diagram illustrating a footwear model according to an embodiment of the present disclosure.
Figure 6B:
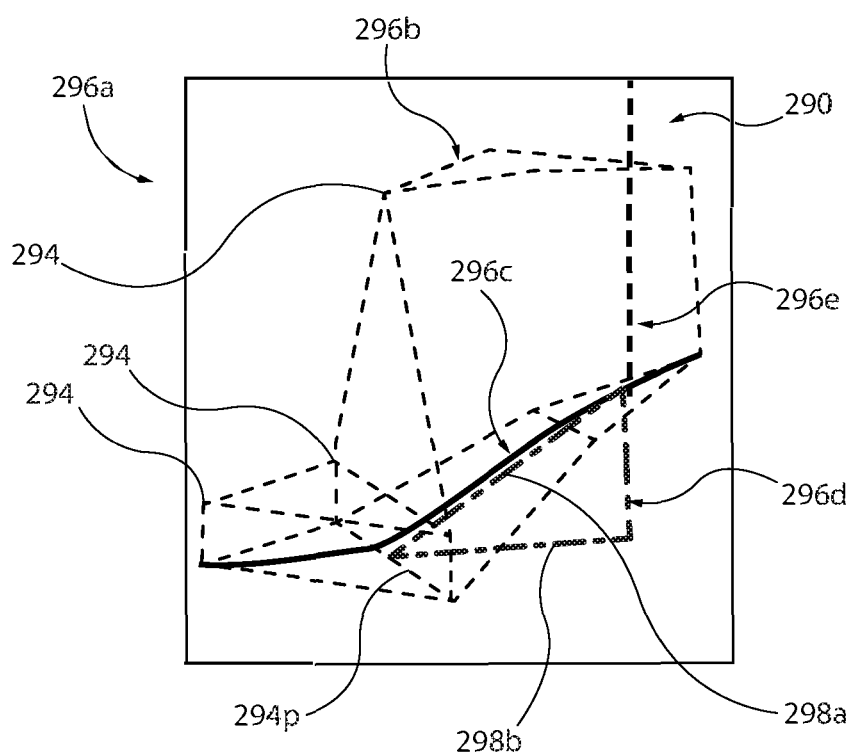

Another embodiment of a footwear model scheme is shown in FIGS. 6A and 6B. As discussed above, to generate a virtual outfit, the application associates a shoe with a lifestyle demographic, style genre, a selected event, and optionally a weather context, based on user inputs. The footwear item model 290 includes footwear data that aids in categorizing and sorting footwear items by a particular lifestyle demographic, style genre, and event (or weather). Accordingly, given a particular lifestyle demographic, style genre, and event, the application compiles a footwear items into a virtual outfit. The illustrated footwear model scheme includes a footwear item model 290. The foot wear item model 290 includes an image or representation 292 for a particular shoe, a plurality of points 294 that are associated with a 2D grid (not numbered, but similar to grid 362 described below), and plurality of footwear attributes 296 regarding the shoe, which are represented by the attributed indicators. FIG. 6A includes the shoe image 292, the points 294, and the attribute 29. FIG. 6B illustrates the attributes 296 and with the shoe image 292 removed for ease of illustration. The foot wear item model 290 is based, in part, on tags and/or data associated with a particular shoe, such as the category, sub-category, footwear item type. In particular, the footwear item type includes data that corresponds to one or more the attributes represented by the attributed indicators.

The footwear item model 290 includes various structural attributes 296a-296d of a shoe, represented by the plurality of attribute indicators. The attributes are define by a spatial arrangement among certain points 294 on the foot item model 290. This spatial arrangement, in turn, has a value or data set that is used to classifies a particular type of shoe irrespective of shoe size or perceived style. Reference number 296 may be used interchangeably with any one of the reference numbers 296a to 296d. The plurality of attributes includes a first attribute 296a(e.g. shown as the outer box), a second attribute indicator 296b (shown as the dotted line shape), a third attribute 296c (shown as a thick black line), a fourth attribute 296d (shown as the triangle with a dashed-dot-dashed lines), and a fifth attribute 296e (shown as the thick, dashed line).

The first attribute 296a represents the "extant" of the shoe image based upon 'flattening' the 3D perspective into a 2D. This is basically a cropping limit.

The second attribute 296b represents is a "foot length" within the shoe from the forward most point 298f of the toe, to the rearward most point foot. The foot length extends from a forward most point of the toe, through the ball, the mid arch and then the heel ending at the rear ward most point of the foot.

The third attribute 29c (shown as the dotted line shape) includes the points that represent the 3D form of the shoe fitting to the foot. It includes a surface of shoe bed, the inner surface of the shoe upper, a front extent that shoe extends toward a top edge of the shoe, and a rear extent that the shoe extends to a top edge of the shoe.

The fourth attribute 296d (shown as the triangle with a dashed-dot-dashed lines) represents the effective angle of the heel less the platform of the shoe to give the true angle of the heel and the actual heel height. The effective angle is thus defined by two lines 298a and 298b that intersect a point 294p at ball of the foot. The line 298a extends from the point 294p to a point on the heel, and the line 298p extends from a point 294p along a plane that the ball of the foot lies within, wherein the plane is normally parallel to floor. The effective angle is unlike the apparent heel height that is often used which is just a physical measurement of the heel from the floor.

The fifth attribute 296e (shown in thick dashed lines) is the shaft length of the shoe from the 3D center of the heel to the top extant of the shoe.

Another attribute may be the extent of skin coverage of a particular shoe. The value may be qualitative: full, medium, low; or quantitative based on a percentage of skin surface area of total surface area for the entire extant of the shoe. In one example, the attribute is the surface area of coverage of the foot in shoe, or a "foot coverage ratio." The foot coverage ratio is non-dimensional ratio calculated as the surface area of a foot to the surface area of the shoe. The surface area of a foot is the surface of a volume of the foot up to the bisecting plane of the mid-ankle.

Footwear item models 290 may include values for one or more of the attribute. Those values are indicative of a particular type of shoe and its structural features. Thus, categorization scheme for footwear is based, in part on the physical attributes represented by the attribute indicators 296. The scheme used to define the attributes in the footwear item model 290 can be equally used to define structural attributes of other fashion items, such as tops, bottoms, dresses, coats, jackets, etc.

Returning to FIG. 3D, the silhouette model scheme 263h can generates a visual fashion item models adjusted to a human form, which can be compiled into a virtual outfit that overlies the human form. The silhouette model scheme 263h is further illustrated in FIGS. 7A-7G. The silhouette model scheme 263h can scale, or adjust, an image of a fashion item to overly a human form model. In one example, the silhouette model scheme 263h can scale, or adjust, an image of a fashion item to overly 2D image human form model, such as silhouette. The silhouette model scheme 263h is designed apply a product image of a fashion item to a human form so that the fashion item is in the right location on the human form, has the right fit, and is positioned at the correct layer (base, cover, etc.). In accordance with the illustrated embodiment, the application utilizes electronic fashion item model information, a human form model 360, a fashion item model 220 and a grid 362 to associate the fashion item model with the human form model 360.

Figure 7A:
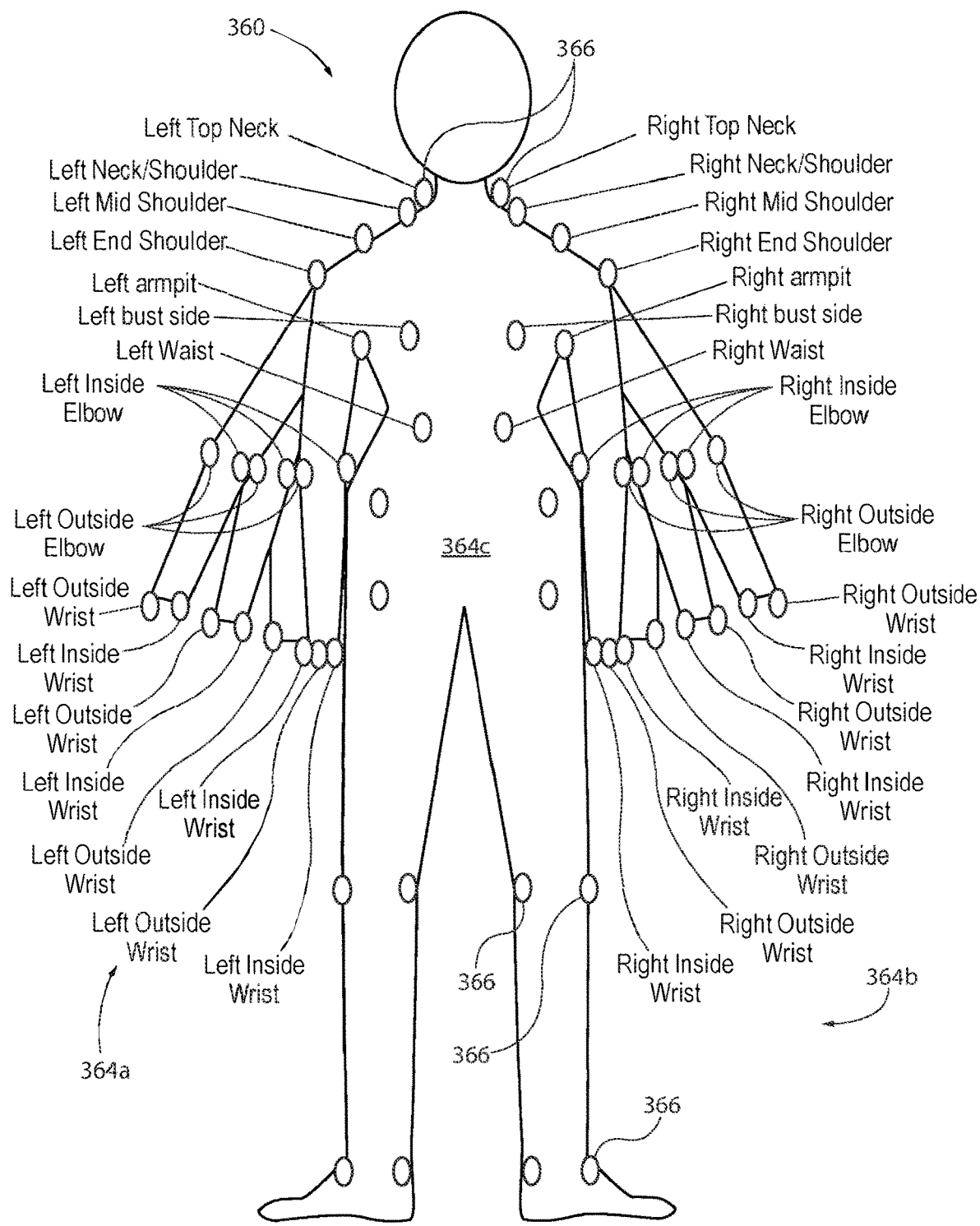

FIG. 7A is an example of the human form model 360 without the fashion items applied to it. The human form model 360 is indicative of a human form includes a plurality of spatial zones 364a-364c that correspond to a different parts or locations of the human form. The spatial zone 364a can be arms or a region, the spatial zone 364b are legs, spatial zone 364c is the torso. As illustrated, the human form model 360 is includes a plurality of points 366 that are associated with different spatial zones 364a-364c on the human form model 360. In accordance with the illustrated embodiment, the first plurality of points 366 in each spatial zone 364 (364 and 364a, 364b & 364c are used interchangeably) includes and a first spatial arrangement defined by the first plurality of points. FIG. 7A includes textual descriptions of each of the plurality of points on the human form model 360. The points include, for example, a right top neck, left top neck, right neck/shoulder, etc. The points 366 on the human form model have a defined relationship that is common to all body types. In one example each of the first plurality of points have a vector (distance and angle) relationship to 1) themselves and 2) relative location on the human form. The human form model 360 is described herein is one of many that are vector representations of multitude of human forms, male, female, adults, children. Other vector representations can be used in accordance with the inventive concepts as disclosed herein.

Figure 7B:
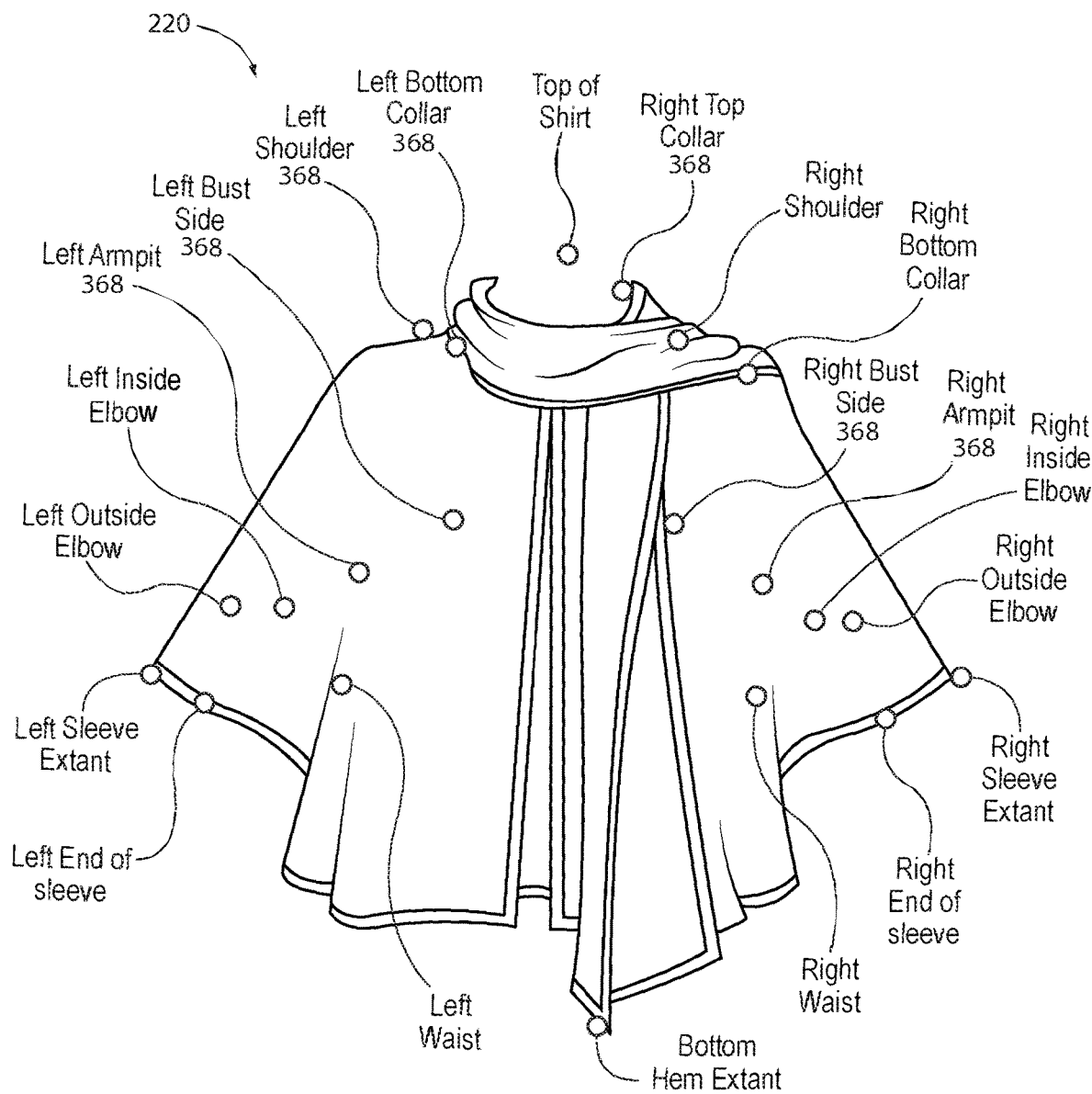

Each electronic fashion item model in the virtual outfit overlies a spatial zone 364 of the human form model 360. For instance, a shirt overlies a torso, pants overly the legs, etc. FIG. 7B is an example of the fashion item model 220. The illustrated fashion item model 220 also includes a plurality of points 368 that are associated with parts of the fashion item and locations on the human form the fashion item would likely fall. FIG. 7B includes textual descriptions of each of the plurality of points 368 on the fashion item model 220. The points 368 include, for example, a right shoulder, top right collar, left side bust, etc. In accordance with the illustrated embodiment, each electronic fashion item model 220 includes a second plurality of points 368 and a second spatial arrangement defined by the second plurality of points 368. The second spatial relationship corresponds to a fashion item type. The second plurality of points 368 have a vector (distance and angle) relationship to 1) themselves and 2) relative location on a human form.

As discussed herein, to generate a virtual outfit, the application associates a fashion item (e.g. a garment) with a lifestyle demographic, style genre, a selected event, and optionally a weather context, based on user inputs. The electronic fashion item model includes data that aids in categorizing and sorting fashion items by a particular lifestyle demographic, style genre, and event (or weather). Accordingly, given a particular lifestyle demographic, style genre, and event, the application compiles a fashion items into the virtual outfit. Each fashion item model includes a plurality of structural attributes that are representative of a fashion item. The structural attributes are defined by the spatial arrangement among points 368 on the fashion item model 220 discussed above. The structural attributes, and specific spatial arrangement, in turn, has a value or data set that is used to classify a particular type of fashion item irrespective of fashion size, dimensions, or perceived style. The plurality of structural attributes for the fashion item represented by the fashion item model 220 can be defined using the same scheme that is used to define structural attributes for the footwear model described above. Exemplary structural attributes for a top includes top extant, sleeve distance (or length), bust distance (or length), top coverage ratio, armpit to armpit distance, bottom hem lateral extant, neckline dimension, sleeve cuff dimension, collar vertical extant, collar horizontal extant, as well as ratios of any of these attributes. Exemplary structural attributes for a bottom include the bottom extant, pant length, pant end location, waist horizontal dimension, leg horizontal dimension along leg length (e.g. at thigh, knee, ankle), bottom coverage ratio, hip-to-hip dimension, pant leg bottom hem dimension, as well as ratios of any of these attributes. Exemplary structural attributes for a dress includes dress extant, sleeve indicator, sleeve distance (if any), bust distance (or length), dress coverage ratio, armpit to armpit distance, bottom hem horizontal extant, neckline dimension, collar vertical extant, collar horizontal extant, as well as ratios of any of these attributes.

Figure 7C:
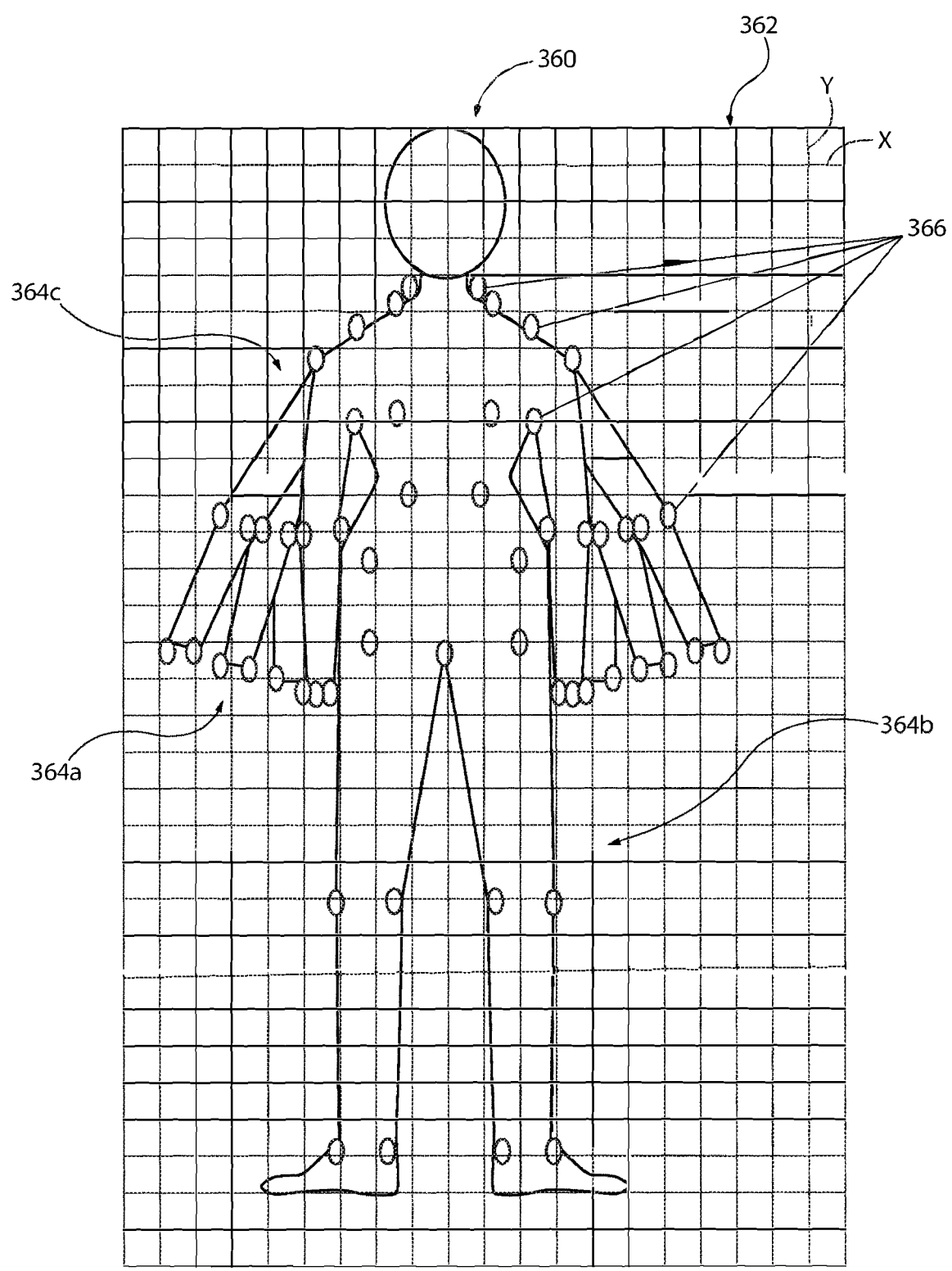
Figure 7D:
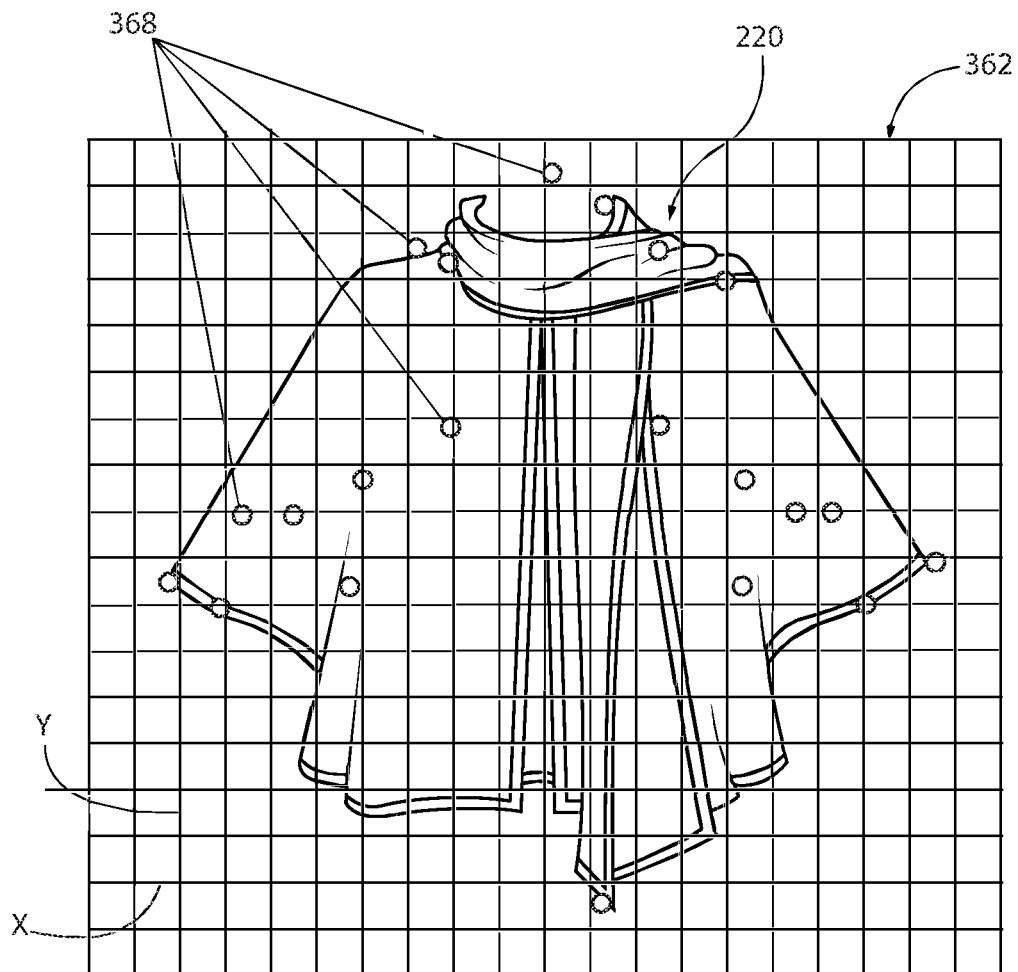

Referring to FIGS. 7C and 7D, the grid 362 is a two-dimensional grid defined by a plurality of X lines and a plurality Y lines that intersect the plurality of X lines. The first plurality of points 366 and the second plurality of points 368 each correspond to the grid 362. For example, each first point 366 has a X and Y coordinate, and each second point 388 has an X and Y component.

Figure 7E:
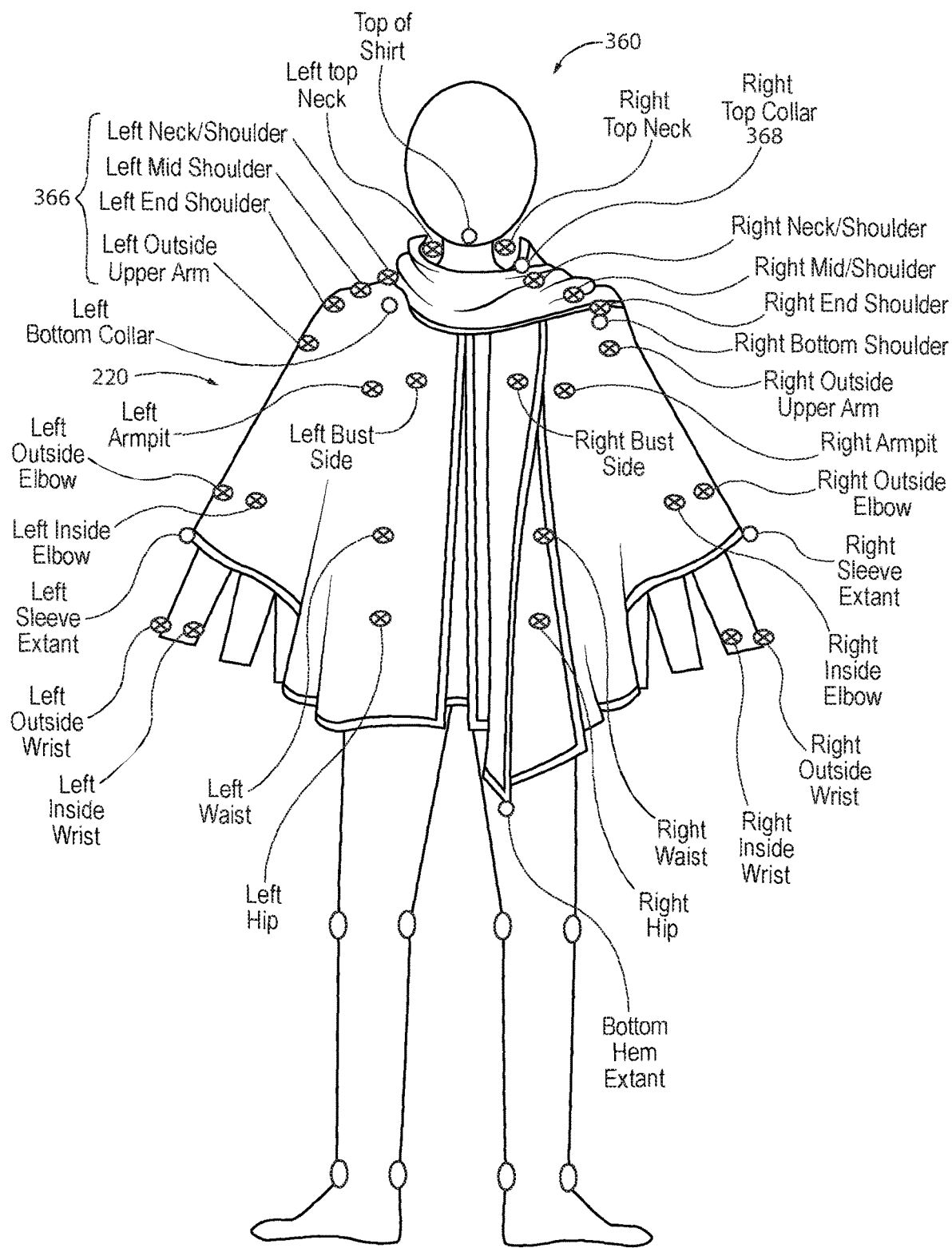

Referring to FIG. 7E, when a particular fashion item is "selected" by the system for a virtual outfit, data related to that fashion item is used to configure the fashion item onto the human form model 360. The grid 362 is used for this purpose. For instance, the system will associate a particular fashion item 220, including its points 368, with a particular set of lines and intersection points in the above grid 362. This association is also related to the points on the human form model 360, and can be used to manipulate (e.g. scale or warp) the fashion item for fit, style, etc., as will be explained further below. For example, a tight fitting tank-top would be associated with the lines and points that are closet fitting to the "cover layer" of the human form, the appropriate neckline, and the appropriate sleeve length line. The system can reconfigure an image the associated fashion item model 220 onto the lines/intersection points on the grid based on the data/tags associated with fashion item and the particular points on the human form model. The grids 362 are used to display the human form model and scale the product image on the user's computing device. Scale or scaling as used herein means manipulation or adjustment. The scaling described herein is used to manipulate a graphical image of fashion item both linearly (X-dimension and Y-dimension) and non-linearly (curved or warping) allow for the graphical images to fit properly on the human form model.

FIG. 7E illustrates the fashion item model 220 overlaid onto the human form model 360. In FIG. 7E, the first plurality of points 366 for the human form model are shown as small "x" inside a circle while the second plurality of points 368 are shown as black dots for schematically purposes. In accordance with the illustrated embodiment, the application determines an association between the second plurality of points and the first plurality of points, and in response to the determination, overly the electronic fashion item model onto the spatial zone of the human form, as shown in FIG. 7E. Furthermore, the application can adjust the second spatial arrangement based on the association between the first spatial arrangement and the second spatial arrangement, such that, each electronic fashion item model is fit to the body location of the human form model. The adjustment can be based on a determination of the relative spacing between the first plurality of points (the human form model) and the second plurality of points (of the fashion item model) along the two-dimensional grid. The adjustment can be both a linear adjustment (along either or both of the X-dimension and Y-dimension) and/or a non-linearly adjustment (curved or warping) to adjust the fashion item model to the human form model. In this way, as the underlying human form changes (over time or among different users), the electronic fashion items would also change with respect to how they fit on the human form. For instance, as the underlying human form model changes, the vector relationships among the first and second plurality of points allows the fashion item model to scale along with changes in the vector relationships. The manipulation mechanism (e.g. scaling or warping) is illustrated in FIGS. 7G and 7F. It should be appreciated the adjustment can include any manipulation mechanism, including scaling, warping, or other methods for adjustment.

As can be seen comparing FIGS. 7F to 7G, the fashion item model has been adjusted from the image shown in FIG. 7F to the image shown in FIG. 7G. As illustrated in FIG. 7G, the fashion item model has an initial height H1 that extends from the top item point TE1 to a bottom extent point BE1. The fashion item model has an initial width W1 that extends from the left extent point LE1 to the right extant point RE1. The application, however, adjusts the fashion item model to decrease both the height H1 and the width W1. In other words the spatial arrangement of fashion item has been adjusted to reduce the height H1 and the width W1. As shown, the adjusted height H2 is less than the initial height H1 (FIG. 7O). In addition, the adjusted width W2 is less than the initial width W1. In another example, if the fashion item is a loose fitting blouse, then the hip point(s) would likely be located away from the human form itself. For a narrow-waisted person, the hip points of the fashion item would be "away" from the body. If the human model is changed to a broader hipped person, the blouse would extend in those areas proportionally to a "proper" loose fit.

The silhouette model scheme 263h also uses layer data to overly the fashion items models correctly with respect to each other. As noted above, the electronic fashion item model includes a layer indication that associates the electronic fashion item model with a predetermined layer relative to the human form model. The predetermined layer as described above is one of an underwear layer, a cover layer, an outer layer, and an outer cover layer. Other layers can include, for example, a base adornment, cover, cover adornment, outer adornment, over cover, over cover adornment, skin adornment, under adornment, and underwear. In one example, plurality of body locations include a torso, legs, and feet, and the one or more electronic fashion item models includes a top, a bottom, a pair of shoes, a coat. The layer indication for each fashion item arranges the fashion items such that a) the top overlies the torso, b) the bottom that overlies the legs, and c) the pair of shoes that overly the feet, and the coat overlies a portion of the top.

The electronic fashion item model in the virtual outfit can be an image of a fashion item that overlies the spatial zone of the human form. Alternatively, the electronic fashion item model in the virtual outfit is a silhouette of a fashion item that overlies the spatial zone of human form. Various graphically trimming operations, scaling, warping, and modification of the constructed images can be used aid in developing the compiled fashion items models.

As illustrated, the system manipulates actual product images to fit over the desired human form. However, in alternative embodiments, the system can be configured to build a fashion item model based upon color information, material types, adornments information. Furthermore, it is possible, given a reference scale from the "human model form" to an actual human form, the system can compile actual, physical garment designs. The garment designs can include size and fit information. Based on this information, the system can build various garment cut patterns which can be used to construct a garment of the desired size and fit. The garments would be an accurate size and fit based on user inputs into application.

Typical fashion apps and websites show clothing as standalone images arranged spatially separate from each other. In other examples, clothing items or possible outfits are a compilation of predefined, and fixed, outfits with models (usually idealized). Typical apps and websites also show fashion items only statically i "pre-designed' outfits, which limit a viewer's ability to visualize and create different outfits with that garment item. This is difficult to relate to for many users. For example, clothing items fit different body types in different ways. A user lifestyle demographic type, or persona, may be differ from the idealized model. This, in turn, may bias the user against a particular outfit or at least inhibit their emotional connection to displayed outfit. The result is disappointment and apathy on the part of user. Coupled with the time investment a user takes to input style preferences, demographic data, etc., the desired goal of outfit planning using electronic devices or fashion apps is not realized by the user and application engagement and use falls dramatically.

The system as described herein creates a visually accurate and aesthetically pleasing means for users to visualize actual clothing on a human form. This is accomplished by applying, for example, a product image on to a silhouette image of a human form model. The product image is applied 1) on the correct spatial zone of the human form model, and 2) at the correct layer, within a virtual outfit. This allows the user to assess the style of the fashion item as a whole when related to other items presented in the virtual outfit. The product image, which is predetermined and is preset to fit the proper location and layer of the human form model, gives the user an accurate and real-world visual of how the actual product may look in relation to the desired outfit. Described above is a method/system to apply the fashion item model to the human form model in a virtual outfit. There are other alternative methods/systems that could be used including graphical pinning/trimming of the images to a predefined human form model, automatically determining via image and/or pattern recognition the bounds of an acceptable image gathered from online, scanned, or provided images.

Another embodiment of the present disclosure is database of electronic fashion item information. The database includes information for a number of different fashion items categorized according to a) a category, b) a sub-category, c) fashion item type, d) product, and e) source. Furthermore, each fashion item also includes a representative image or silhouette of the fashion item.

A category is generic class of fashion items that typically worn one body part. In this regard, the fashion categories include, but are not limited to: bottoms; coats; dresses; hats; jackets; rompers; shoes; and tops.

A sub-category is a sub-set of the broad fashion categories listed above. In accordance with the illustrated embodiment, the sub-categories are defined by structural aspect of the fashion item that is not typically size dependent. The sub-categories for each fashion category would therefore vary. In one example, the sub-categories for a top include, but are not limited to: generic; collar; detailed; or pullover. The sub-categories for shoes are based on different heel heights as that term is defined herein (with respect to the shoe model described above). In one example, the sub-categories for shoes include, but are not limited to: Flat (0-1.5 in); Ladylike (1.5-2.0 in); Practical (2.1-2.35 in); Pretty/Cute (2.36-2.9 in); Flirty (3.0-3.5 in); Sexy (3.6-4.0 in); Diva(4.1-4.5 in); Cray (4.6+_in).

The sub-categories for the bottoms are also are defined with respect to certain structural aspects that are unique to bottoms. In accordance with one embodiment, the sub-categories for "bottoms" are textual descriptors of several structural aspects. These structural aspects include where the bottoms fall on the legs, coverage and/or form fit, fastener type, and where the bottom falls on the midriff or torso. For example, the sub-categories for bottoms include: a) bottom type (e.g. shorts vs. pants); b) coverage (e.g. modest & full for shorts vs. leg fit for pants); c) fastening type (e.g. front fastener, side fastener, drawings, etc.); d) location of waistline or top hem (e.g. above the bellow button, below the belly button etc.); and e) special construction (e.g. cargo and special garment finishes such as distressed look). An exemplary sub-category for a bottom is "Pants, Full-Length, Cigarette, Front Fastening."

A fashion item type is associated with a specific fashion item. Fashion item type is indication of a unique fashion item with a give category and sub-category of clothing items. The fashion item type is also, like sub-category, based upon a physical/structural aspect of a fashion item. Fashion items, therefore, vary between categories but are typically common within each sub-category. The table below lists exemplary fashion item types for the categories and sub-categories.

|  | Tops | Bottoms | Shoes |
| --- | --- | --- | --- |
| Fashion Item Type 1 | Off Shoulder | High Waisted (Above Belly Button) | Sneakers |
| Fashion Item Type 2 | Shoulder | Low Waisted (Below Belly Button) | Loafers |
| Fashion Item Type 3 | Elbow | Cut Off | Sandals |
| Fashion Item Type 4 | Forearm | Distressed | Wedges |
| Fashion Item Type 5 | Full | Cargo | High Heels |
| Fashion Item Type 6 |  |  | Boots |

A product is actual fashion item, e.g. a clothing item with color and size data, a specific shoe, etc. The product may also include product information, such as descriptive tags, brand, keywords, actual product images, URL for $3^{rd}$ party website, etc. A silhouette of fashion item (or fashion item model) can have many different products as that term is used here. A product can have many different sources.

A source is a brand or retailer that offers the product for sale. Source information may include price of a fashion item, size of the item, source image(s), optionally the item SKU, web code, product code, style number, article number, hyperlink/URL of the product from a specific source, quantity on hand, etc. Products and sources are independent. In other words, as noted above, a product can have many different sources.

For each electronic fashion item model, the database includes an indication of that electronic fashion item model's category, sub-category, fashion item type, product, and source. Furthermore, the electronic fashion item model also includes an image or silhouette that is indicative of the fashion item. Because the electronic fashion item model is compiled into a virtual outfit based on user input and the predefined virtual outfits, the virtual outfit includes an association with the electronic fashion items model's category, sub-category, fashion item type, product, and source. Accordingly, a user can select a particular electronic fashion item model, e.g. a silhouette of the top, and have access to product information and source information.

The categorization scheme used to associate the electronic fashion item models addresses failings of typical fashion "apps" and websites. Specifically, typical fashion app, web sites, etc. all have their own unique, and often contradictory, methods of categorization of clothing items. This, in turn, makes it difficult for users to find and choose items that meet their outfit preferences. The categorization scheme as described herein also provide a means of sorting actual fashion items (e.g. Products) and their acquisition methods (Sources) with a user's preferred virtual outfits. This allows for new clothing items to be efficiently and properly applied to new virtual outfits while limiting actually user intervention. In other words, this system help limits time required for user to input data or information for a particular clothing item. This is in part because each fashion item is already associated with product information and source information as described above.

Figure 9A:
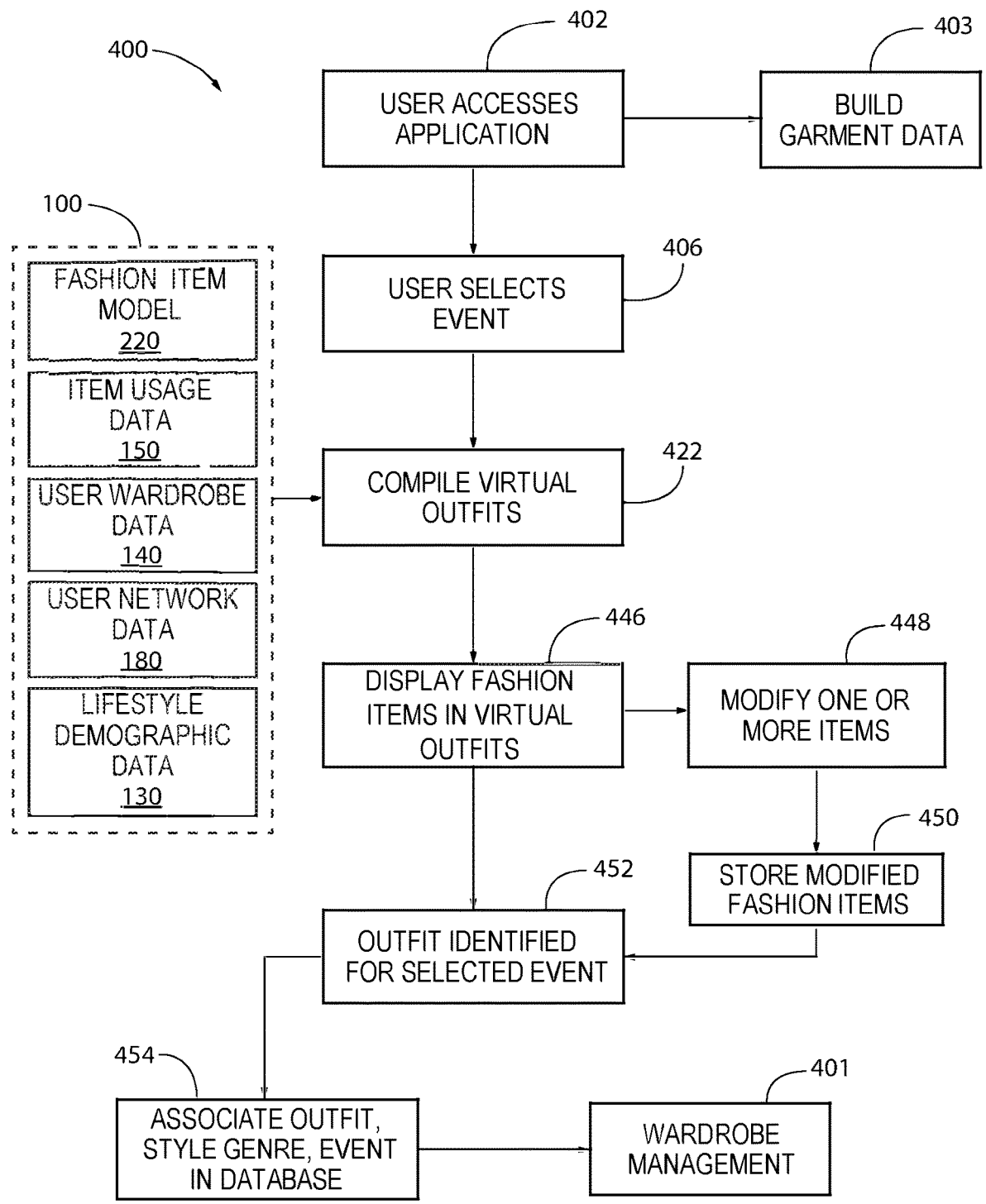
FIG. 9A is a process flow diagram illustrating a method for generating virtual outfits based on the user input and stored user wardrobe data.
Figure 9B:
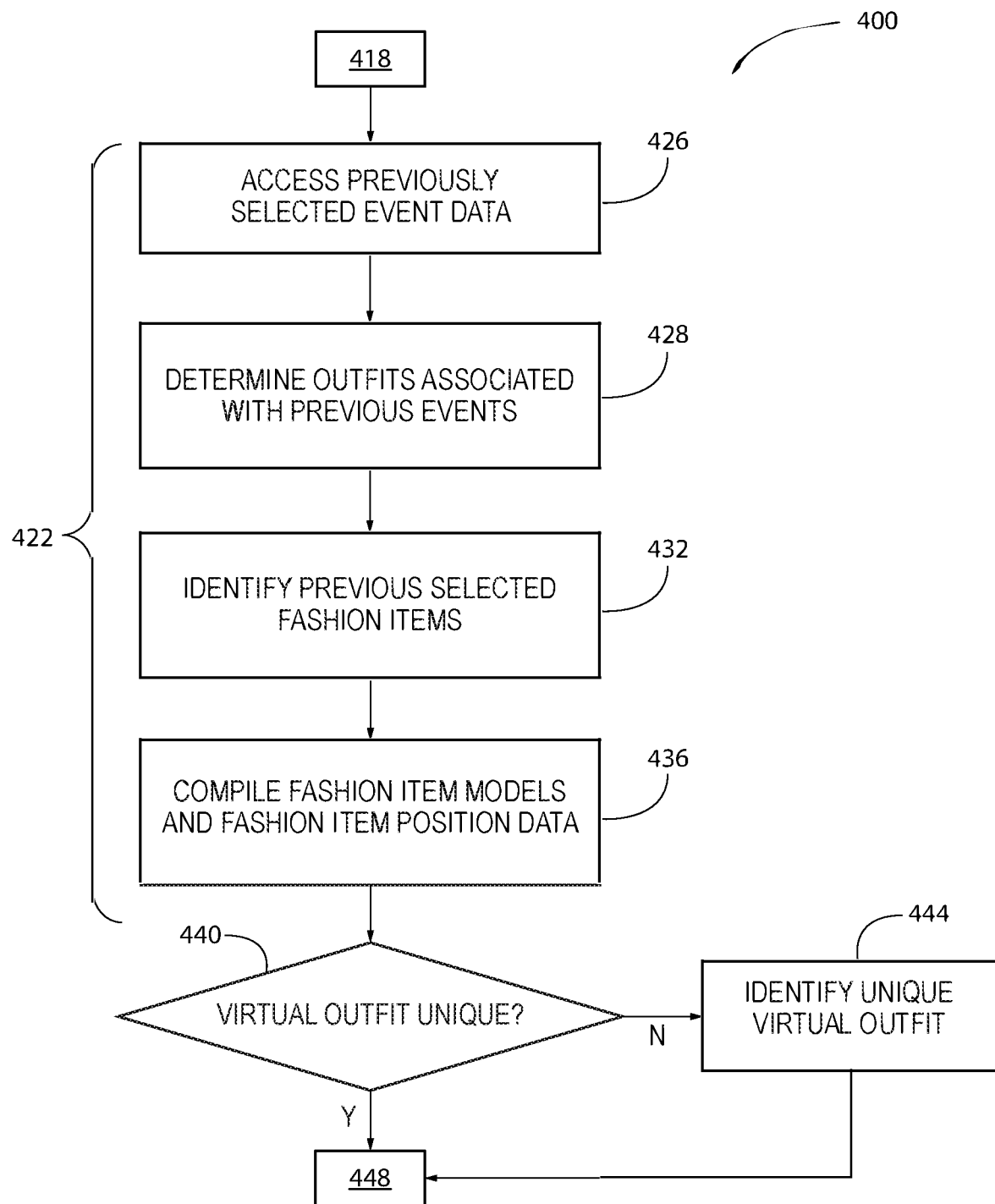
FIG. 9B is a process flow diagram illustrating an exemplary method for generating and displaying virtual outfits based in the method shown in FIG. 7A.
Figure 10A:
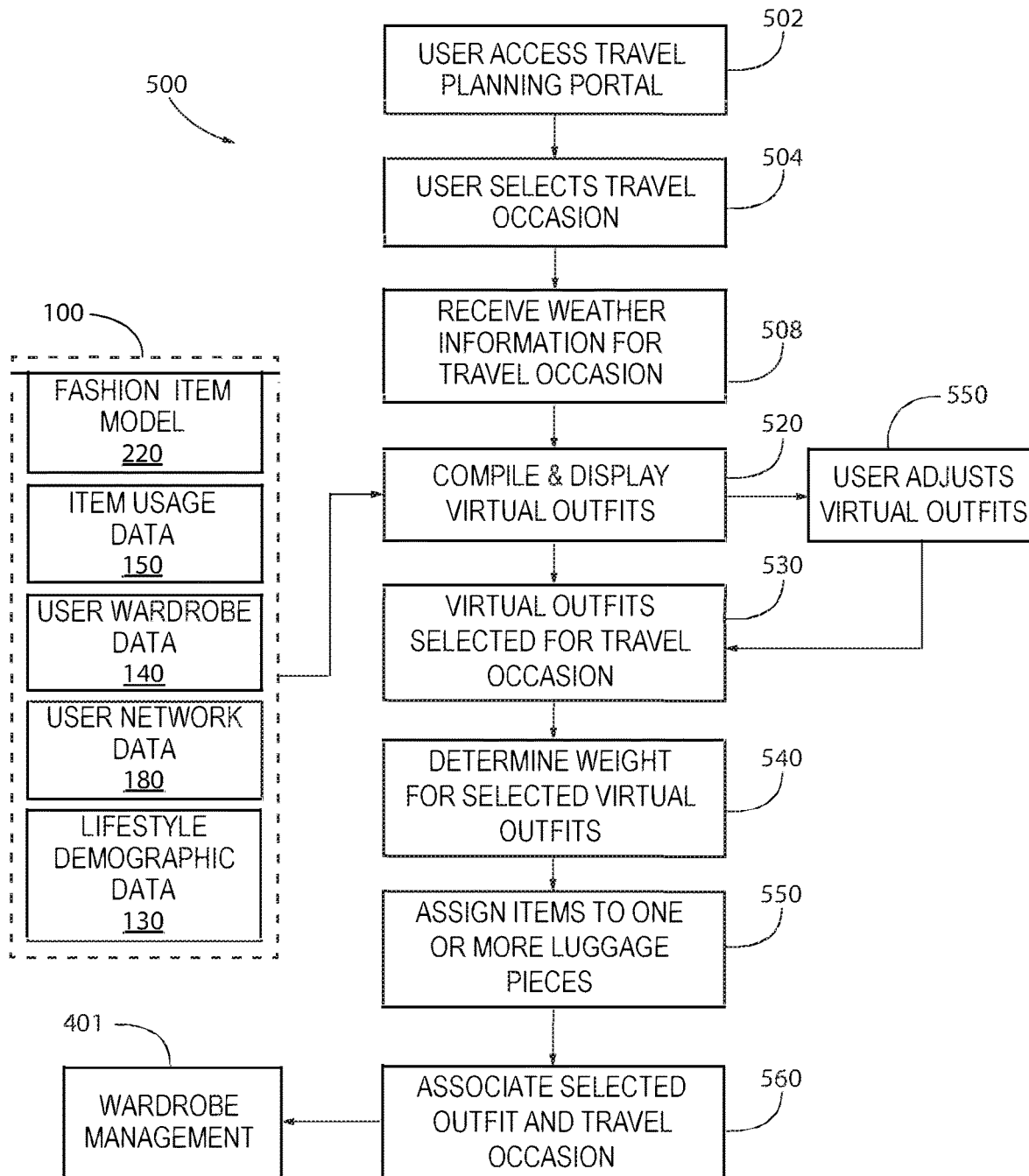
FIG. 10A is a process flow diagram illustrating an exemplary method for generating virtual outfits for travel planning.
Figure 10B:
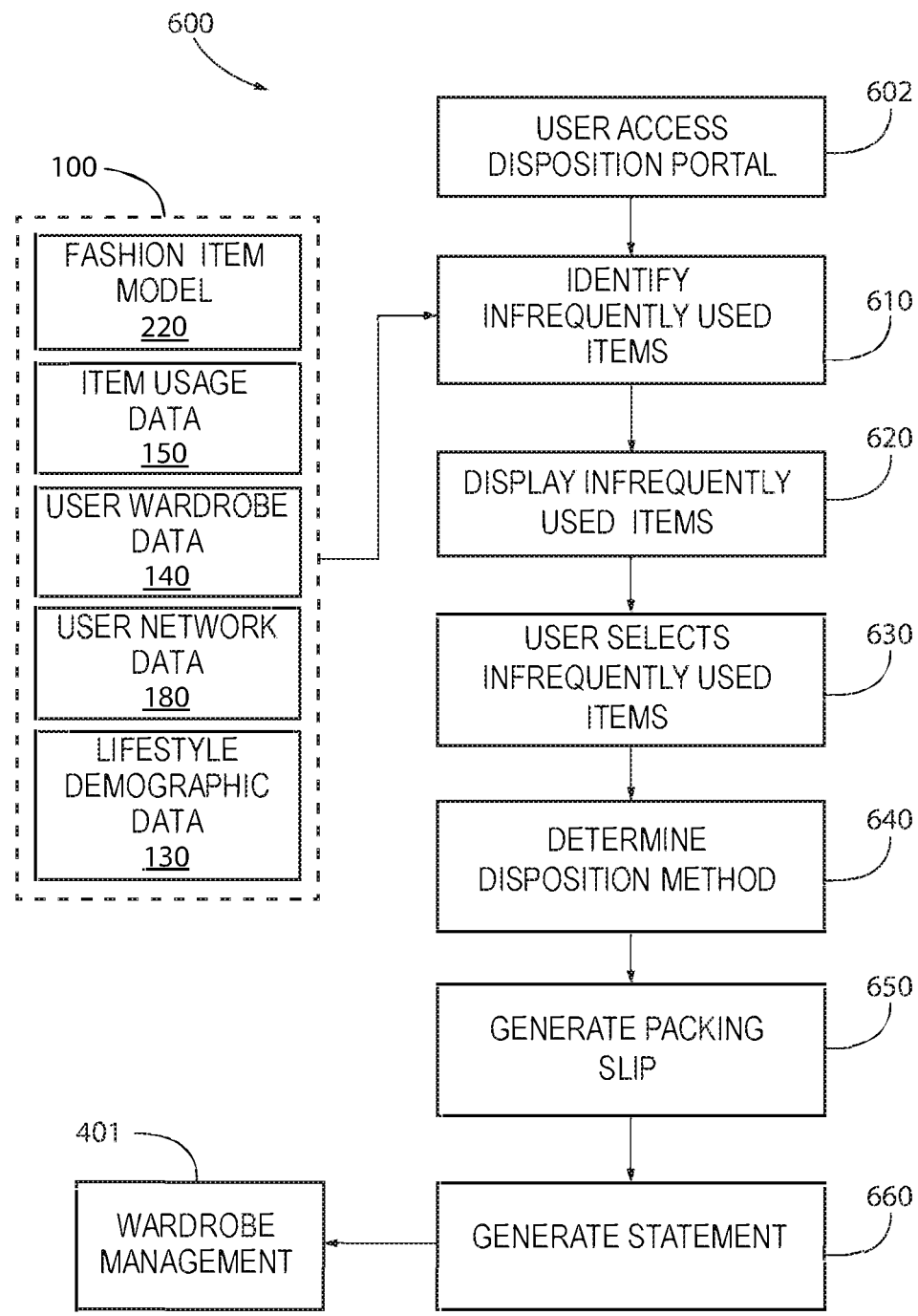
FIG. 10B is a process flow diagram illustrating an exemplary method for managing the disposition of wardrobe items.
Figure 11A:
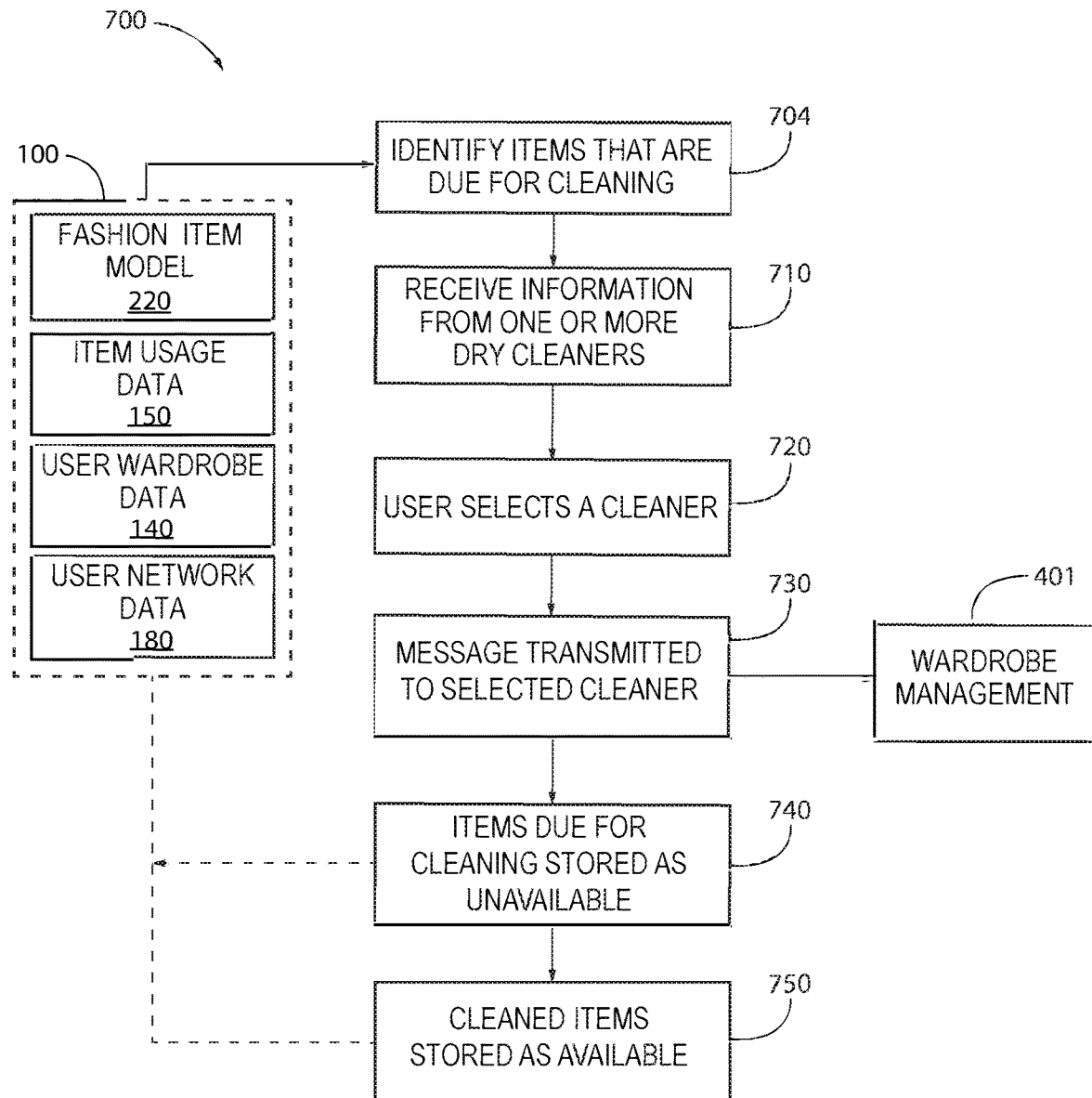
FIG. 11A is a process flow diagram illustrating an exemplary method for determining cleaning frequency of wardrobe items based on usage data.
Figure 11B:
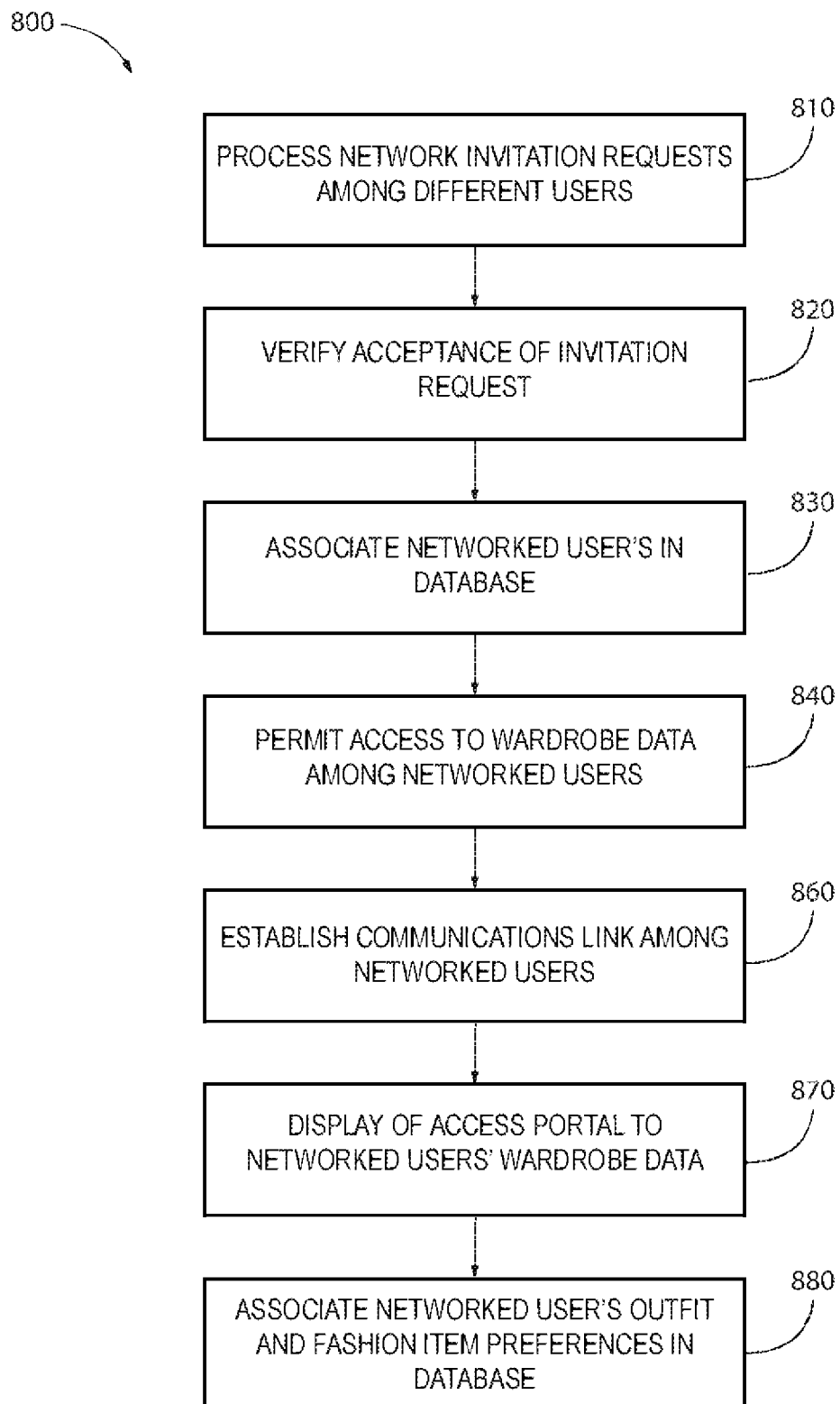
FIG. 11B is a process flow diagram illustrating a method for associating multiple users in social network.

How the software application 30 is implemented across the user's computing device 20 and server computing device 10 to acquire, develop and manage the user's wardrobe data will be described next. FIGS. 8A-11B illustrate methods for the acquisition, development, and management of wardrobe data across the networked server computing device 10 and multiple user computing devices 20. FIGS. 12A-28 illustrate screen displays for software application 30 running the user interface 28 for the acquisition, development, and management of wardrobe data, in accordance with one embodiment of the present disclosure. The user interface 28 can implement the methods illustrated in FIGS. 8A-11B and further described below. Accordingly, the software application 30 can build a user's virtual wardrobe with minimal data uploads required by the user during initial use of the application, as shown in 8A-8C. As the virtual wardrobe is developed and virtual fashion items, such as virtual garments, are compiled and stored in database 100, the software application 30 can suggest outfits for the user to wear to specific events, as illustrated in FIGS. 9A-9B. The software application 30 can also aid outfit selection for travel planning purposes, as illustrated in FIG. 10A. Furthermore, software application can manage garment disposition, such consignment or donation, as shown in FIG. 10B. And, the software application 30 can track cleaning frequency for items in the wardrobe and suggest cleaning services, as shown in FIG. 11A. In each method, the server computing device 10 is compiling data concerning fashion item usage and purchase history, for each user and computing device 20. Each broad function described above will be described next as methods implemented via user computing device 20 and server computing device 10. It should be appreciated that multiple users and computing devices are compiling wardrobe data.

Figure 8A:
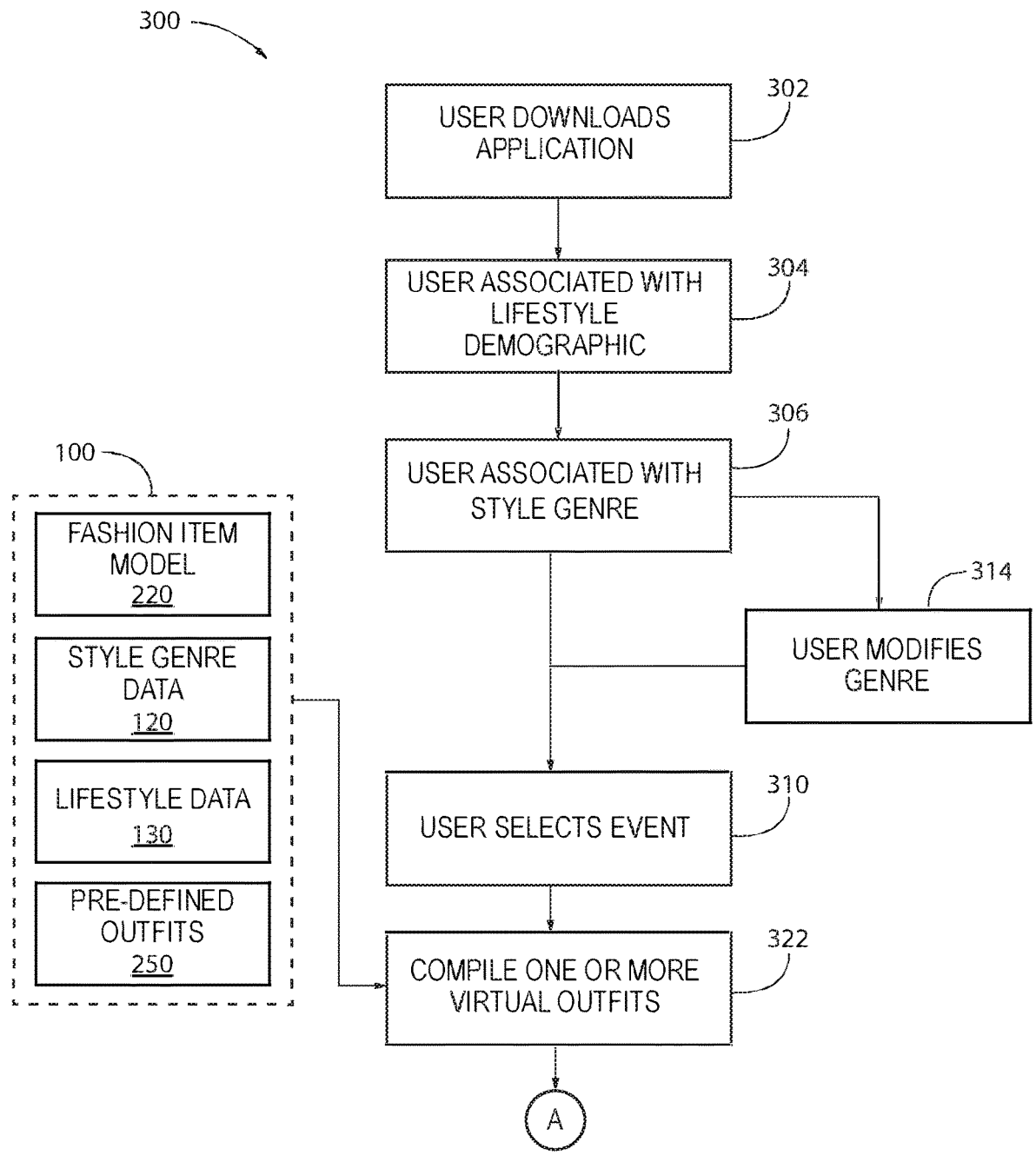
FIG. 8A is a process flow diagram illustrating a method for creating wardrobe data and virtual outfits according to one embodiment of the present disclosure.
Figure 8B:
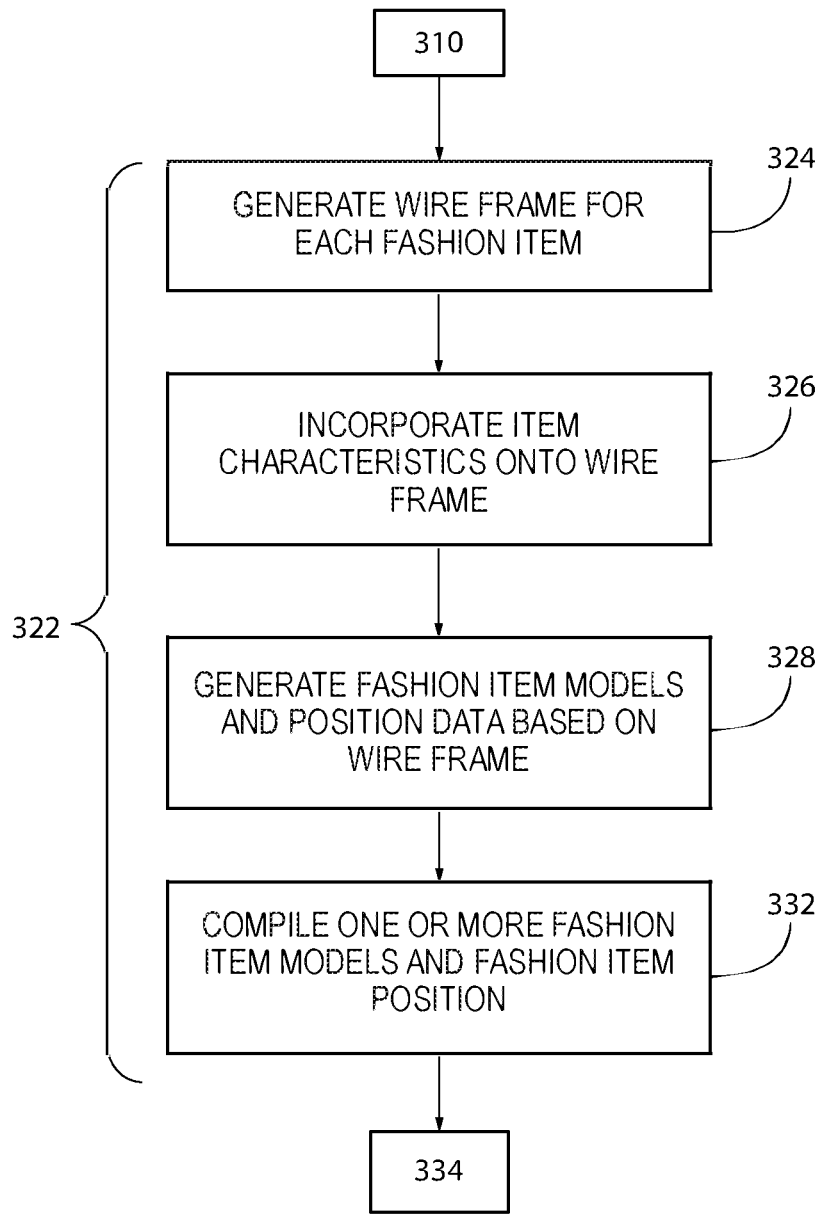
FIG. 8B is a process flow diagram illustrating a portion of an exemplary method for creating and virtual outfits and is portion of the method shown in FIG. 8A.
Figure 8C:
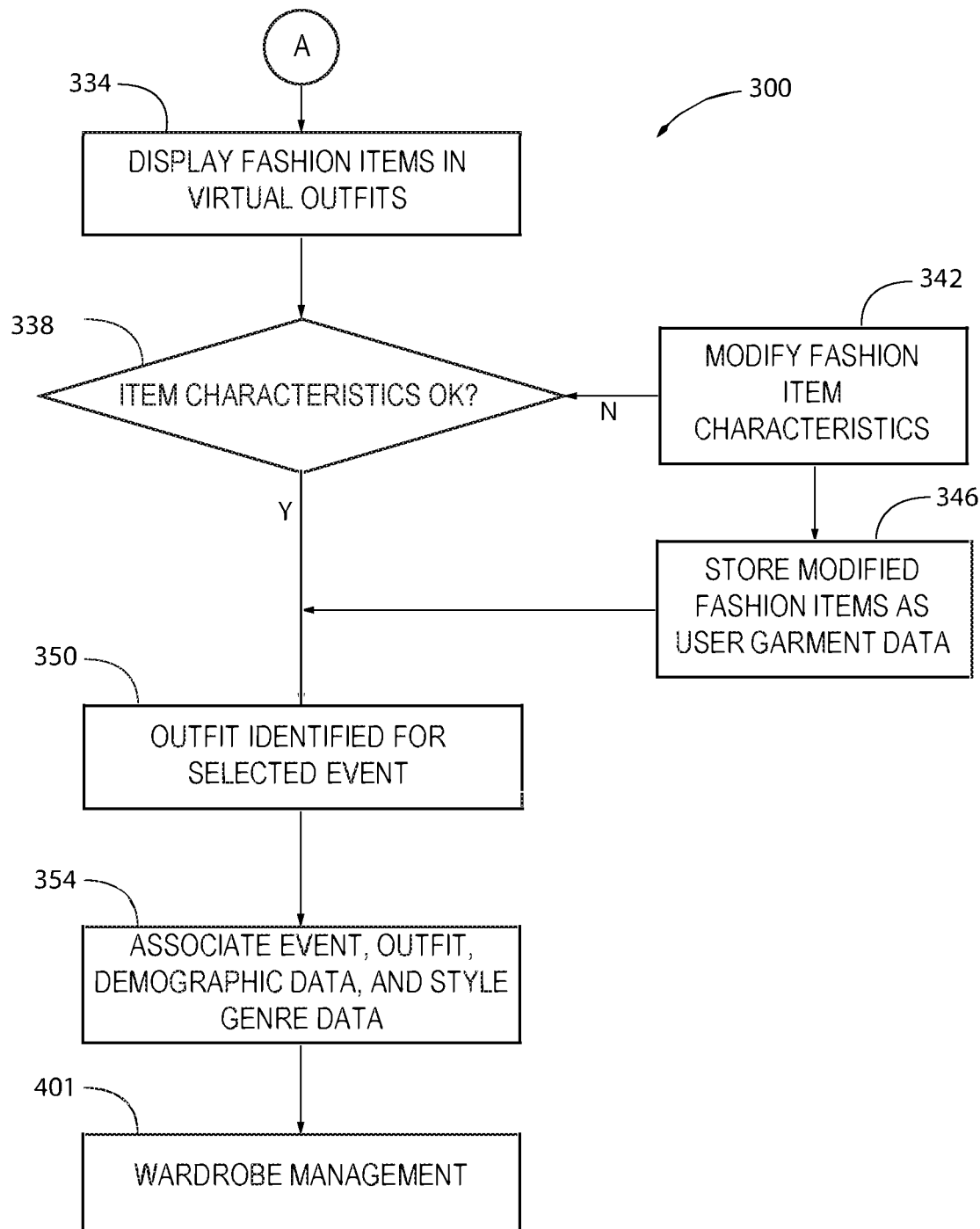
FIG. 8C is a process flow diagram illustrating a portion of the method for creating wardrobe data and virtual outfits shown in FIG. 8A.

FIGS. 8A-8C illustrates a method 300 for acquiring and developing wardrobe data and creating virtual outfits. Method 300 initiates in operation 302 when the software application 30 is downloaded onto the computing device 20. A person or user may obtain the software application 30 via Apple Inc.'s App Store or some other application platform. The software application 30 can be implemented on any particular computing device 20, such as an iOS based smartphone, tablet, desktop, or laptop. Alternatively, the software application 30 can be implemented on via an Android based smartphone, tablet, desktop, or laptop. Furthermore, the software application 30 can be implemented on particular via any Window's based smartphone, tablet, desktop, or laptop. Once downloaded, the user navigates to and opens the application 30 on the computing device 20 and process control is transferred to operation 304.

When the user initially downloads the application, specific data related to the user's physical wardrobe may not be accessible by the application or computing device 20. The method illustrated in FIGS. 8A-8C and described below relate to acquiring and developing wardrobe data while compiling outfits specific to the user and that are appropriate for the selected event. In prior systems for managing virtual wardrobes, the user is required to input extensive data regarding the wardrobe and/or upload images of the physical items in the wardrobe. In some cases of prior systems, additional data input or manipulation (e.g. cropping images) was required to contextualize the physical item for the user. In such prior systems, the initial onboarding of data regarding the physical wardrobe was cumbersome and did not necessarily result in outfit suggestions related to user demographics, style preferences and planned events. Method 300 further described below was created to make acquisition and development of wardrobe data simple and less burdensome for the user during the initial phase of application use. The application implements a user interface that transforms how a user interacts with a computing device 20 to develop and manage wardrobe data while utilizing lifestyle, style and event based outfit suggestions as described herein. Furthermore, the application as implemented via method 300 described below develops a database of user preferences, demographic data, usage data, and wardrobe data that can be used for outfit planning, wardrobe maintenance, travel planning, and garment disposition, among other functionalities.

In operation 304 and 306, the application associates the user with a lifestyle demographic and style genre based on user inputs into a visual centric user interface. As noted below, the application is designed to compile a virtual outfit on a human form based, in part, on a user lifestyle demographic, a style genre, and a selected event. During the onboarding phase, the application causes the user interface display several image input elements to obtain information regarding a user. Each image input element is associated with, and represent: 1) one or more lifestyle demographic types (i.e. persona) 2) one or more style genres, and 3) in some instances, weather contexts or climate information. In accordance with an embodiment of disclosure, each one of the first image input elements is a visual representation of one or more people wearing fashion items. The first image input elements graphically represent a particular lifestyle demographic, and style genre of the user. The image input elements can be one or more symbols, words, images, gif, animated gif, or video. Each first image input element is associated with a particular lifestyle demographic. Each first image input element may have associated therewith one or more electronic markers that can be stored as demographic data A user can select one of the first image input elements. The application 30, when executed by a processor, can determine a probable demographic based on the selection of particular first image input element. The selected first image input element and related demographic data is stored in computer memory and process control is transferred to operation 306.

In operation 306, the application can determine one or more possible style genres associated with the user. Style genres can be determined based on the user's selection of first image input elements. For instance, the user who self-associates with the high school student and selects a school event is likely biased toward a limited number of style genres. In an alternative embodiment, the application 30 can display one or more inputs elements that represent a particular style genre, such as bohemian, grunge, or classic, etc. The style genre input items can be elements, symbols, images, gif or animated gifs, or video that represent a particular style genre. In an embodiment, operation 314 is an optional step that permits user can select a particular style genre input item, such as classic, or modify a style genre as shown in operation 314. The selected style genre data can then be stored in the computer memory as a user's preference for that particular style genre. Process control is transferred to operation 310.

In operation 310, the user interface cause the display of a plurality if image input elements that is related to an event. Each image input element graphically represents a different event. Event input elements can be one or more symbols, words, images, gif or animated gif, or video. As described above, the initial display may include an image that is indicative of work, school (high school or college), night out, formal, or every day. Other events may be presented, such as formal events, e.g. weddings. Each event may have associated therewith one or more electronic markers that can be stored as event data. The selected event input element and related event data is stored in the computer memory. The software application 30 then associates the lifestyle demographic data with the selected event data. For example, the lifestyle demographic data and event data can be stored in the memory of the computing device 20, and/or server computing device 10. The server computing device 10 can compile the electronic markers for the lifestyle demographic data and the event data in database 100. Process control is transferred to operation 322.

As noted above, each one of image input element is a non-textual image. As such, visual representations are used as input elements. The image input element can take a variety forms. For example, each image input element can be a photograph. In another example, the image input element is animated. In another example, the image input element is element is a GIF. Furthermore, the image input element can be associated with a variety information such that selection of a particular image input element is also an indication of the selecting user's preferences. For instance, the image input element may be associated with demographic information, such as sex, age ranges or bands, and professional status, familial status, and education level. In addition, each image input element may be associated with one or more aspects of a human form. The one or more aspects are different size associations of a part of human form, such as hip width, waist size, leg length, etc. Selection of particular image input element can provide an indication of a user's likely perception of his or her human form. The human form information can be used in other aspects of the system to adjust the fashion item models, etc.

Image centric user interface for fashion items as disclosed herein improves upon typical fashion "apps." Typical fashion apps utilize conventional input fields to gamer information from the user. These conventional input fields may include multiple drop down lists with information the user can select. In other cases, the user can select a radio-icon, and utilize a slider to input information. Current methods are slow and awkward, especially with long lists on small screens like mobile devices. More importantly, these conventional methods are inaccurate as to aesthetic terminology & intent, which encompasses the majority of knowledge in the fashion industry where a standard lexicon has not and likely never will be defined. The system and methods as described herein utilizes identifiable images to gather con-textual information about the user's persona, activities, preferences, mood, style preferences, sizes, fit, etc. For example, determining a user's persona is accomplished through self-identification with lifestyle images (high school, working professional, mid-career, working mom, etc). Preferences as to style choices are determined by identifying images of clothing as opposed to presenting text that describes that clothing. The system allows for event selection in a more refined manner, by presenting images unique to an event or setting, such as a fancy dinner date (picture of a couple dressed in black tie at a candle lit dinner table) versus a casual dinner date (couple dressed in nice, but not fancy clothes at a more moderate restaurant), versus a friendly date (couple going to the movies dressed in nice, but very casual clothes).

Following selection of the input image elements and association of the user with a particular lifestyle demographic and style genre in operations 304, 306 and 310, process control is transferred to operation 322.

In operation 322, the application can compile at least one virtual outfit that includes at least one fashion item model 220. In one example, the virtual outfit includes a plurality of electronic fashion item models 220. Compiling the virtual outfits can be based on the lifestyle demographic data 130, one or more styles genres and an event. I In operation 322, the virtual outfit is compiled based on a set of predefined virtual outfits 250, i.e. "character outfits." and the received user input. Furthermore, the outfits are compiled based on a weighted association of: 1) the plurality of electronic fashion item models, and 2) the lifestyle demographic type and the style genre for the selected event. The outfit may be optionally compiled based on selected weather context.

A predefined virtual outfit has a defined lifestyle demographic type and a defined style genre. Each predefined virtual outfit includes a character set association with the plurality of events and the plurality of weather contexts. The character set association is a positive association when the predefined virtual outfit is selected for a particular event of the plurality of events and a particular weather context of one or more weather contexts. The character set association is a negative association when the predefined virtual outfit is not associated with the particular one of the plurality of events and the particular one of the weather contexts. In accordance with an embodiment of the present disclosure, the application compiles a number of the virtual outfits by utilizing a vector sum of the electronic fashion items with the lifestyle demographic type and the style genre that includes a positive association for the selected event and the selected weather context. The user, when selecting a particular image, self-associates with a lifestyle demographic and a style genre, and selects an event. The application compiles a "user weight" for each context. The user weight can be used "learn" specific preferences based on user inputs. In this regard, the application learns each user's preferences, over time, and tailors how the virtual outfit is compiled based on the user preferences and the character outfits.

As described above, each lifestyle demographic type is associated with one or more lifestyle electronic tags, each style genre type is associated with one or more style genre tags, and each event is associated with one or more electronic event tags, and at least a subset (up to all) of the fashion item models or fashion items are associated with one or more electronic fashion item tags. Several electronic tags may be common to each lifestyle demographic, style genre, event and fashion item. In an alternative embodiment, in operation 322, the application identifies an aggregation of common electronic tags among the lifestyle demographic tags, style genre tags event tags and the fashion item tags. Such aggregation indicates an association between a particular style genre and the fashion item tags, and thus a fashion item, as well as the suitability of a fashion item for the event. Accordingly, the association can take into account the relative scales for the lifestyle demographics and the style genres.

Referring to FIG. 8B, in one embodiment, the application compiles virtual outfits using the garment wire frame model acquisition scheme. Operation 322 includes several sub-steps schematically shown in operations 324, 326, 328 and 328 in FIG. 8B. In operation 324, the application generates a wire frame for each desired fashion item associated with a part of the human form. For instance, the application generates a wire frame 270 comprising a plurality of spaced apart point pairs 274, 276 as illustrated in FIG. 4. Then, process control is transferred to operation 326.

In operation 326, the application can incorporate one or more item characteristics onto the wire frame. More specifically, the application can incorporate a fashion item type and a fashion item color scheme into the wire frame 270. Other item characteristics can incorporated onto the wire frame 270, such as a fashion item material. Process control is transferred to operation 328.

In operation 328, the application generates at least one fashion item model for each fashion item associated with part of the human form. Here, the application generates the fashion item model based on user's lifestyle demographic data, style genre data, event data and For instance, a given fashion item type may be associated with a particular and given combination of a lifestyle demographic and style genre. For instance, a light blue slim fit oxford shirt may be associated more strongly with a professional female who self associates with a classic style genre. On the other hand, a light pink fitted long-sleeve, V-neck t-shirt may be associated more strongly with a high school or college aged student that self-associates with a casual style genre. In other examples, the fashion item material can be selected based on the weather conditions associated with the event. In one example, the application generates a fashion item model for a long-sleeve t-shirt that is red, knit and made of cotton, and its associated position data may be "upper body, base". See e.g. table 2 above. Process control is transferred to operation 332. In operation 332, the application compiles the fashion item models and position data into at least one virtual outfit based in part on the identification of the common electronic tags among the lifestyle demographic type, event data, style genre, and fashion items. Then, process control is transferred to operation 334.

Figure 8D:
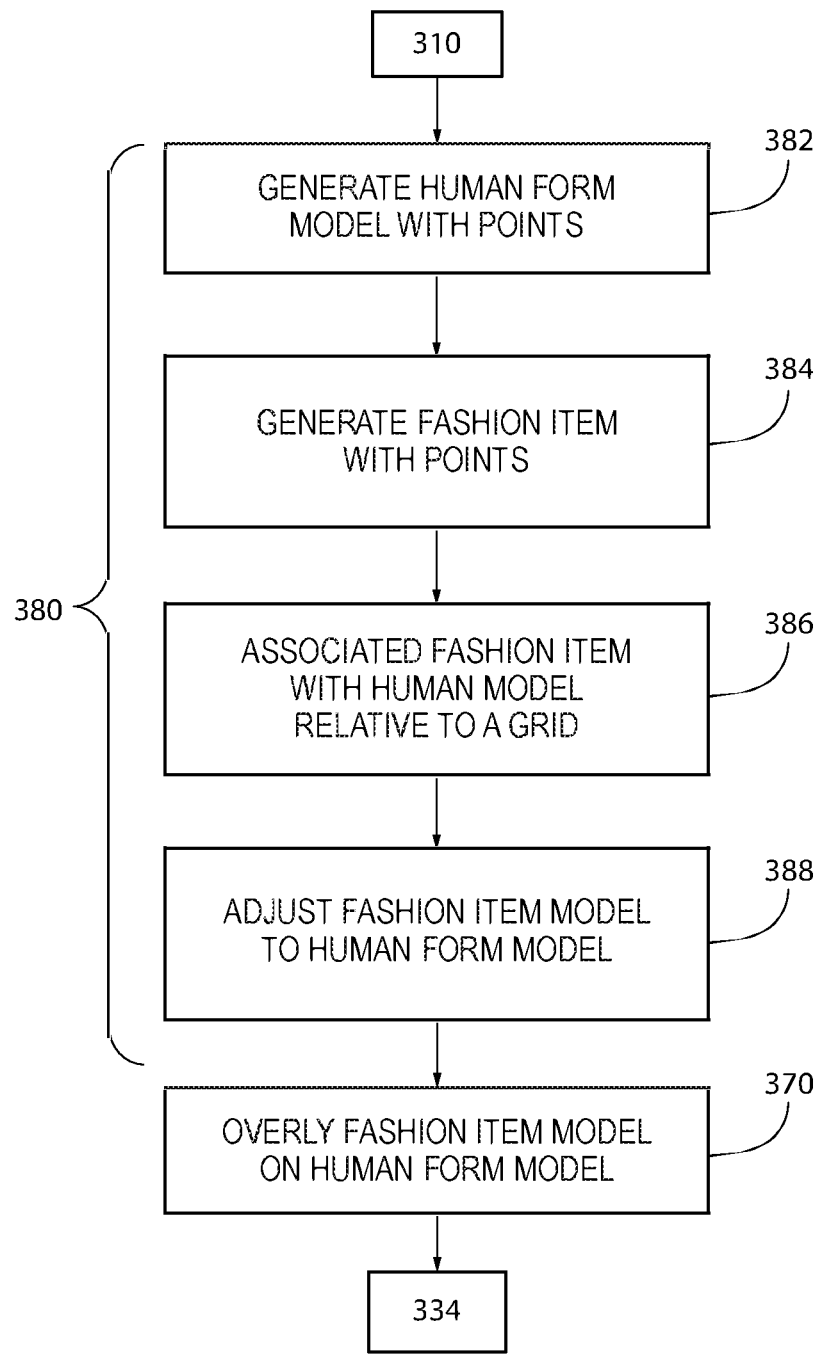
FIG. 8D is a process flow diagram illustrating an alternative embodiment of the portion of the method shown in FIG. 8B.

An alternative embodiment for operation 322 for compiling a virtual outfit is shown in FIG. 8D. Turning to FIG. 8D, an alternative operation 380 is shown that compiles the one or more virtual outfits. In such an alternative embodiment, process control is transferred from operation 310 to operation 380. Operation 380 is based on silhouette model scheme 263h illustrated in FIGS. 7A-7G above. Operation 380 includes several sub-steps schematically shown in operations 382, 384, 386, 388 and 370 in FIG. 8D. In operation 382, the application generates human form model with a plurality of first points. Process control is transferred to operation 384. In operation 384, the application generates fashion item form model with a plurality of seconds points. Process control is transferred to operation 386. In operation 386, the application associates the fashion item model with the human form model with reference to a grid. Process control is transferred to operation 388. In operation 388, the application adjusts the fashion item model to the human form model. Process control is transferred to operation 370. In operation 370, the application overlies the fashion item model on the human form model, as illustrated in FIGS. 7D and 7F.

Turning to FIG. 8C, in operation 334, the application causes the user interface to display at least one virtual outfit overlaid on a graphical human form. The virtual outfit displayed is a visual representation of each fashion item including its type, color scheme, and in some instances material type. As noted above, each virtual outfit is combination of one or more fashion item models, which as noted above, represent an actual fashion item. In one example, the virtual outfit includes an upper body fashion item (or upper body garment), a lower body fashion item (or lower body garment), and optionally an outerwear fashion item overlaid on the upper body fashion item. The virtual outfit can include a footwear item and one or more accessory items, such as a hat, jewelry, watches, or a scarf. The user interface displays the upper body fashion item as a particular garment type, e.g. polo, long-sleeve t-shirt, or tank-top, etc. The lower body fashion item is also displayed as a particular garment type, e.g. shorts, pants, or skirt, etc. In instances where the virtual outfit is a dress, the fashion item is displayed as a visual representation of the specific dress identified for the selected event. Because the fashion items are based on the wireframe fashion item model described above, each fashion item is displayed with the appropriate fit and proportions for that particular fashion item. For example, if user interface displays a pair of skinny jeans for the lower body fashion item, each pant leg will be closely tailored to each leg of the human form. Furthermore, the color and material type for each fashion item is displayed. Accordingly, the user interface can display a virtual outfit as a combination of one or more fashion items of a given type, color scheme, and optionally material, overlaid on the human form. Furthermore, in operation 334, the user interface displays a single virtual outfit or it may display multiple virtual outfits. For instance, the application can compile multiple virtual outfits in operation 332. In such an example, the user interface displays a first virtual outfit and one or more additional virtual outfits each including a different combination of fashion items. The additional virtual outfits displayed are based on the user's lifestyle demographic, style genre, and selected event. Process control is transferred to operation 338.

The application is configured so that the user can modify the virtual outfit via the user interface. In operation 338, the user interface receives an input that indicates if the fashion item characteristics for each item is acceptable to the user. For example, the user interface can display a selection element, the selection of which "selects" the displayed virtual outfit for the planned event and process control is transferred to operation 350, In operation 350, the application identifies the selected outfit for the planned event and stores that data in the computer memory. If, however, in operation 338, the user interface receives an input that the fashion item characteristics for each item are not acceptable to the user, process control is transferred to operation 342.

In operation 342, the user interface is configured to permit the user to modify each fashion item and one or more item characteristics. In one example, the user interface is configured so that a gesture on or pressure applied to the screen (or selection via mouse in a desktop or notebook) in the region of virtual outfit activates an input element that displays a fashion item modification element (see 1062 in FIG. 13A) and a color scheme selection element (see 1070 in FIG. 13A). The fashion item modification element includes a visual representation of different fashion items for the selected fashion item region. The different fashion item included in the fashion item modification element are based on previously compiled fashion item models or stored fashion items. Different fashion items may be displayed in a wireframe format. The user interface permits the user to scroll through different fashion items displayed in the fashion item modification element in order to determine which one he or she prefers for the event. In one example, the fashion item modification element can be rotatable path or wheel that includes the stored different fashion items. The user can cause the rotatable path to cycle through the different fashion items until the user identifies one for incorporation into the virtual outfit. In such an example, the rotatable path can magnify the fashion item as it cycles along the path. See e.g. FIG. 13A. Alternatively, the fashion item modification element can be a linear slide that allows the user to scroll through different fashion items linearly. Accordingly, the fashion item modification element allows the user to scroll through each fashion item and select a preferred fashion item for presentation in the virtual outfit.

The user can modify the color scheme via a color scheme selection element. The color scheme selection element can be a color wheel, color grid, or other arrangement of colors that allow the user to scroll through and select a desired color. The color scheme selection element can display colors based on stored color data. The stored color data ma include a selection of Pantone colors. Other color sources may be used as well. One or all of the displayed fashion items in the virtual outfit may be modified as described above. It should be appreciated that the user interface can display an input element, the selection of which permits the user can modify or change one or more characteristics of each fashion item model in the virtual outfit. Alternatively, the user interface displays the virtual outfit in a modifiable state such that the user to modify the virtual outfits directly without having to select a "modify" or "change" input element. Process control is then transferred to operation 346.

In operation 346, the application can store the modified fashion items as user wardrobe data. Once the garment item and color are selected as describe above, the user can input that the modified fashion item is part of the user's physical wardrobe. Thus, the application can permit the user to build fashion item models for fashion items that the user has in the physical closet. The application stores the modified fashion items as fashion item data. Process control is transferred to operation 350.

In operation 350, the user can select a displayed outfit for the planned event. The selected outfit is stored in the computer memory. Process control is transferred to operation 354. In operation 354, the application associates the selected outfit and its fashion items data, event data, outfit style genre data in the database. Process control is transferred to wardrobe management operation 401 depending on the action the user desires to take. Operation 401 in FIGS. 6A-11 schematically represent processes related to wardrobe management, such as travel planning, disposition planning, social network activities, or navigation to the application home screen.

Method 300 shown in FIGS. 8A-8C is one method for acquiring and developing wardrobe data during the initial phases of use after the application has been installed on the computing device 20. FIGS. 7A-7B illustrate a method 400 for managing wardrobe data and virtual outfits based on user data, style genres, and event data, that is already stored in the database 100. Method 400 represents ongoing use after some initial wardrobe data is acquired and loaded into the database and application modules.

Figure 14:
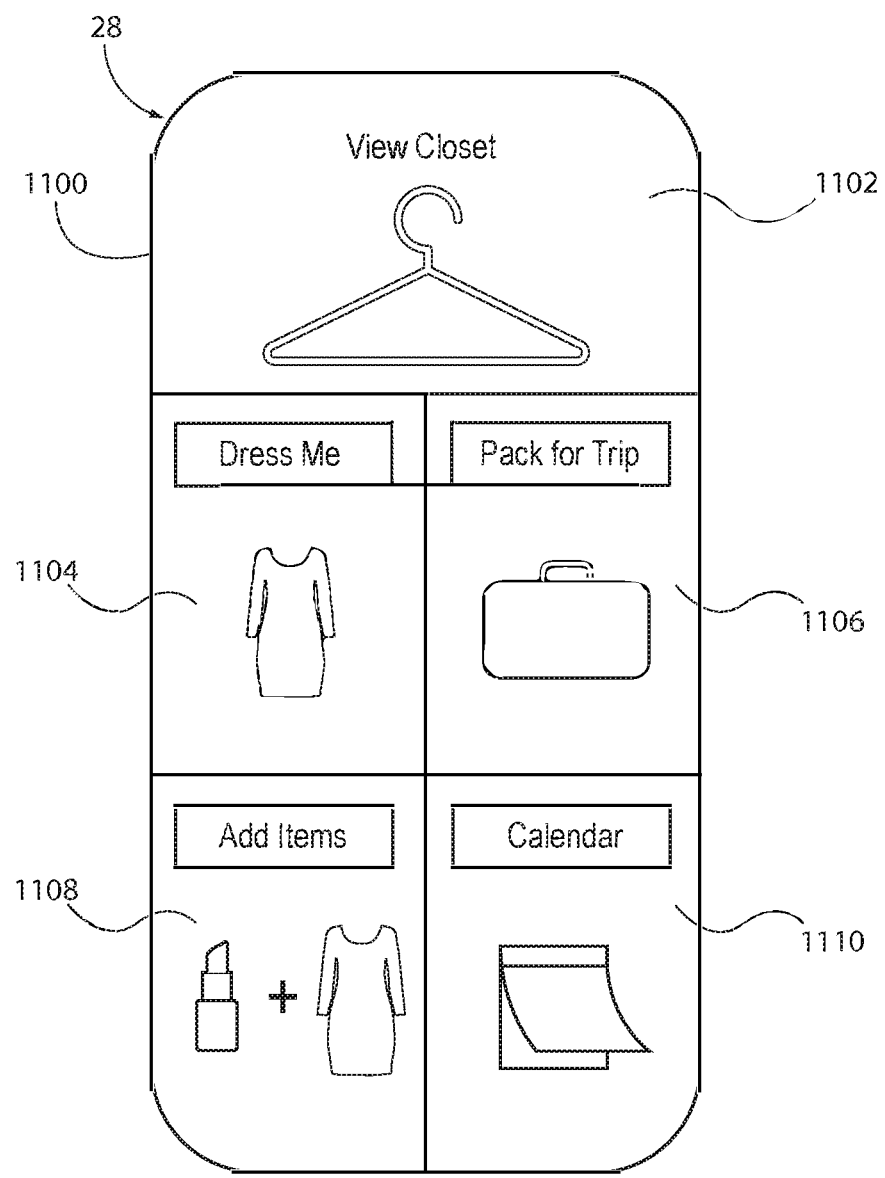
FIG. 14 is user interface displaying an exemplary home screen.
Figure 15:
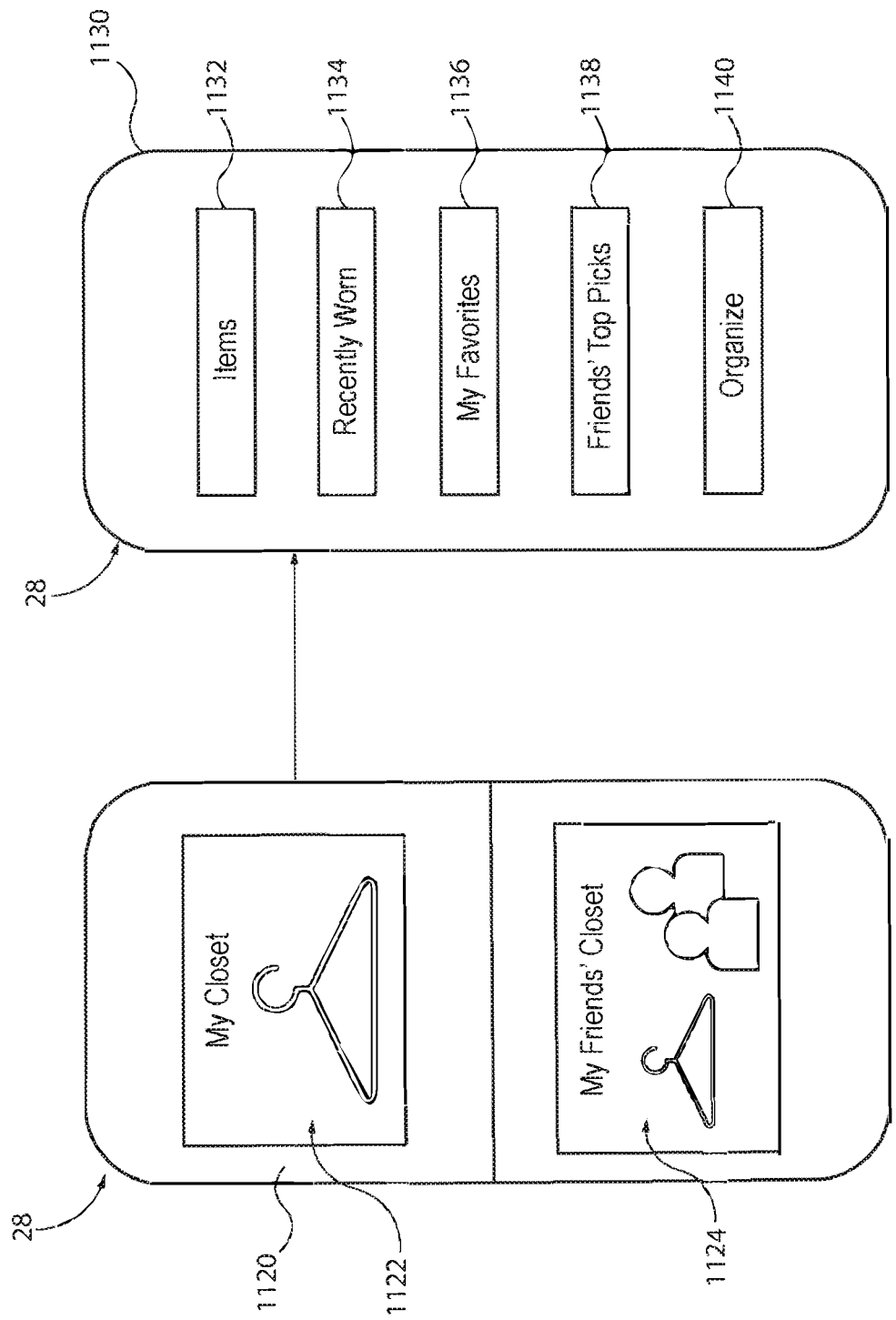
FIG. 15A is a user interface displaying an exemplary screen including portals to a user's virtual closet and several networked users virtual closets.
FIG. 15B illustrates a user interface displaying an exemplary screen that includes access portals to different components of the user's virtual closet.
Figure 16:
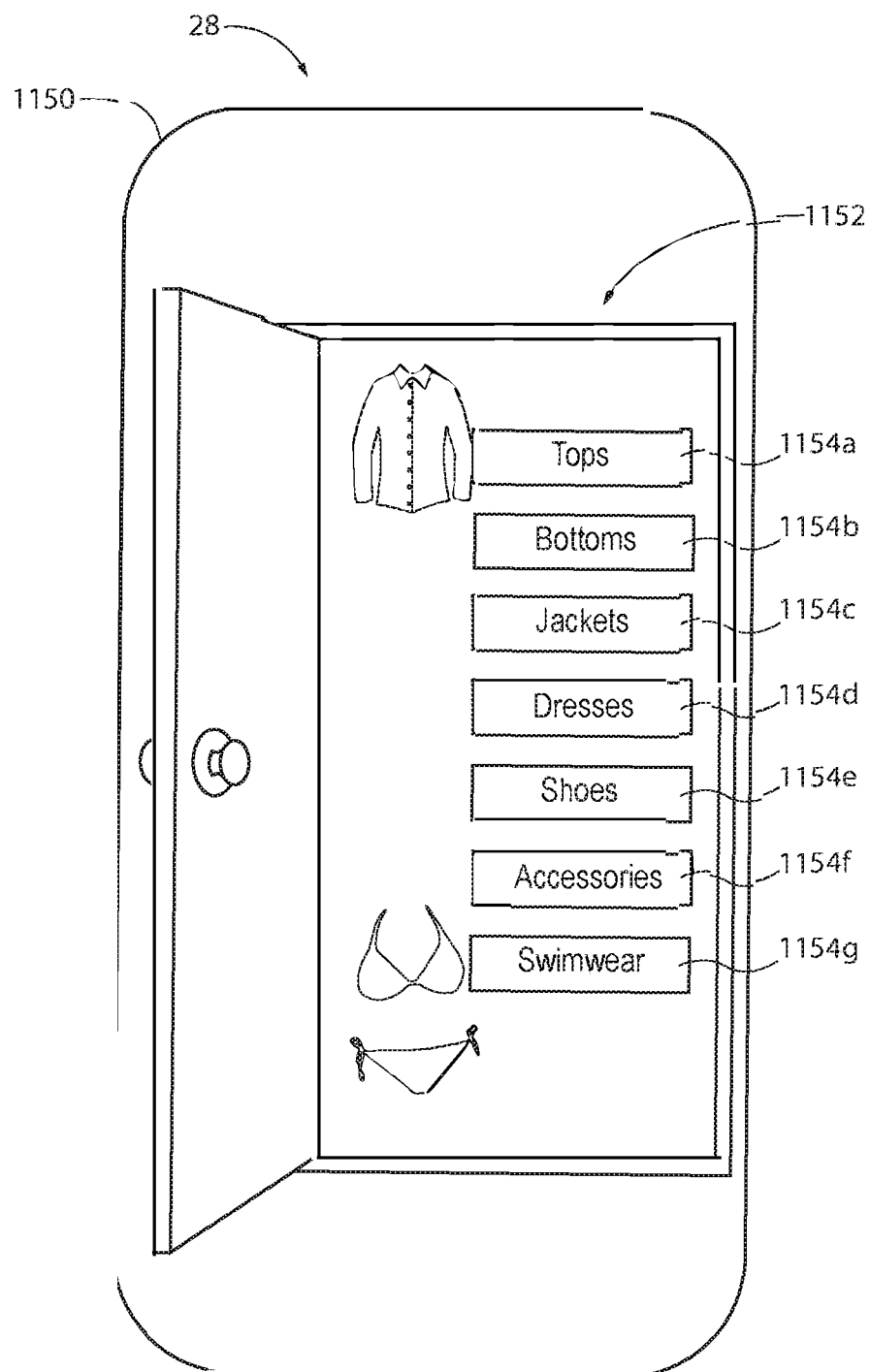
FIG. 16 illustrates a user interface displaying an exemplary screen that includes portals to various fashion items and outfits contained within the user's virtual closet.

The method 400 initiates in operation 402 when the user opens the application on the computing device 20. When the user opens application, the user interface displays main screen 1100 (FIG. 14) which includes a number of number of input portals that provide access to different aspects of the user's wardrobe data and application functionalities. For instance as shown in FIG. 14, from screen 1100, the user can select a view closet element 1102, a "dress me" element 1104, a "travel planning" element 1106, an "add items" element 1108 and calendar element 1110. Accordingly, in operation 402, the selection of the view closet element 1102 transfers process control to operation 403. In operation 403, the user can access his or her wardrobe data. In an exemplary embodiment of operation 403, the user interface displays screen 1120 shown in FIG. 15A. As illustrated, screen 1120 includes user closet portal 1122, which provide access the user's wardrobe data, and a "friends closet" portal 1124, which provides access to the networked users virtual closets. Details regarding the screen 1120 and portals 1122 and 1124 are described below. Selection of "Dress me" element transfers process control to operation 406 where the user can compile outfits based on selected event data. Selection of travel planning element transfers process control to operation 404. In operation 404, the application implements the travel planning method 500. The travel planning method is further described below. Selection of the "add item" or "build" input element 1108 transfers process control to operation 405. In operation 405, the application adds fashion item data to the database, the application can build and store fashion item data in the database and/or add fashion item data based on user purchases via $3^{rd}$ party websites or at retail location. For example, operation 405 executes instructions that allows the user to add fashion items to the database as described above via method 300. More specifically, the application directs the user through a series of interfaces that are schematically illustrated as operation 310 through operation 354 shown in FIGS. 8A-6C and described above. Furthermore, operation 405 can also allow the user to build additional fashion item models based on physical items, such as items recently purchased buy scanning fashion item data at retailer POS, as illustrated in Figures SA-5C. Furthermore, on operation 405, selection of the add item element 1108 can direct the user to a $3^{rd}$ party website to purchase a specific fashion item.

In the method 400 illustrated in FIGS. 7A and 7B, the application compiles one or more virtual outfits based on selected event data. As noted above, when the user selects the dress me element from the main screen, process control is transferred to operation 406, which initiates a process of creating virtual outfits. In operation 406, the user interface displays a plurality of event input elements, each of which represent a different event. The user can select a planned event and that selection is stored in the computer memory as selected event data Process control is transferred to operation 422.

In operation 422, the application compiles at least one virtual outfit based on the selected event from operation 406 fashion and item usage data 150. The virtual outfit includes one or more stored fashion item models 220. The displayed fashion item models 220 can be based on the user's specific wardrobe data. As discussed above with respect to operation 322 in method 300 above, several electronic tags may be common to each lifestyle demographic, event and fashion item. In operation 422, the application identifies an aggregation of common electronic tags among the lifestyle demographic tags, the fashion item tags, and event tags. Such aggregation indicates an association between a particular style genre and the fashion item tags, and thus a fashion item, as well as the suitability of fashion item for the event. Furthermore, the application compiled the virtual outfits based on fashion item usage data. For instance, the application would not compile an outfit with fashion items that were selected by the user the last time the user attend the selected event. Furthermore, the application can adjust the type of virtual outfits compiled based on the user style preferences over time. It is not uncommon for a person's style preferences or demographics changes over time. By storing the selected outfits, selected fashion item models, demographic data, and association of the fashion item model with the particular style genres, the application can evaluate trends or shifts in the user's style preferences over time and present outfits to the user consistent with the current preferences and persona of the user. Accordingly, the application can also compile the virtual outfit based on the user's style genre data 120 and lifestyle demographic data 130. Optionally, user network data 180 may be used to compile virtual outfits as will be further described below. Further details on how the application compiles the virtual outfits will be described next.

As shown in FIG. 7B, compiling virtual outfits in operation 422 can include one or more sub-operations 426 through operation 444. In operation 426, the application can access previously selected event data. In operation 428, based on item usage data, the application can identify virtual outfits that were associated with previously selected events. For example, the application can determine which outfits the user selected for the specific events.

In operation 432, the application can further identify specific fashion items based on item usage data. For instance, the application identifies fashion items found in previously compiled outfits, or that the user had previously selected for a given event following modification of a virtual outfit. Alternatively or in addition to, the application identifies fashion items that the user has selected more frequently regardless of the event selection. Process control is transferred to operation 436.

In operation 436, the application compiles fashion item models based on item usage data, previous selected fashion items and previously selected virtual outfits for events similar to the event selected in operation 406. As described above, several electronic tags may be common to each lifestyle demographic, event and fashion item. An aggregation of common electronic tags among the fashion item tags and event tags indicates an association between a particular the fashion item and the event. When the application has compiled the virtual outfits, process control is transferred to operation 440.

In operation 440, the application determines if the compiled virtual outfit is unique. A unique virtual outfit is one in which the specific combination of fashion items has not been compiled for a given condition, such as for a selected event. In one example, the application determines if the virtual outfit is unique among all previously compiled virtual outfits for the selected event. In another example, the application determines if the virtual outfit is unique among all previously compiled virtual outfits regardless of event selection. If the virtual outfit is unique, process control is transferred to operation 446 and the compiled virtual outfit is displayed as further detailed below. The application can display the unique virtual outfit or a previously selected virtual outfit. In operation 440, if the application determines that the virtual outfit is not unique, process control is transferred to operation 444 and the application identifies a unique virtual outfit among the compiled fashion items. Process control is then transferred to operation 446.

As shown in FIG. 7A, in operation 446, the user interface displays at least one virtual outfit. An exemplary virtual outfit displayed in operation 446 is illustrated in FIG. 25B as element 3072. As described above, the virtual outfit displayed is a visual representation of each fashion item including its type, color scheme, and in some instances material type. Each displayed virtual outfit can include an upper body fashion item, a lower body fashion item, and optionally an outerwear fashion item overlaid on the upper body fashion item. If the application determines that a dress is a suitable outfit for the selected event, the user interface may display the virtual outfit as a dress. In one example, a single outfit is displayed. In other example, the user interface can display the unique virtual outfit (see operation 444 in FIGS. 7B) and one or more additional virtual outfits with a different combination of fashion items. In operation 446, the user interface displays the virtual outfits similar to how the virtual outfits are displayed in method 300 at operation 334 described above.

From operation 446 the user can modify the outfit in operation 448 or select a virtual outfit in operation 450. The user interface displays the virtual outfit in a modifiable state such that the user can directly modify or change the fashion items of the displayed virtual outfit. In operation 448, the user interface is configured so that a user input causes the display of a change fashion item element 3072 (FIG. 25B). The user input can include a gesture or pressure applied to the screen in region of the fashion item, or selection of the region of a particular fashion item via pointer icon. The change fashion item element includes a visual representation of different fashion items for the selected fashion item. The different fashion items included in the change fashion item element 3072 are based on previously compiled outfits and stored fashion items that are similar in type of the selected fashion item. The change fashion item element 3072 can be a rotatable path or wheel that includes the stored different fashion items. The user can cause the rotatable path to cycle through the different fashion items until the user selects a fashion item for incorporation into the virtual outfit. In such an example, the rotatable path can magnify the fashion item as it cycles along the path. Alternatively, the change fashion item element cm be a linear slide element that allows the user to scroll through different fashion items linearly along vertical direction or a horizontal direction with respect to screen orientation. Accordingly, the change fashion item element allows the user to view the stored fashion items and select a preferred fashion item for presentation in the virtual outfit. Furthermore, the user interface can display a favorites element, the selection of which present specific virtual outfits the user has indicated as a preferred or favorite outfit. The user interface can also display a "favorite items" element, the selection of which by the user present specific fashion items that the user has indicated as a favorite or a preferred fashion item. The user can select one of the preferred virtual outfits, or a preferred virtual fashion item, for incorporation into the displayed virtual outfit. Once the fashion item or fashion items have been changed, process control is transferred to operation 450.

In operation 450, the application can store the changed fashion items as user garment data. Process control is transferred to operation 452.

In operation 452, the user can select a displayed outfit for the planned event. The selected outfit is stored in the computer memory and process control is transferred to operation 454. In operation 454, the application associates the selected outfit, its fashion item models, selected event, and style genre association with the fashion item model in the database. Process control is transferred to wardrobe management operation 401. Operation 401 schematically represents additional functions related to wardrobe management as described above.

As described above, the present disclosure includes software applications and related systems for managing wardrobe data. FIGS. 10A, 10B, and 11A illustrate exemplary methods implemented by the application that aid in wardrobe management. As noted above, the user interface can display one or more elements, the selection of which may guide the user through interfaces associated with travel planning, garment maintenance, and/or garment disposition. Accordingly, FIG. 8 illustrates a method 500 for travel planning, FIG. 9 illustrates a method 600 for garment maintenance, and FIG. 10 illustrates a method 900 for managing the disposition of garments. Each method will be described next.

Referring to FIG. 8, a method 500 for travel planning is initiated in operation 502 when the user accesses the travel planning portal displayed on a main screen by the user. Process control is transferred to operation 504. In operation 504, the user interface displays several travel occasion input element. Each travel occasion input element is associated with aa type of trip, such as a vacation, business trip, etc. The user can input geographic locations and length of stay, departure and return dates, and mode of travel (e.g. air, car, train). The geographic locations can be automatically converted to specific zip codes stored in a database or accessed over the communications network from a $3^{rd}$ party website. In one embodiment, the application can access an electronic itinerary the user obtained in preparing for the trip via communications network. The application can determine travel dates and locations of travel via the electronic itinerary and automatically populate relevant data for the trip. Additional inputs are available for multiple location trips as needed. The user interface can display specific events that the user is planning to attend during the trip. Accordingly, in operation 504, the user can also identify specific planned events for the trip. Process control is transferred to operation 508.

In operation 508, the application obtains weather information associated with location and timing of the trip. The application can obtain weather information from one or more weather sources via the communications network. Weather information may include predicted temperatures, temperature range, precipitation, wind-chill, etc. for the planned dates and location of travel. For instance, the zip codes associated with the travel locations can be used to determine specific weather conditions for the trip. The weather information can be obtained for the dates and zip code where the user will be traveling to. The obtained weather information can be analyzed to determine if the trip includes stays during cold weather, warm weather, or hot weather, and if any precipitation is likely. Process control is transferred to operation 520.

In operation 520, the application can compile and display the virtual outfits for the planned travel occasion. The application may compile the virtual outfits based on fashion item model 220, item usage data 150, user wardrobe data, specific planned events, and weather information. More specifically, the application can compile virtual outfits for each day of the trip and each event. The user interface then displays each virtual outfit associated with the each day of trip and the specific event. From the display of selection of outfits in operation 520, the application proceeds to operation 530 where the user confirms display virtual outfits for the planned travel occasion. The user interface can display a "select" element, selection of which confirms the selection of displayed of virtual outfits for the planned travel occasion. Process control is then transferred to operation 540. Alternatively, based on the displayed virtual outfits in operation 520, the user may want to change one or more of the virtual outfits or specific fashion items. In operation 550, the user interface permits the user to change one or more of the virtual outfits or specific fashion items in the virtual outfits. Outfits and fashion items can be changed similar to how fashion items can be changed in operation 444 in method 400 shown in FIG. 7A and described above. After the user has changed the outfits, process control is transferred to operation 530. In operation 530, the user confirms the displayed virtual outfit for the planned travel occasion and events. Process control is transferred to operation 540

In operation 540, the application can determine the weight for the selected virtual outfits. For instance, each fashion item may include weight data that is indicative of that items total weight or it may include that items actual weight. For instance, weight data may be a weight value associated with a particular weight range, e.g. between 0.1 and 3 lbs, between 3.01 lbs and 5 lbs, etc. The application can compare the weight data with preloaded weight ranges to determine the relative weight of the outfit. Alternatively, the weight data can bean electronic record of the fashion items actual weight. Weight data may be obtained from the retailer or manufacturer of the fashion item. Weight data can be automatically uploaded into computing device 20 from fashion item e-tag 70 (Figure SA), the sales receipt for the fashion item (FIG. 5B), or directly from the retail POS system 50 (FIG. 5C). Alternatively, the weight data can be input directly by the user if needed.

Figure 29:
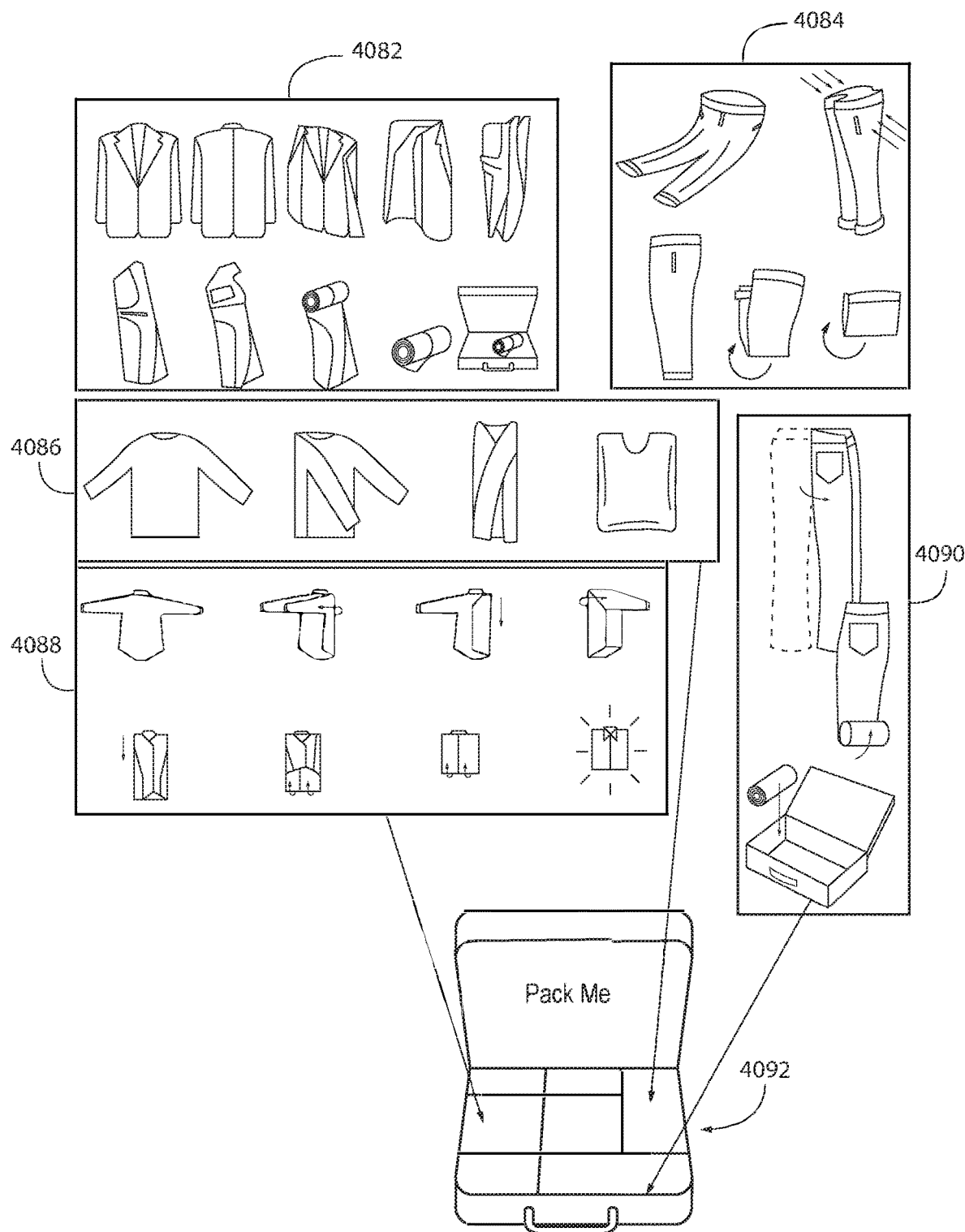
FIG. 29 illustrates a user interface displaying an exemplary screen that includes a graphical guide for packing the selection of desired fashion items for travel planning.

In operation 550, the application can assign virtual outfits to one or more luggage pieces in order to optimize the weight distribution among each luggage pieces. For instance, if the user is traveling by air, weight restrictions for luggage issued by air lines can limit amount of items one can carry without incurring excess baggage fees. In this case, the application is configured to help the user optimize weight distribution across the luggage pieces and potentially avoid excess baggage fees. In operation 550, the user can input the size and number of luggage pieces planned for the trip. The application can obtain luggage weight limits via $3^{rd}$ party websites or possibly via the user's electronic itinerary. The application then determines, based in the weight data for each item, the total number, and specific items for pricing in a particular luggage piece. Accordingly, the application can assist in packing for the trip by distributing the weight to luggage pieces so as to avoid overweight luggage. When all fashion items in the selected virtual outfits have been assigned to a luggage piece, process control is transferred to operation 560. Furthermore, in operation 550, the application is configured to illustrate for the user how to pack specific fashion items in the luggage for a better more compact fit. The application can determine, based on the fashion item model, if a folding or roll methodology for packing may better suited for a particular fashion item. The application is configured to cause the user interface to display graphically how each fashion item should be packaged, e.g. compressed, folded, or rolled. Furthermore, the application causes the user interface to graphically display how each fashion item should be arranged in the luggage. For instance, the application may identify one or more packing zones in the luggage and associate fashion items with particular packing zones. The user interface then illustrates the fashion item folding procedure and the fashion item being placed in the identified packing zone of the luggage. The application repeats the packing methodology for each fashion item being packed in the luggage. FIG. 29 illustrates an exemplary embodiment of how the user interface displays a packing methodology for fashion items in the luggage.

In operation 560, the application associates the selected outfits, travel occasion details, and specific events in the database. Process control may be transferred to wardrobe management operation 401, where the user can access other functional components of the application. In another embodiment, the application can manage disposition of fashion items during the planned trip. The application stores in computer memory an electronic indication that a particular item worn during the trip is dirty and needs to be cleaned. This data type is associated with that particular item's usage data. In one example, the application may store such items in a virtual "dirty clothes bag" This has the result of removing from possible selection as a part of a virtual outfit fashion items that are being cleaned and not actually present in the user's luggage during the trip. The fashion items are then cleaned and eventually returned to the user's luggage and electronic indication that those items are available for compiling outfits is stored in the computer memory. In another embodiment, the application is configured to update the previously compiled virtual outfits selected from the trip based on weather conditions. In one example, the application can receive weather data from a 3rd party websites during the trip. The location of the weather is based on a location identification modules running on the computing device and/or indication of the city or zip or post code. The application can compile the new virtual outfits based on weather data and the remaining fashion items that remain in the luggage that have not already been worn. In other words, the updated virtual outfits can be based on fashion items located in the user's luggage not marked as "dirty" or in stored in the "dirty clothes bag" as described above.

Referring to FIG. 9, a method 600 for managing the disposition of fashion items is illustrated. The method 600 is initiated in operation 602 when the user accesses the disposition planning portal displayed on the computing device. The user can access the disposition portion selecting a "Donate" or "Sell" element or by other means, such as through a main screen. Process control is transferred to operation 610. In operation 610, the application can identify infrequently used fashion items. An infrequently used fashion item may be a fashion item that is selected "n" times over predetermined period of time. In one example, "n" could be 0, 1, 5, or 10 depending on the circumstances and usage of the application. Process control is transferred to operation 620.

In operation 620, the user interface can display the infrequently used fashion items. The user interface can display the infrequently used fashion item in a listing form or graphically as discussed above. Process control is transferred to operation 630. In operation 630, the user can select one or more of the infrequently used fashion items. Process control is transferred to operation 640. In operation 640, the user can determine the disposition method for the infrequently used fashion items selected by the user. Disposition can include a) donation to one or more charities, b) sale of the fashion items, and/or c) gifting to a networked user via the social network. Once the disposition method is selected, process control is transferred to operation 650. In operation 650, the application can generate the packing slip that includes a listing of the infrequently used fashion items, the shipping address for the receiving entity of the items, the user's return address, and an economic value for each item. The user can modify any item in the packing slip as needed. The packing slip can be transmitted to a printer or a $3^{rd}$ party shipping service, such as FedEx or UPS. If the application is electronically linked to an account associated with a $3^{rd}$ party shipping service, the application can initiate the transmission of an electronic message to $3^{rd}$ party shipper to schedule a time to pick up the items. Process control is transferred to operation 660, In operation 660, the application can generate a statement of the value of the items transferred or shipped to the receiving entity. For instance, if the receiving entity is a charity, this statement can be used to verify donation value for tax purposes. Process control may be transferred to wardrobe management operation 401, where the user can access other functional components of the application as described above.

Referring to operation 640, one disposition method can include the sale of the fashion items. The application is configured to permit the sale of items to a limited number of networked user's. For instance, the application can associate one or more selected network users as users that can purchase items from a selling user's virtual closet. In one example, only a subset of the user's networked "friends" can have access to fashion items for sale. In an alternative embodiment, each fashion item can be offered for sale to all users of the application, including networked users and non-networked users. In such an embodiment, only the details concerning the particular fashion item for sale are accessible. For instance, when the user indicates that certain fashion items are available for sale to the entire population of application users, the application can create a listing or matrix of fashion items for sale based on the fashion item data stored in the database. Each user's computing device can include a portal that displays those items for sale. Associated with each fashion item for sale is a communication link, the selection of which initiates communication between the user interested in purchasing the fashion item and the user who posted the fashion item for sale. The selling user can then elect to transmit images, pictures, or other data regarding the fashion item. The communications can be used to exchange shipping information and/or payment information. The transaction can be completed with the purchasing user applying a credit to a payment account for the benefit of the selling user. The selling user's application can generate a packing slip as describe above, including the appropriate weight, etc. The selling user can then initiate shipment of the fashion item to the purchasing user using the packing slip. Throughout the process, the application can maintain certain details private among the users while at the same time facilitating the sale of fashion items.

FIG. 10 illustrates a method 700 for managing maintenance of fashion items. The method 700 is initiated in operation 704. In operation 704 fashion items due for maintenance are identified. Maintenance as used in this document includes cleaning and/or alterations. The application is configured to allow the user to identify fashion items manually. Alternatively, the application can determine items that are due for cleaning based on the time lapse from the last cleaning event for the fashion item. Fashion items can be identified for cleaning based on the number of uses or time the fashion items are worn. The user interface can override the identified items and/or add additional fashion items to the compiled fashion items due for cleaning.

In operation 710, the application can obtain and/or receive information from one or more service providers that are located within a predetermined distance of the user's computing device. Service providers may include dry cleaners, tailors, etc. In one example, the application can obtain information for possible service providers from a $3^{rd}$ party website via the communications network. The application can display a listing of candidate service providers, or upload information for previously used service providers. Process control is then transferred to operation 720 where the user can select a service provider. Process control is transferred to operation 730.

In operation 730, the application can initiate the transmission of a message to the selected service provider regarding fashion items due for maintenance. The service provider can pick up the fashion items or the user can drop the items off at the service provider. Process control is transferred to operation 740. In operation 740, an electronic indication that particular item is out for cleaning is stored in computer memory and is associated with that items' usage data. This has the result of removing from possible selection as a part of a virtual outfit fashion items that are being cleaned and not actually present in the user's physical closet. The fashion items are then cleaned and eventually returned to the user's physical closet. The application can be configured to display a message regarding whether or not the items sent out for cleaning have been returned. The user can respond and input whether or not the items have been returned. Alternatively, the user can directly input if the fashion items have been returned. Once the application receives an input that the fashion items sent for cleaning have been returned, process control is transferred to operation 750. In operation 750, the electronic indication that a particular item is out for cleaning is removed. An electronic indication that the fashion item was cleaned, when it was cleaned, and what service provider was used, is stored in the computer memory as user wardrobe data. At operation 730, process control may be transferred to wardrobe management operation 401, where the user can access other functional components of the application as described above. However, the user can proceed to other wardrobe functions at any step along method 700.

In another example, the application can identify a tailor or alteration service provider. The application is configured to permit the user to identify a specific location on the fashion item that needs alteration. The application can also include a mechanism to input the user's specific measurements, such as hem, waist size, sleeve length, neck, bust, etc. The measurements can be transmitted to the alteration service provider so that the service provider can apply the user's measurements to the specific fashion item that needs alternation. The application can also incorporate more detailed measurements for custom clothing measurements and tailored garments.

Turning to the FIG. 11, the present disclosure includes method 800 for associating one or more user's in a social network 40. In FIG. 11, the method 800 initiates in operation 810 where the application processes network invitation requests from one user to another user. Process control is transferred to operation 820. In operation 820, the application verifies acceptance of the invitation and process control is transferred to operation 830. In operation 830, the application associates the networked users with each other in the database. Process control is transferred to operation 840 where the application permits, among networked users, access to each other's wardrobe data. Process control is transferred to operation 860. In operation 860, the application can establish a communication link between users associated via the social network 40. In operation 870, the application causes the user interface to create an access portal to other networked user's wardrobe data. Networked users can then comment, like, and/or view, each other's fashion items. Networked users can input a like or "kiss" notifications indicating a preference for specific fashion items. Process control is transferred to operation 880. In operation 880, the application associates networked user's fashion item and outfit preferences in a database. In one example, the application can compile outfit combinations for a user based in part on networked user's selected outfits. For instance, the application can coordinate outfits among multiple networked users that have indicated they are attending similar events.

In another embodiment, the application is configured to coordinate the outfits for a specific planned event. For instance, the application is configured so that a user can post and/or initiate an invitation for a particular event and/or create an event group. Examples of such event groups may include "guest list," "bridesmaid list," or "rehearsal dinner." The user can invite specific users to the event group. The invited users may include either networked users or other users not associated with the posting user via the social network 40. The application allows the posting user to post a specific dress code for the planned event into a group portal. The specific dress code can be displayed with descriptive words, images, or a combination of words and images. The invited guests attending the event can access the group portal and see the specific dress code. This gives each invited guest opportunity to see the appropriate attire for the event and each user can dress accordingly. It should be appreciated that networked users invited to the event group would have access each other networked user's closet as indicated above. The application also facilitates communication between and among the users within the event group. In one example, the application can facilitate a specific group chat for the planned event. This allows the users within the group to communicate with one another, regarding transportation to the events, etc., such communication can reduce numerous emails, group text messages, etc. Instead, the application incorporates communications among the group all into a single communications link. The application allows a user to transmit fashion items to other users in the group via the communications link. The user can share specific fashion items they have in their closet or that they purchased from a retailer. Furthermore, the application can interface with $3^{rd}$ party websites, e.g. invitation websites. In addition, the application can coordinate attire, colors, etc., for all users in the group.

The application allows networked users to share preferences with each other. In one example, one user can receive input regarding the purchase of the fashion items from a retailer or retailer POS system from other users. As described above, the computing device is configured to scan a bar code or the like (e.g. e-tag) for a particular fashion item when the user is at the retail location. The application compiles the scanned data into a fashion item model and submits the fashion item model for comment to all of the networked users. For instance, the application can extract fashion item data and determine if the fashion item scanned is already present in the user's virtual closet. The application then initiate a communication to all the networked users and permit networked users to view the fashion item. In response, the networked users can comment on the fashion item and advise on purchase decisions. The application can also display a voting module so that each user can vote on whether or not to purchase the fashion item. Along with the voting module, the application can cause the display of a graphical image of the fashion item, such as the fashion item model and/or a stock image of the fashion item. In another example, the user can take a picture of the fashion item and submit for networked user preferences and voting through the application.

FIGS. 12A through 29 illustrate exemplary displays of a graphical user interface 28 running on the computing device 20. The user interface 28 illustrated in FIGS. 12A through 28 implement various aspects of the systems and methods described above via inputs received by the user as will further detailed below.

FIG. 12A illustrates an exemplary user interface 28 displaying a screen 1002 on the computing device 20. The screen 1002 may be the initial screen displayed after the application has been downloaded on the computing device 20. The screen 1002 includes multiple input elements or regions 1004, 1006, 1008, 1010, and 1012. Each region 1004, 1006, 1008, 1010, and 1012 further includes a visual representation that is indicative of a lifestyle demographic, and or an event. Each visual representation can include fixed elements, such as in an image (e.g. jpeg), or it may include moving elements, such as in a gif or animated gif, video, or other graphically created video. As shown in FIG. 12A, input region 1004 includes a first visual representation that is associated with a first lifestyle demographic. In one example, the first lifestyle demographic may be a high school student, and the first visual representation may be of a female or male dressed casually and opening up school locker in a hallway of school building. Input region 1006 includes a second visual representation that is associated with a second lifestyle demographic. In one example, the second lifestyle demographic may be a college student and the second visual representation may be may be of a female studying in a library or walking with friends in a university setting. Input region 1008 includes a third visual representation that is associated with a third lifestyle demographic. In one example, the third lifestyle demographic may be a young professional, and the third visual representation may be of a young female dressed smartly and waiting for an early morning subway. Input region 1010 includes a fourth visual representation that is associated with a fourth lifestyle demographic. In one example, the fourth lifestyle demographic may be an experienced professional, and the fourth visual representation may be of a female or male dressed in classic modern suit and carrying a briefcase or portfolio. Input region 1012 includes a fifth visual representation that is associated with a fifth lifestyle demographic. In one example, the fifth lifestyle demographic may be "on-the-go" parent, and the fifth visual representation may be of a female or male driving a vehicle with several children in the back. The particular demographic types and visual representations described above are exemplary. Other demographic categories, in addition to those explicitly set forth above, could be used. Further, more than five or less than five visual representatives may be included. For example, the screen may include one visual representation.

In FIG. 12A, the user interface is configured to allow a user to select one the displayed input regions 1004, 1006, 1008, 1010, and 1012. Once a user's selects one of the input regions 1004, 1006, 1008, 1010, and 1012, the application associates the lifestyle demographic associated with the selected region with an electronic identifier for the application file downloaded in the computing device 20. The user's data, garment data, usage data, etc., is also associated with the electronic identifier. Selection of any one of the input regions 1004-1012 causes the user interface to display screen 1020 shown in FIG. 12B.

Turning to FIG. 12B, the screen 1020 includes a plurality of event selection elements 1022 each associated with a different event. As illustrated, the screen 1020 includes a work event element 1024, casual event element 1026, night out event element 1028, and a date event element 1030. Event selection elements include a visual representation of the particular event Certain events may be associated with different age group of users. The user's selection of a particular event may provide additional user data, such as an age range associated with that particular event. The user data associated with the selected event can be used to identify lifestyle demographics, and a style genre. The user data can be used to compile virtual outfits. Furthermore, the visual representation of the event may also be representative of the user's selected lifestyle demographic selected in screen 1002 (FIG. 12A). In addition, each visual representation of the event includes fixed elements, such as in an image (e.g. jpeg), or it may include moving elements, such as in a gif or animated gif, video, or other graphically created visual. For example, the work event element may display a person sitting in a cubicle. Alternatively, the event selection elements can include words for the particular events, such as "WORK", "NIGHT OUT", etc. The events illustrated in FIG. 12B are exemplary. Other event types, in addition to those explicitly set forth above and shown in FIG. 12B, could be used. For instance, an event can include a wedding, job interview, Sunday brunch, athletic event such as a baseball game, etc. Each event selection element may be associated with a range of outfit styles, e.g. dresses, bottoms, etc.

Screen 1020 may include weather related information for the particular location of the computing device 20. The weather information could be obtained over the communications network from a third party provider and/or via sensors in the computing device.

In FIG. 12B, the user interface is configured to allow a user to select one the displayed event selection elements 1022. When the user's select a particular event selection element, the application records the selected event for virtual outfit planning in the methods 300 and 400 described above. In addition, selection of the event selection element causes the user interface to display additional screens, dependent on which event is selected. For example, user's selection of the work event element 1024 causes the user interface to display screen 1040 illustrated in FIG. 12C.

Figure 12D:
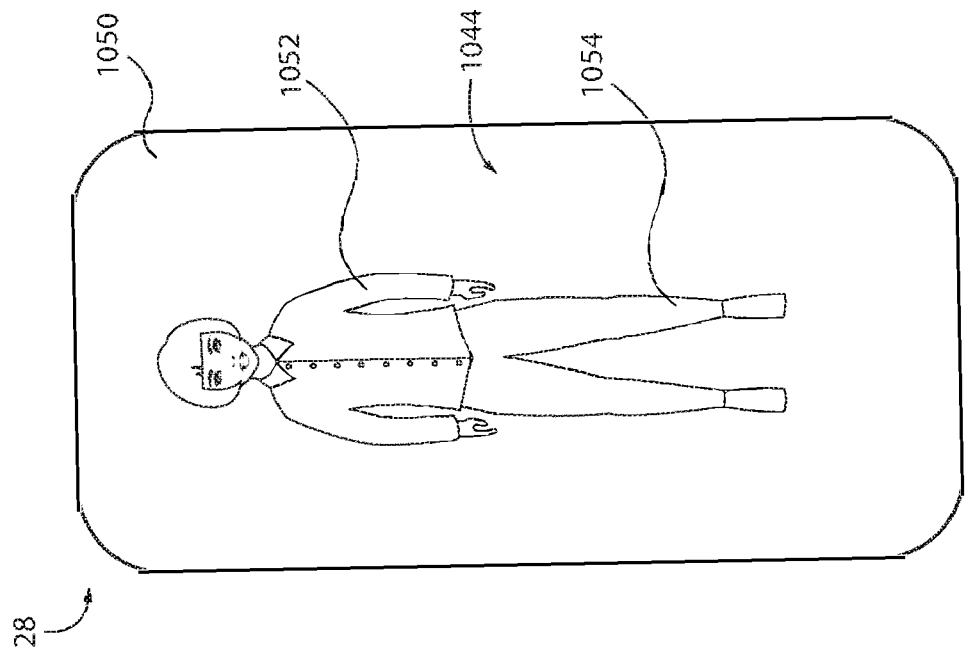
Figure 12C:
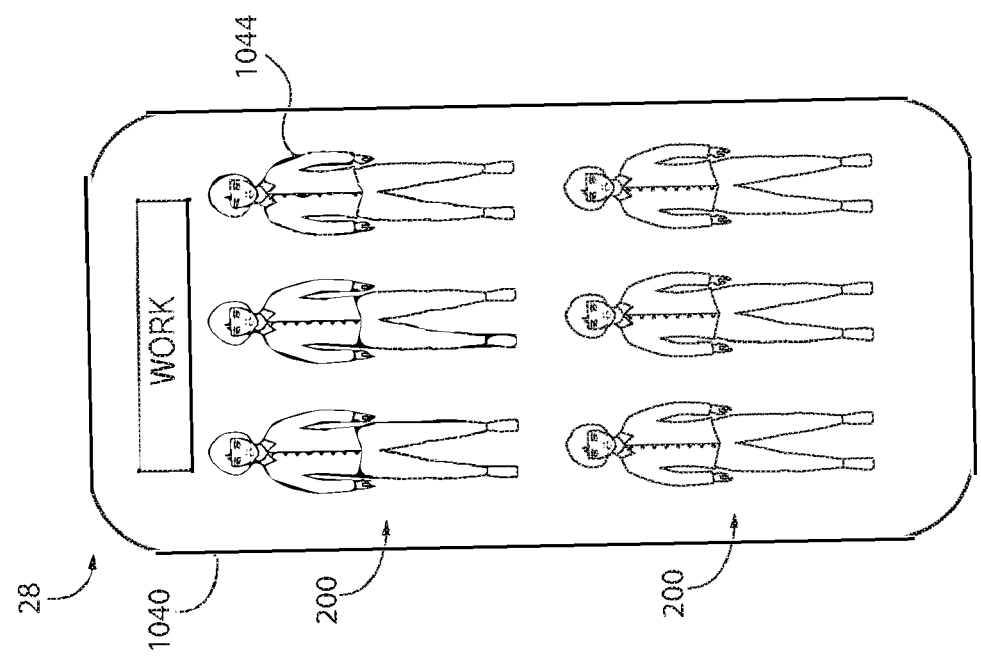

Turning to FIG. 12C, the screen 1040 displays a plurality of initial virtual outfits 200 that may be suitable based on the user's selected lifestyle demographic and selected event. Additional user data obtained via selection of the particular event and or lifestyle demographic, such as sex and age range, may be used to display the initial virtual outfits 200. The initial virtual outfits 200 are based on a collection of basic fashion items included in the application during the initial download. The collection of basic fashion items may not be representative of the user's physical closet at this point. As described above, each initial virtual outfit 200 can include an upper body fashion item and lower body fashion item, optional outerwear item, a footwear item, and an accessory item. In some cases, a full length fashion item, such as a dress, a footwear, and accessory comprise the virtual outfit. FIG. 12C displays six (6) total initial virtual outfits 200. More or less initial virtual outfits could be shown in screen 1040.

In FIG. 12C, the user interface is allows a user to select one the virtual outfits 200. As illustrated, the user's selection of virtual outfit 1044 causes the user interface 28 to display of screen 1050 as shown in FIG. 12D.

Turning to FIG. 12D, the user interface 28 displays on screen 1050 the virtual outfit 1044 as a combination of fashion items. As illustrated, the virtual outfit 1044 includes an upper body fashion item 1052 (or atop fashion item), a lower body fashion item 1054 (or bottoms), an outerwear fashion item 1056 (not shown) (e.g. jacket), an accessory item 1058*a* (jewelry), and a footwear item 1058*b*. Items 1058*a* and 1058*b* are not shown. In some instances, the virtual outfit 1044 includes full body fashion item 1059 (not shown), such as a dress. While the virtual outfit 1044 is shown with each component spatially separated, the user interface is configured to display each fashion item over a human form and layered based on the fashion item position data and specific layering. For instance, the outerwear fashion item 1036 can be layered over the upper body fashion item 1052 so that the look of the two combined as they would be worn can be seen by the user, e.g. as shown in FIG. 25B. Accordingly, the virtual outfit 1044 is similar the virtual outfit 200 described above and has similar elements.

In FIG. 12D, the user interface 28 is configured to allow a user to adjust or change the one or more fashion items 1052, 1054, 1056, 1058*a* and/or 1058*b* in the displayed virtual outfit 1044. As illustrated, selection of one fashion item 1052 causes the user interface to display screen 1060. It should be appreciated that selection of any particular fashion item would cause the user interface to display a screen similar to the screen 1060 and further described below.

Turning to FIG. 13A, the user interface 28 displays a screen 1060 including a fashion item modification element 1062 and a color scheme selection element 1070. The fashion item modification element 162 is a visual representation of different fashion items for the selected garment region. The user interface 28 permits the user to scroll through different fashion items displayed in the fashion item modification element 1062 in order to determine which one he or she prefers for the selected event. As illustrated, the fashion item modification element 1062 is a rotatable path 1064 that includes different stored fashion items 1063 from the collection of basic items discussed above. A gesture, pressure, or other means of selection, applied along line 1066 causes the rotatable path 1064 to cycle through the different fashion items until the user identifies one for incorporation into the virtual outfit 1044. The user interface can magnify a particular fashion item, similar to how fashion item 1068 is magnified in FIG. 13A As noted above, in alternative embodiments, the fashion item modification element 1062 can be a linear slide element that allows the user to scroll through different fashion items linearly. In any event, the fashion item modification element 1062 element allows the user to scroll through each fashion item and select a preferred fashion item for presentation in the virtual outfit 1044. In the example shown in FIG. 13A, the user interface allowes the user to scroll through upper body fashion items until the long-sleeve placket shirt 1066 was displayed. Selection of the shirt 1066 applies that fashion item type to the upper body fashion item 1052 shown in screen 1080 shown in FIG. 138. After selecting the desired fashion item, the color scheme can be applied to the fashion item.

The color scheme selection element 1070 can be a color wheel 1074 that displays colors based on stored color data. The user can scroll through the color wheel 1074 and select a color to be applied to the wire frame model of fashion item 1052, as illustrated in screen 1080 shown in FIG. 13B. In alternative embodiments, the color section element 1070 can be a color grid, or other arrangement of colors that allow the user to scroll through and select a desired color. The user interface is configured to permit modification of each one of the remaining fashion items fashion items 1052, 1054, 1056, 1058*a* and/or 1058*b* of the virtual outfit 1044. Further, modification of the displayed fashion items allows the user to generate virtual fashion items that correspond to actual fashion items in the user's physical wardrobe. Though not illustrated, the application can send a push notification asking the user to confirm if the modified fashion item is present in the user's physical closet Turning to FIG. 13B, the user interface 28 displays modified virtual outfit 1082, select virtual outfit element 1084, and save fashion items element 1086. Selection of the save fashion item element 1086 stores the modified each fashion items 1052, 1054, 1056, 1058*a* and/or 1058*b* as the user's wardrobe data. The user's stored fashion item may match the user's actual physical fashion items. The select virtual outfit element 1084 allows the user to select the modified virtual outfit for the indicated event. As described above, the application can store the selected virtual outfit in the database. At this point, the application may, present series of screens designed to require the user to input additional information, such as name, address, and current sizes for different body types.

FIGS. 12A-13B illustrate an exemplary user interface that can implement the initial onboarding of user data and fashion items as described with respect to method 301). FIGS. 14-29 illustrated how the user interface 28 can help implement methods 400, 500, 600 and 600 as described above.

Turning to FIG. 14, the user interface 28 is configured to display main or home screen 1100. The main screen 1100 includes a number of portals that provide access to different aspects of the user's wardrobe data. As illustrated, screen 1100 includes a view closet element 1102, a dress me element 1104, a travel planning element 1106, an add items element 1108 and calendar element 1110.

In FIG. 14, the add items element 1108 can be selected by the user to add fashion items to the user's wardrobe data. Fashion items can be added via the process 300 described above and illustrated in FIG. 8A-6C. Alternatively, the fashion items can be added scanning garment information at retail point of sale as illustrated in FIG. 5A-5C The calendar element 1110 is a portal to an existing calendar where planned events are stored. The application can access events stored in the calendar to help compile virtual outfits ne application can also aid in outfit planning for multiple events scheduled for the same day. For instance, if the user has a work event during the day and a night out event later that evening, the application can send a notification reminding the user to carry the outfit for the night out event at a later time. The add items 1108 can be selected by the user to add fashion items to the user's virtual closet and wardrobe data sets. Furthermore, selection of the add items element 1008 can cause display of purchase portal, which allows the user to purchase specific items that are coordinate or relevant the previously selected outfits.

In FIG. 14, selection of element 1102 causes the display of screen 1120 shown in FIG. 15A. In FIG. 15A, the screen 1120 includes "my closet" portal 1122 and a friends closet portal 1124. The "my closet" portal 1122, also referred to the user's virtual closet 1122, allows the user to access their wardrobe data. Selection of the portal 1122 causes the display of screen 1130 shown in FIG. 15B. In screen 1130, the user interface 28 displays an item element 1132, "recently worn" element 1134, favorites element 1136, Friends' top picks element 1138, and an organize element 1140.

The use interface 28 is configured to allow the user to navigate through additional screens via selection of different elements 1132, 1134, 1136, 1138, and 1140. Selection of item element 1132 causes the display of a screen 1150 including a graphical virtual closet 1152. The graphical virtual closet 1152 displays different portals 1154 associated different categories of fashion items. As illustrated, the category fashion items portals include tops 1154*a*, bottoms 1154*b*, jackets 1154*c*, dresses 1154*d*, shoes 1154*e*, accessories 1154*f*, swimwear 1154*g*.

Figure 17A:
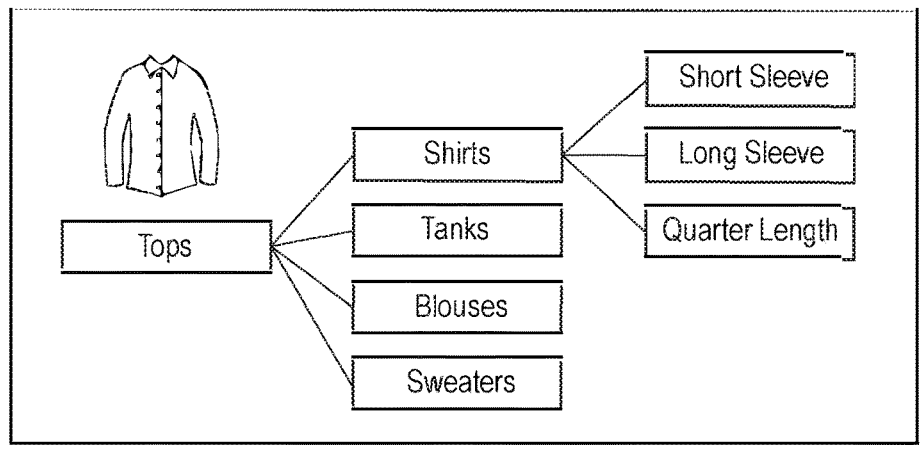
FIGS. 17A through 17G are exemplary data elements displayed based on selection of the various access portals shown in FIG. 16.

The user interface 28 is configured to permit a user to navigate through each displayed category portal to access fashion items stored as wardrobe data. For instance, selection of tops portal 1154*a* causes the display of window that includes a hierarchal tree 1156*a* of the user's tops as illustrated in FIG. 17A. The hierarchal tree 1156*a* indexes the different types of tops Individual tops may be a word element or a small image of the particular top. If a user clicks, or selects, one of the tops in tree 1156*a*, a window is displayed that includes information regarding that specific top. Information may include Brand, size, last time worn, last event, last time dry cleaned, among other types of information.

Figure 17B:
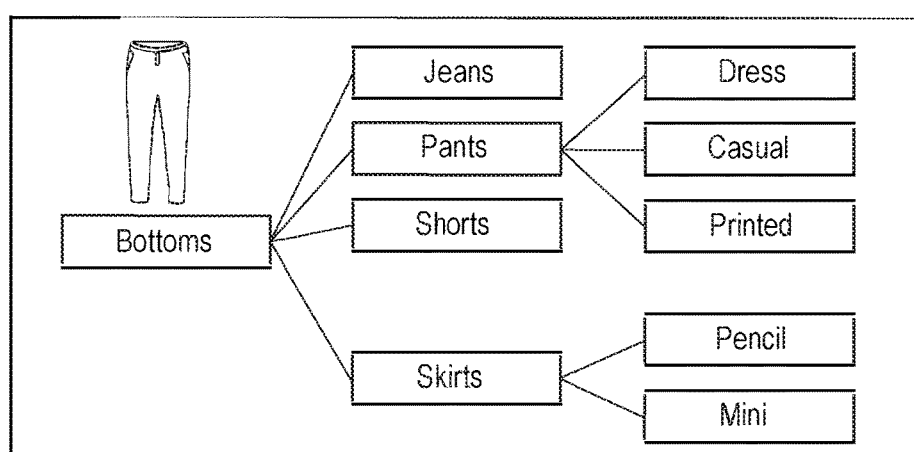
Figure 17C:
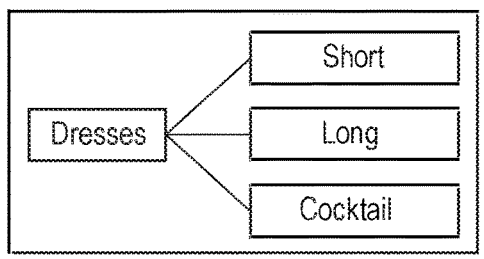
Figure 17D:
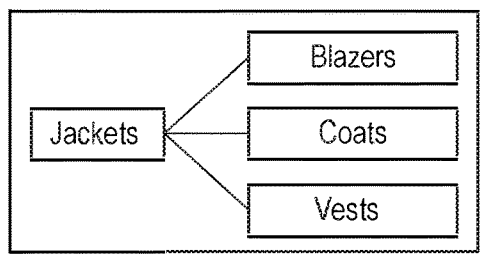
Figure 17E:
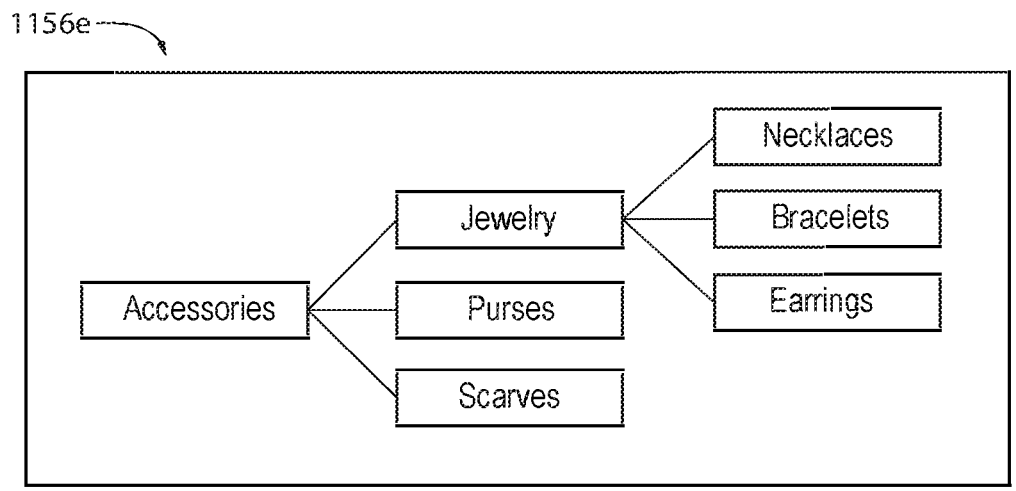
Figure 17F:
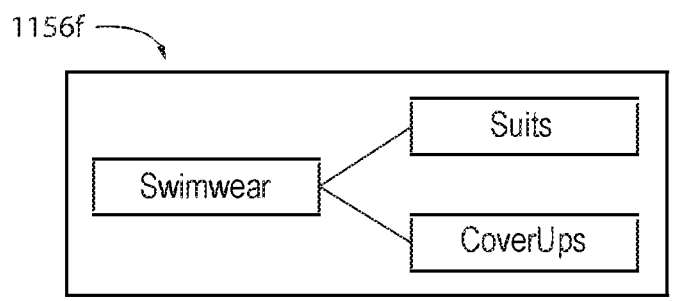
Figure 17G:
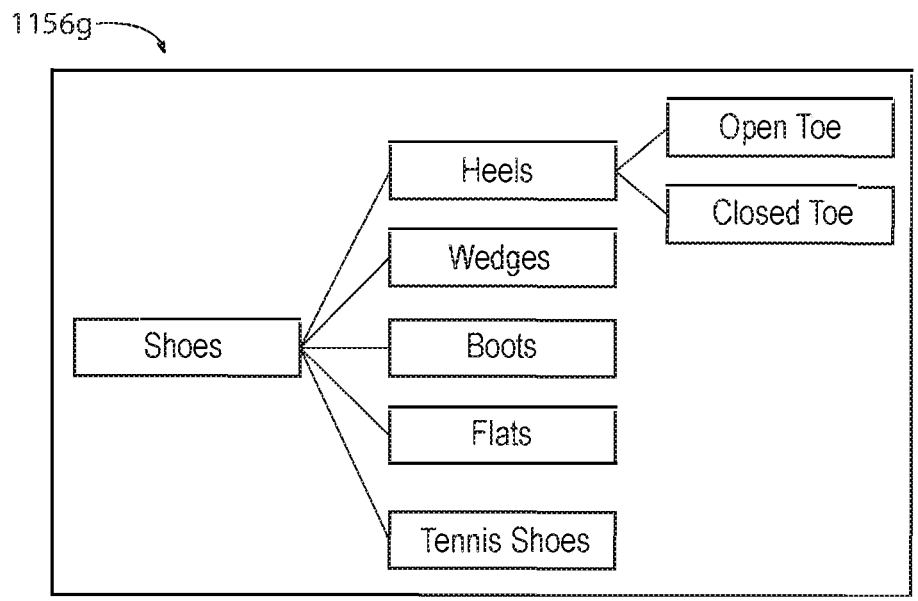

Selection of bottoms portal 1154*b* allows a user to navigate through a hierarchal tree 1156*b* of the user's bottoms as illustrated in FIG. 17B. The tree 1156*b* indexes the different tops according to specific types of bottoms. Selection of dresses portal 154*c* allows a user to navigate through a hierarchal tree 1156*c* of the user's dress as illustrated in FIG. 17C. The tree 1156*c* indexes the different types of dress. Selection of jackets portal 1154*d* allows a user to navigate through a hierarchal tree 1156*d* of the user's jackets as illustrated in FIG. 17D. The tree 1156*d* indexes the different types of jackets. Selection of accessories portal 1154*e* allows a user to navigate through a hierarchal tree 1156*e* of the user's accessories as illustrated in FIG. 17E The tree 1156*e* indexes the different types of accessories. Selection of swimwear portal 1154*f* allows a user to navigate through a hierarchal tree 1156*f* of the user's swimwear as illustrated in FIG. 17F The tree 1156*f* indexes the different types of swimwear. Selection of shoes portal 1154*g* allows a user to navigate through a hierarchal tree 1156*a* of the user's shoes items as illustrated in FIG. 17G. The tree 1156*g* indexes the different types of shoes. The hierarchal index illustrated in FIGS. 17A-17G is exemplary.

The specific fashion items can be displayed in a number of configurations and arrangements in manner that allows the user to access and view specific fashion items. For instance, the each fashion item can be arranged along rotatable path that the user can cycle through the vie,% specific items. The path of specific fashion items can be linear and extend horizontally with respect to the screen. In other embodiments, the path of specific fashion items can be linear and extend vertically with respect to the screen.

Figure 18:
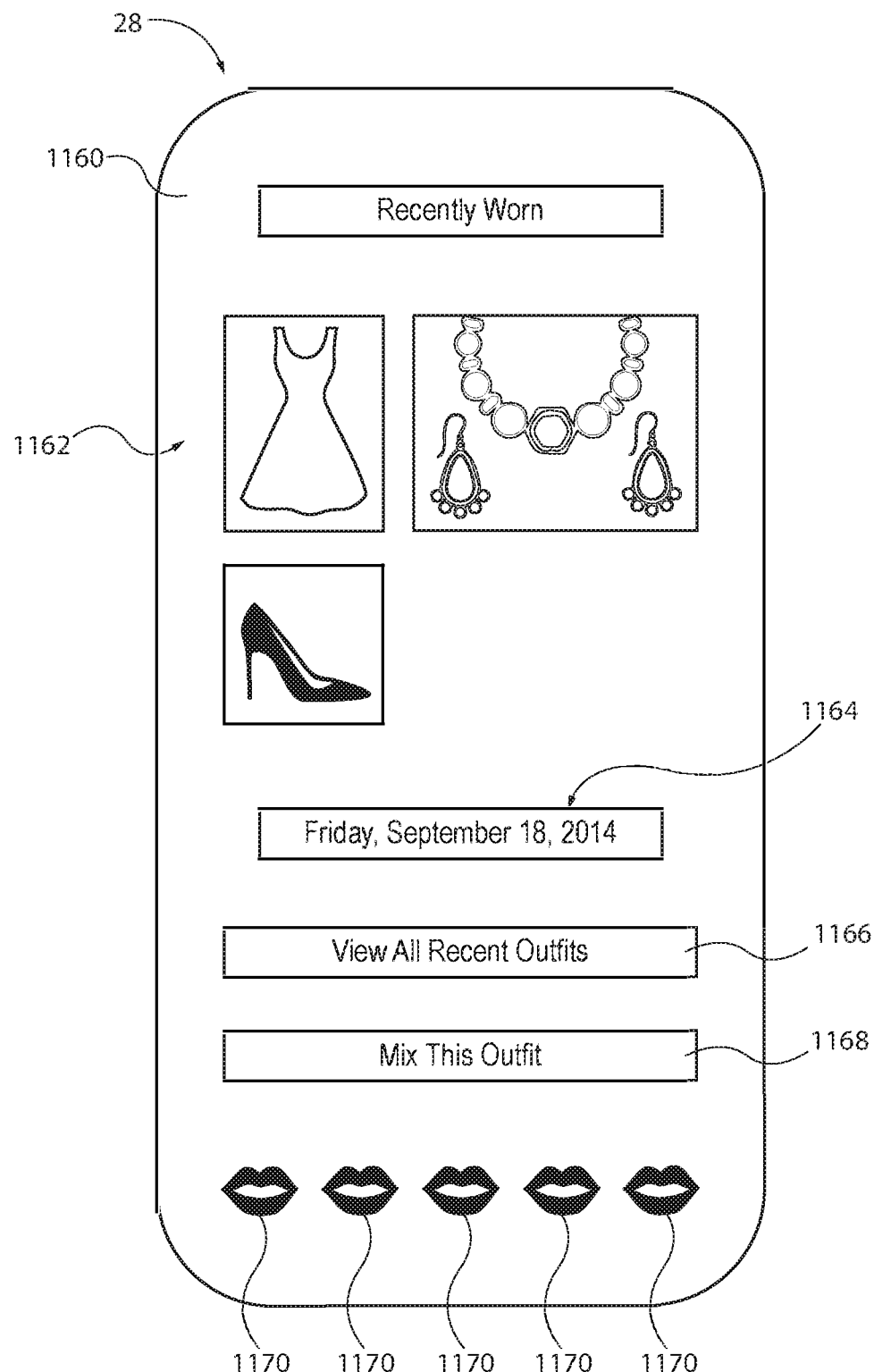
FIG. 18 illustrates a user interface displaying an exemplary screen that includes a recently worn portal.

When the user selects the recently worn element 1134 in FIG. 15B the user interface 28 displays screen 1160 as shown in FIG. 18. The screen 1160 includes a display of one or more recently worn virtual outfits 1162 and associated usage data 1164. Display screen 1160 may include recent outfits element 1166, mix element 1168, and on or more graphical tags 1170 indicating the user's networked friends preference for the recently worn virtual outfit 1162. Selection of the recent outfits element 1166 can cause user interface 28 to display a window (not shown) or screen (not shown) that includes a number of recently worn outfits. The display of recently worn outfits could include a thumbnail image of each recently outfits arranged in grid-like pattern. Alternatively, the display of recently worn outfits can be arranged along a rotatable path configured so that the user can cycle through each recently worn outfit. Usage data can be displayed with each recently worn outfit. Selection of the mix element 1168 allows the user to modify the displayed recently worn outfit 1162. More specifically, upon selection of nix element 1168, the user interface displays input elements (not shown) that allow the user to add accessories and/or modify one or more components of the recently worn outfit. The modified outfit can be stored as a favorite.

Figure 19B:
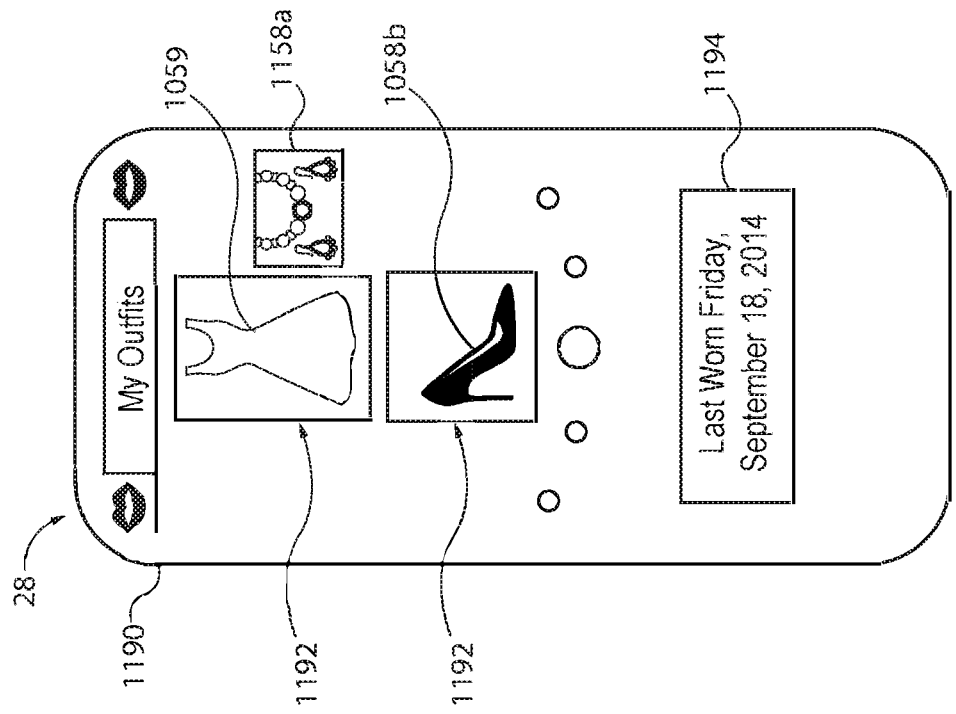
FIG. 19B illustrates a user interface displaying an exemplary screen that includes the user's favorite virtual outfits.
Figure 19A:
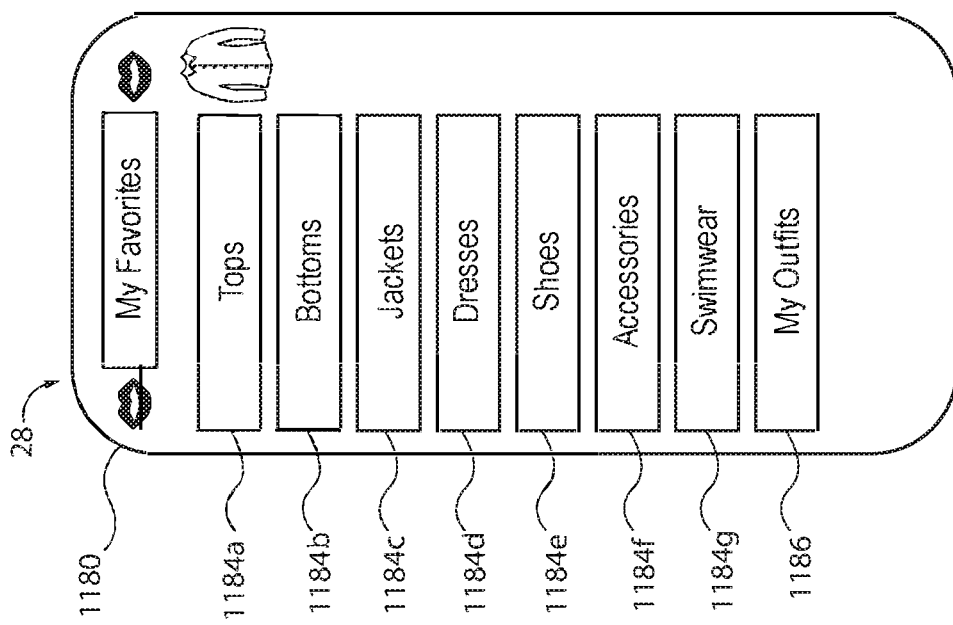
FIG. 19A illustrates a user interface displaying an exemplary screen that includes access portals to user's favorite fashion items and outfits.
Figure 20:
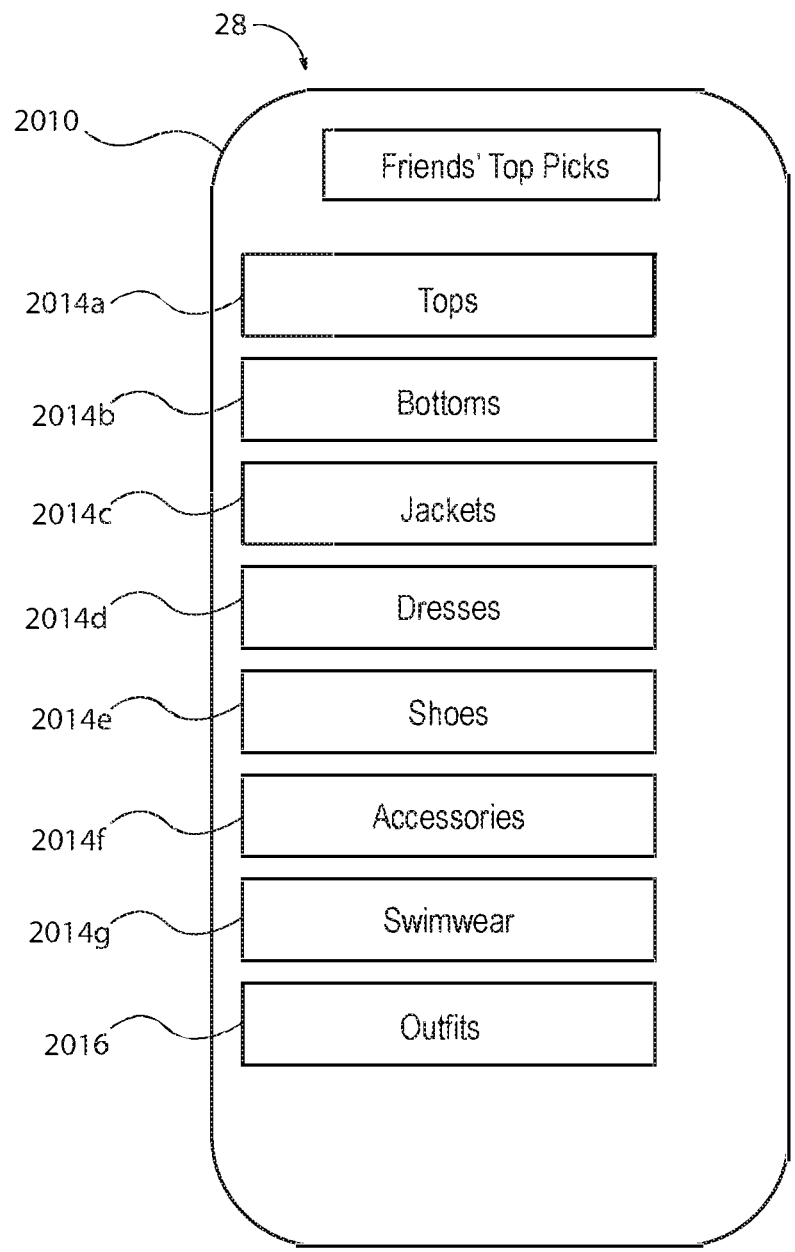
FIG. 20 illustrates a user interface displaying an exemplary screen that includes networked users' preferences for a particular user's fashion items.

Referring back to FIG. 15B, when the user selects the favorites element 1136 in screen 1130, the user interface 28 displays screen 1180 as shown in FIG. 19A. As noted above, the application allows the user to identify and store fashion items as favorites or preferred fashion items. In addition, the application allows the user to identify and store certain virtual outfits as favorites or preferred virtual outfits. As shown in FIG. 19A, the screen 180 includes a plurality of preferred fashion item category elements 1184 and a preferred outfit element 1186. As illustrated, the fashion item category elements include a tops element 1184a, bottoms element 1184b, jackets element 1184c, dresses element 1184d, shoes element 1184e, accessories element 1184f, and swimwear element 11843. Selection of any category element permits access stored fashion items for that specific category. The stored fashion items can be displayed any number of ways, such via grid pattern, rotatable path, linear path, or other means of display.

In FIG. 18, selection of the preferred outfits element 1186 causes the graphical user interface to display screen 1190 as shown in FIG. 198. Screen 1190 includes a recently saved, favorite virtual outfit 1192 (or saved virtual outfit) and usage data element 1194 for the displayed saved, outfit 1192. In the exemplary screen 1190 shown in FIG. 19B, the saved virtual outfit 1192 includes a full body fashion item 1059 (such as a dress) an accessory item 1058a (jewelry), and a footwear item 1058b. Thus, the displayed favorite virtual outfit 1192 is similar the virtual outfit 1044 and 200 described above and may include an upper body fashion item 1052 (or a top fashion item), a lower body fashion item 1054 (or bottoms), and an outerwear fashion item 1056 (or jacket). Reference numbers 1052, 1054, 1056, 1058a, and 1058b are illustrated in FIG. 12D. Usage data element 1194 indicates the last time the displayed virtual outfit 1192 was last worn and optionally includes the event that the saved virtual outfit 1192 was compiled for Referring back to FIG. 15B, when the user selects the Friend's Top picks element 1138 in screen 1130, the user interface 28 displays screen 2010 as shown in FIG. 21) As noted above, the application allows the networked user or "friend" access certain aspects of the user's wardrobe data. Each networked user can identify their one favorite fashion item and outfit. Screen 2010 includes a plurality of friend top picks for each fashion item category 2014 and outfit 2016. As illustrated, the fashion item category elements include a tops element 2014a, bottoms element 2014b, jackets element 2014c, dresses element 2014d, shoes element 2014e, accessories element 2014f, and swimwear element 2014g. Selection of any category element allows access to friends' indicated favorite fashion items for that specific category. The stored fashion items can be displayed any number of ways, such as, for example, via grid pattern, rotatable path, linear path or other means of display. Similarly, selection of the outfits element 2016 allows access to networked users' indicated favorite virtual outfit. The stored outfits can be displayed in a grid, along a rotatable path, linear path or other means of display When the user selects the organize element 1138 in screen 1130 in FIG. 15B, the user interface 28 displays an organization screen 2020 as shown in FIG. 21. The screen 2020 shown in FIG. 21 includes a number of elements that allow the user to reorganize how the wardrobe data is displayed. As illustrated, the user can add category 2022, such as t-shirts, or delete a category 2024. The user can organize the closet manually 2026, such as by reorganizing sub categories and how fashion items are displayed. The screen 2020 also includes a clean out element 2028 that helps user dispose of fashion items. Disposition of fashion items will be discussed further below.

When the user selects the clean out element 2028 in FIG. 21, the user interface displays a disposition portal on screen 2030 as shown in FIG. 22. In screen 2030, the user interface displays one or more item usage elements 2032 and 2034 and a disposition element 2038. The item usage element 2032 and 2034 display the fashion items that have not been worn for a predetermined time period. As illustrated, the first usage element 2032 displays fashion items that have not been worn within the last calendar year. The first usage element 2032 displays fashion items along a moveable path or grid. The application may also suggest items that should be disposed of due to style differences of a particular item. The usage element 2032 includes a "dispose of all items" element 2035 and/or a manual selection element 2036. Selection of element 2035 selects all displayed fashion items and associates each item with a disposition item indicator. Usage item element 2034 is similar to usage item element 2032 but displays fashion items not worn over a longer period of time Usage item element 2035 includes similar elements 2035 and 2036. When fashion items are selected for disposition, the user can select disposition element 203H As illustrated, selection of disposition element 2038 cause the user interface to display screen 2050 shown in FIG. 23, which allows the user to donate the fashion items to an entity, such as Goodwill, the Salvation Army, etc. In screen 2050, a number of charity identifiers are displayed, selection of which initiates the generation of a packing slip for each items, shipping label, and a donation receipt. The graphical user interface 28 displaying screen 2030 and 2050 permit user inputs that initiate the process 600 described above and shown in FIG. 9.

Referring back to FIG. 15A, selection of the friends closet portal 1124 causes the display of screen 2060 shown in FIG. 24A. In screen 2060, the user interface displays access portals 2064, 2066 and 2068 each being associated with a different networked user A, B, and C, respectively. Selection of one of the access portals 2064, 2066, and 2068 gives the user access to that particular networked user's virtual closet. As illustrated, the selection of the element 2038 causes the application to access the wardrobe data for networked user A The user interface 28 then causes the display of screen 2070 shown in FIG. 24B The screen 2070 allows access to networked user A's wardrobe data. The screen 2070 includes networked user identifier 2072, such as "Jill's Closet," a recently worn virtual outfit 2074, and a portal 2076 to networked user A's favorite fashion items, a portal 2078 to user A's recently won outfits, and a portal 2079 to networked user A's wish list of fashion items. The wish list of fashion items can be linked to retailer sites or a payment portal that allows purchase of one or more of the fashion items.

Referring back to FIG. 14, which illustrates the main or home screen 1100 and which includes the "dress me"

element 1104. Selection dress me element 1104 initiates method 400 whereby the application compiles on or more virtual outfits based on the at least a planned event, usage data, and lifestyle demographic data. Furthermore, selection of the dress me element 1104 causes the user interface 28 to display screens 3010, 3040 and 3060 based on user inputs. The user interface 28 includes input elements in screens 3010, 3040, and 3060 that initiate the process 400 described above and illustrated in FIGS. 7A through 7B How the user interface 28 is configured to display the compiled virtual outfits for the planned event is described next.

In FIG. 14, selection of dress me element 1104 can cause the user interface to display screen 3010 as shown in FIG. 25A. In FIG. 25A, the screen 3010 includes a plurality of event selection elements 3022. As illustrated, the event selection elements 3022 includes a work event element 3024, a casual event element 3026, a night out event 3028, and other event element 3030. Like event selection elements 1022 described above, the event selection elements 3022 each include a visual representation of the particular event. Furthermore, the visual representation of the event may also be representative of the user's selected lifestyle demographic selected in screen 1010 (FIG. 12A). In addition, each visual representation of the event includes fixed elements, such a in an image (e.g. jpeg), or it may include moving elements, such a in a gif or animated gif, video, or other graphically created visual. For example, the work event element may display a person sitting in a cubicle. Alternatively, the event selection elements can include words for the particular events, such as "WORK", "NIGHT OUT", etc. The events illustrated in FIG. 25A are exemplary. Other event types, in addition to those explicitly set forth above and shown in FIG. 25A, could be used. For instance, an event can include a wedding, job interview, Sunday brunch, athletic event, etc. Because certain events may be associated with different age groups of users, the user's selection of particular event may provide additional user data, such as an age range associated with particular event. The user data associated with the event selection can be used to help compile virtual outfits as the user continues to use the application Selection of any one of the event selection elements 3022 can initiate method 400 whereby at least one virtual outfit is compiled as described above. Selection of an element 3022 in the application can cause the user interface to display screen 3040 shown in FIG. 25B and that includes virtual outfits 3050 compiled for the specific selected event. As illustrated in FIGS. 25A and 25B, the user selected work event element 3024 and the application compiled a virtual outfit 3050 based on the selected event, lifestyle demographic, usage data, and optionally weather information. As shown in FIG. 25B, the virtual outfit 3050 includes an upper body fashion item 3052 (or a top fashion item), a lower body fashion item 3054 (or bottoms), an outerwear fashion item 3056 (or jacket), and an accessory item 3058a (jewelry) and 3058b (shoes). In some instances, the virtual outfit 3050 includes full body fashion item 3059 (not shown), such as dress. The displayed virtual outfit 3050 is similar to the virtual outfit 200, 1044 and virtual outfit 1192 described above.

In FIG. 25B, the application has compiled and displayed the virtual outfit 3050. The user interface 28 is configured to permit the user to change one or more of the fashion items that make the virtual outfit 3050. In one example, the user interface 28 is configured so that a gesture or pressure applied to the screen 3040 in the vicinity, or selection of, the region of a particular fashion item 3052, 3054, 3056, etc causes the display of a screen 3060 as shown in FIG. 25C. Screen 3040 includes a change fashion item element 3072, an add item element 3080, and a favorite identifier input 3082. The add-item 3080 permits the user to add specific fashion items the outfit 3050. The favorite identifier input 3082 allows the user to select the display outfit 3050 as a favorite A "done or select" element 3084 is configured to indicate the user's selection of the display outfit for the planned event.

As shown in FIG. 25C, the change fashion item element 3072 includes a visual representation of different fashion items that are similar to selected fashion item 3052 from outfit 3050. The different fashion items included in the change fashion item element 3072 are based on previously compiled or stored fashion items that are similar to the fashion item originally displayed in outfit 3050. The user interface 28 permits the user to scroll through different fashion items displayed in the change fashion item element 3072 in order to determine which one he or she prefers for the selected event. As illustrated, change fashion item element 3072 is a rotatable path 3074. A gesture, pressure, or other means of selection, applied along line 3077 causes the rotatable path 3074 to cycle through the different fashion items until the user identifies one for incorporation into the virtual outfit 3050. The user interface can magnify a particular fashion item, similar to how garment 3078 is magnified in FIG. 25C, for a closer view. As noted above, in alternative embodiments, the change fashion item element 3072 can be a linear slide element that allows the user to scroll through different fashion items linearly. In any event, the change fashion item element 3072 element allows the user to scroll through the each alternative fashion item and select a preferred garment for incorporation into the virtual outfit 3050. In the example shown in FIG. 25C, the user interface allows the user to scroll through upper body fashion items until the long-sleeve placket shirt 3078 is displayed. Selection of the shirt 3078 replaces the fashion item 3052 originally displayed in outfit 3054) with the shirt 3078. After selecting the desired fashion item, the user can select a "complete" or "done" element 3080. Consequently, the user interface 28 is configured causes the display of screens 3010, 3040 and 3060 based on inputs receive by the user. The input portions displayed on screens 3010, 3040 and 3060 can help facilitate the process 400 described above and illustrated in FIGS. 7A through 78.

Referring back to FIG. 14, which illustrates the main or home screen 1100 and a travel planning element 1106. Selection of the travel planning element 1106 initiates method 504) described above and illustrated in FIG. 8 whereby the application assists in outfit planning and packing for a planned trip. Selection of the travel planning element 1106 can cause the user interface to display screen 4010 as shown in FIG. 26.

Figures 26, 27:
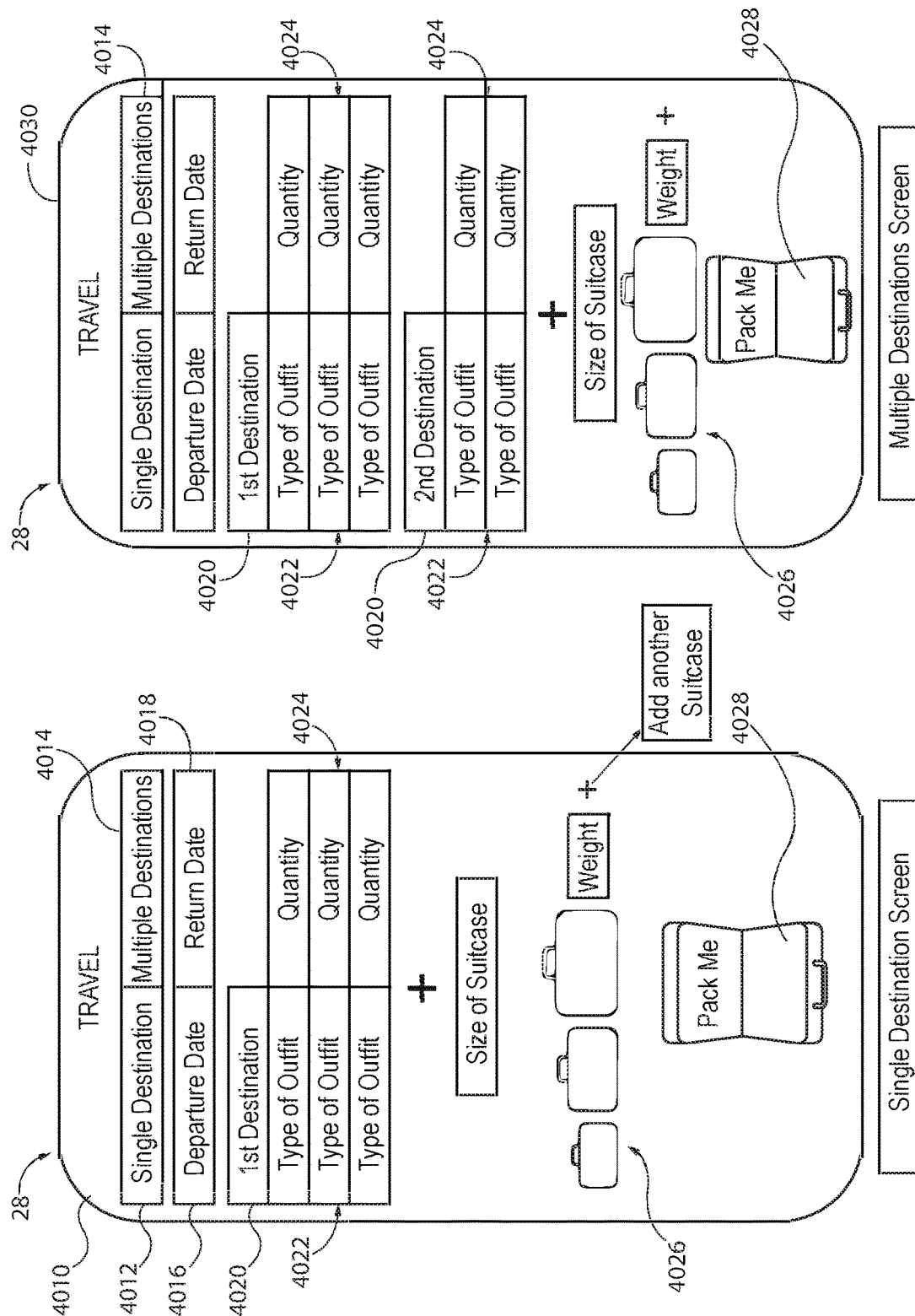
FIG. 26 illustrates a user interface displaying an exemplary screen that includes input elements used to create one or more outfits for traveling to a single destination.
FIG. 27 illustrates a user interface displaying an exemplary screen that includes input elements used to create one or more outfits for traveling to multiple destinations.

As shown in FIG. 26, the screen 4010 includes a several input portions that allow the user to input travel details and planned events so that the application can compile outfits for the trip and aid in packing. The screen 4010 includes trip type elements 4012 and 4014 for single and multiple destinations trips, respectively. Selection of the multiple destination trip element 4014 can cause the display of screen 4030 for inputting multiple destinations. The screen 4010 includes departure field 4016, return field 4018, and destination input field 4020, outfit type fields 4022, outfit quantity fields 4024, and luggage identifiers 4026. The user can input, departure, return, destination, event type, and quantity of outfits needed. The user can select the pack element 4028. Selection of element 4028 causes the application to compile outfits based on destination, indicated event, duration of trip, and predicted weather for the intended destination.

Figure 28:
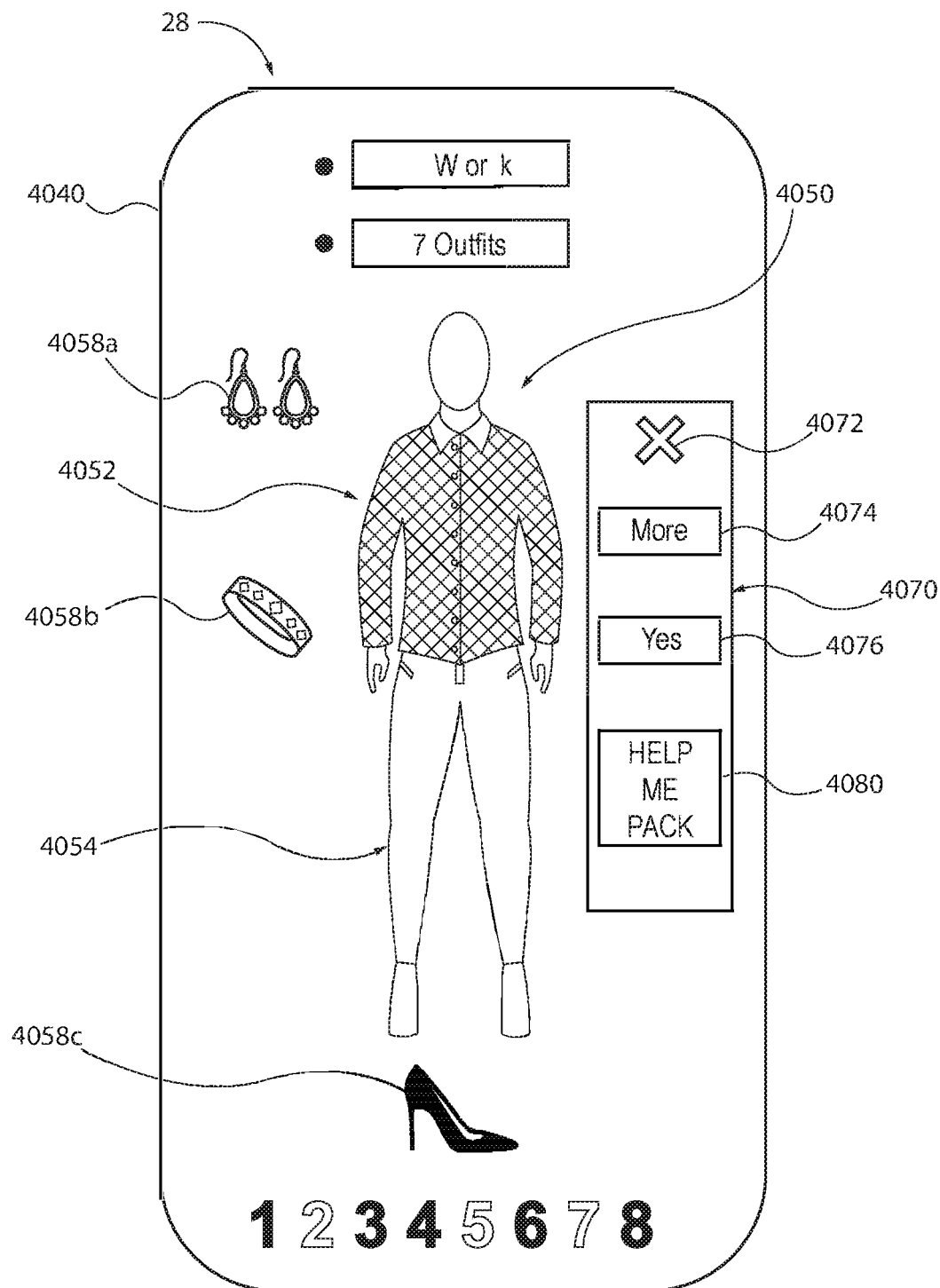
FIG. 28 illustrates a user interface displaying an exemplary screen that includes input elements for a user's selection of desired fashion item models for travel planning.

Selection of packing element 4028 also causes the user interface 28 to display screen 4040 shown in FIG. 28. The display screen 4040 includes the compiled outfits based on the travel input data discussed above. For instance, the screen 4040 is configured to allow the user to scroll through each compiled virtual outfit and modify or change items as needed. The screen 4050 includes virtual outfit 4050, which includes an upper body fashion item 4052, a lower body fashion item 4054, an optional outerwear fashion item, and accessory items 4058*a*, 4058*b*, 4058*c*. In some instances, the virtual outfit 4050 includes a full body fashion item 4059 (not shown), such as a dress. The displayed virtual outfit 4050 is similar the virtual outfit 1044, virtual outfit 1192, and virtual outfit 3050 described above. Screen 4040 also includes a modification portal 4070 that includes a "delete" element 4072, selection of which removes the outfit from the compiled outfits. The modification portal 4070 includes a selection input 4074 which allows the user to select specific items from the outfit for packing. An outfit selection element 4076 permits the selection the entire displayed outfit 4050, with or without modification. An outfit number indicator displays the number of outfits compiled and the particular outfit being displayed. The outfit number indicator can include highlighted identifiers to indicate which of the compiled outfits have been selected for packing. When the requisite number of outfits is selected by the user, the application can assign the specific fashion items to particular luggage pieces as described above in process 500 and illustrated in FIG. 8. The modification portion also includes a "help me pack" element 4080, selection of which initiates a process whereby the application provides graphical guide for adding the user in packing items m the luggage.

Selection of element 4080 also causes the user interface 28 to display screen 4082 shown in FIG. 29. The display screen 4080 includes guide windows 4082, 4084, 4086, 4088, and 4090, and luggage 4094. Each window displays one or more graphical images that illustrate a packing methodology for a particular fashion item to aid in packing the items into the luggage. As illustrated, the window 4082 illustrates a procedure for folding a blazer. The window 4084 illustrates a procedure for folding a pair of dress slack. The window 4086 illustrates a procedure for folding a sweater. The window 4088 illustrates a procedure for folding a shin. The window 4090 illustrates a procedure for folding a pair blue jeans. Element 4092 illustrates the luggage divided into specific zones that are associated with the respective folded fashion items illustrated in windows 4082, 4084, 4086, 4088, and 4090. The display screen 4082 can display each window as a video, giff or other format.

While the foregoing description and drawings represent the various exemplary embodiments of the present disclosure, it will be understood that various additions, modifications, combinations and/or substitutions may be made therein without departing from the spirit and scope of the invention as defined in the accompanying claims. In particular, it will be clear to those skilled in the art that the invention may be embodied in other specific forms, structures, arrangements, proportions, and with other elements, materials, and components, without departing from the spirit or essential characteristics thereof. In addition, features described herein may be used singularly or in combination with other features. For example, features described in connection with one embodiment may be used and/or interchanged with features described in another embodiment. The presently disclosed embodiments are therefore to be considered in all respects as illustrative and not restrictive, the scope of the invention being indicated by the appended claims, and not limited to the foregoing description.

What is claimed:

1. A method, comprising:
   receiving, through a graphical user interface presented at a client device, user input including wardrobe data specifying fashion items in the user's wardrobe;
   learning, by one or more computing devices and based on the wardrobe data, user wardrobe preferences;
   obtaining, by the one or more computing devices, an image input;
   generating, by the one or more computing devices and based on the image input, a virtual fashion item corresponding to an actual garment depicted by the image input, wherein generating the virtual fashion item comprises generating a wire frame model that includes points representing multi-dimensional spatial dimensions of the actual garment depicted by the image input;
   storing, by the one or more computing devices, the virtual fashion item in a hardware memory device;
   visually augmenting, by the one or more computing devices, a graphical depiction of the virtual fashion item based on (i) locations of the points relative to corresponding points on an electronic representation of a human form over which the graphical representation of the virtual fashion item is presented and (ii) the learned user wardrobe preferences; and
   outputting, by the one or more computing devices, the augmented graphical representation of the virtual fashion item over the electronic representation of the human form.

2. The method of claim 1, further comprising:
   presenting the graphical depiction of the virtual fashion item in a modifiable state;
   receiving user input specifying a change to a characteristic of the virtual fashion item, wherein:
   visually augmenting the graphical depiction of the virtual fashion item comprises adjusting the graphical depiction based on the user input specifying the change to the characteristic of the virtual fashion item.

3. The method of claim 2, wherein:
   receiving the user input specifying the change to the characteristic of the virtual fashion item comprises receiving selection of a color scheme via a color scheme selection element presented in the graphical user interface presented at the client device; and
   adjusting the graphical depiction comprises changing a color scheme of the graphical depiction of the virtual fashion item based on the color scheme selected via the color scheme selection element.

4. The method of claim 2, wherein adjusting the graphical depiction of the virtual fashion item comprises scaling one or more dimensions of the graphical depiction of the virtual fashion item based on adjusted locations of the points of the wire frame model relative to corresponding points on an electronic representation of the human form and a material type of the given garment as specified by item component material data specifying an electronic indication of a yarn structure, filament or spun or specific fiber type of a fiber blend percentage.

5. The method of claim 1, further comprising:
   categorizing a different virtual fashion item together with the virtual fashion item based on one or more similarities between a wireframe model of the different virtual fashion item and the wireframe model of the virtual fashion item;

detecting interaction with a silhouette representing a garment category of the different virtual fashion item and the virtual fashion item; and outputting a source of the different virtual fashion item after detecting the interaction with the silhouette.

6. The method of claim 5, further comprising:

identifying the different virtual fashion item in a virtual closet of a third party; and augmenting a graphical depiction of the different virtual fashion item based on points of the wireframe model of the different virtual fashion item of the third party and the corresponding locations on an electronic representation of the human form over which the graphical depiction of the different virtual fashion item b of the third party is presented.

7. A system, comprising:

a memory device; and one or more computing devices that interact with the memory device and execute instructions that cause the one or more computing devices to perform operations including:

receiving, through a graphical user interface presented at a client device, user input including wardrobe data specifying fashion items in the user's wardrobe;

learning, based on the wardrobe data, user wardrobe preferences;

obtaining an image input;

generating, based on the image input, a virtual fashion item corresponding to an actual garment depicted by the image input, wherein generating the virtual fashion item comprises generating a wire frame model that includes points representing multi-dimensional spatial dimensions of the actual garment depicted by the image input;

storing the virtual fashion item in a hardware memory device;

visually augmenting a graphical depiction of the virtual fashion item based on (i) locations of the points relative to corresponding points on an electronic representation of a human form over which the graphical representation of the virtual fashion item is presented and (ii) the learned user wardrobe preferences; and outputting the augmented graphical representation of the virtual fashion item over the electronic representation of the human form.

8. The system of claim 7, wherein the instructions cause the one or more computing devices to perform operations further comprising:

presenting the graphical depiction of the virtual fashion item in a modifiable state;

receiving user input specifying a change to a characteristic of the virtual fashion item, wherein:

visually augmenting the graphical depiction of the virtual fashion item comprises adjusting the graphical depiction based on the user input specifying the change to the characteristic of the virtual fashion item.

9. The system of claim 8, wherein:

receiving the user input specifying the change to the characteristic of the virtual fashion item comprises receiving selection of a color scheme via a color scheme selection element presented in the graphical user interface presented at the client device; and adjusting the graphical depiction comprises changing a color scheme of the graphical depiction of the virtual fashion item based on the color scheme selected via the color scheme selection element.

10. The system of claim 8, wherein adjusting the graphical depiction of the virtual fashion item comprises scaling one or more dimensions of the graphical depiction of the virtual fashion item based on adjusted locations of the points of the wire frame model relative to corresponding points on an electronic representation of the human form and a material type of the given garment as specified by item component material data specifying an electronic indication of a yarn structure, filament or spun or specific fiber type of a fiber blend percentage.

11. The system of claim 7, wherein the instructions cause the one or more computing devices to perform operations further comprising:

categorizing a different virtual fashion item together with the virtual fashion item based on one or more similarities between a wireframe model of the different virtual fashion item and the wireframe model of the virtual fashion item;

detecting interaction with a silhouette representing a garment category of the different virtual fashion item and the virtual fashion item; and outputting a source of the different virtual fashion item after detecting the interaction with the silhouette.

12. The system of claim 11, wherein the instructions cause the one or more computing devices to perform operations further comprising:

identifying the different virtual fashion item in a virtual closet of a third party; and augmenting a graphical depiction of the different virtual fashion item based on points of the wireframe model of the different virtual fashion item of the third party and the corresponding locations on an electronic representation of the human form over which the graphical depiction of the different virtual fashion item b of the third party is presented.

13. A non-transitory computer readable medium storing instructions that when executed by one or more computing devices cause the one or more computing devices to perform operations comprising:

receiving, through a graphical user interface presented at a client device, user input including wardrobe data specifying fashion items in the user's wardrobe;

learning, based on the wardrobe data, user wardrobe preferences;

obtaining an image input;

generating, based on the image input, a virtual fashion item corresponding to an actual garment depicted by the image input, wherein generating the virtual fashion item comprises generating a wire frame model that includes points representing multi-dimensional spatial dimensions of the actual garment depicted by the image input;

storing the virtual fashion item in a hardware memory device;

visually augmenting a graphical depiction of the virtual fashion item based on (i) locations of the points relative to corresponding points on an electronic representation of a human form over which the graphical representation of the virtual fashion item is presented and (ii) the learned user wardrobe preferences; and outputting the augmented graphical representation of the virtual fashion item over the electronic representation of the human form.

14. The non-transitory computer readable medium of claim 13, wherein the instructions cause the one or more computing devices to perform operations further comprising:
- presenting the graphical depiction of the virtual fashion item in a modifiable state;
- receiving user input specifying a change to a characteristic of the virtual fashion item, wherein:
- visually augmenting the graphical depiction of the virtual fashion item comprises adjusting the graphical depiction based on the user input specifying the change to the characteristic of the virtual fashion item.

15. The non-transitory computer readable medium of claim 14, wherein:
- receiving the user input specifying the change to the characteristic of the virtual fashion item comprises receiving selection of a color scheme via a color scheme selection element presented in the graphical user interface presented at the client device; and
- adjusting the graphical depiction comprises changing a color scheme of the graphical depiction of the virtual fashion item based on the color scheme selected via the color scheme selection element.

16. The non-transitory computer readable medium of claim 14, wherein adjusting the graphical depiction of the virtual fashion item comprises scaling one or more dimensions of the graphical depiction of the virtual fashion item based on adjusted locations of the points of the wire frame model relative to corresponding points on an electronic representation of the human form and a material type of the given garment as specified by item component material data specifying an electronic indication of a yarn structure, filament or spun or specific fiber type of a fiber blend percentage.

17. The non-transitory computer readable medium of claim 13, wherein the instructions cause the one or more computing devices to perform operations further comprising:
- categorizing a different virtual fashion item together with the virtual fashion item based on one or more similarities between a wireframe model of the different virtual fashion item and the wireframe model of the virtual fashion item;
- detecting interaction with a silhouette representing a fashion item category of the different virtual fashion item and the virtual fashion item; and
- outputting a source of the different virtual fashion item after detecting the interaction with the silhouette.

18. The non-transitory computer readable medium of claim 17, wherein the instructions cause the one or more computing devices to perform operations further comprising:
- identifying the different virtual fashion item in a virtual closet of a third party; and
- augmenting a graphical depiction of the different virtual fashion item based on points of the wireframe model of the different virtual fashion item of the third party and the corresponding locations on an electronic representation of the human form over which the graphical depiction of the different virtual fashion item-b of the third party is presented.

* * * * *